(12) United States Patent
Iwatsuki et al.

(10) Patent No.: US 7,666,110 B2
(45) Date of Patent: Feb. 23, 2010

(54) CONTROL SYSTEM FOR POWER TRANSMISSION MECHANISM

(75) Inventors: Kunihiro Iwatsuki, Toyota (JP);
Yasunori Nakawaki, Nishikamo-gun (JP); Yasuhiro Oshiumi, Gotenba (JP); Kazumi Hoshiya, Gotenba (JP); Takayuki Amaya, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 622 days.

(21) Appl. No.: 10/797,142

(22) Filed: Mar. 11, 2004

(65) Prior Publication Data
US 2004/0242370 A1 Dec. 2, 2004

(30) Foreign Application Priority Data

| | | | |
|---|---|---|---|
| Mar. 26, 2003 | (JP) | | 2003-086613 |
| Apr. 18, 2003 | (JP) | | 2003-114919 |
| May 9, 2003 | (JP) | | 2003-132224 |
| Sep. 25, 2003 | (JP) | | 2003-334260 |

(51) Int. Cl.
*F16H 61/00* (2006.01)
(52) U.S. Cl. .......................................... 474/28
(58) Field of Classification Search .................. 474/8, 474/18, 28; 477/44, 45
See application file for complete search history.

(56) References Cited

U.S. PATENT DOCUMENTS

| | | | | |
|---|---|---|---|---|
| 5,672,132 A | | 9/1997 | Schwab | |
| 5,852,330 A | * | 12/1998 | Yumoto | 290/40 R |
| 6,168,546 B1 | * | 1/2001 | Loffler et al. | 477/109 |
| 6,193,630 B1 | * | 2/2001 | Janasek et al. | 477/156 |
| 6,454,675 B2 | * | 9/2002 | Asayama et al. | 477/45 |
| 6,460,398 B1 | | 10/2002 | Stopp et al. | |
| 6,565,483 B2 | * | 5/2003 | Segawa et al. | 477/174 |
| 2002/0165064 A1 | * | 11/2002 | Miki et al. | 477/45 |

FOREIGN PATENT DOCUMENTS

JP 58-214054 12/1983

(Continued)

OTHER PUBLICATIONS

"Gearing up for Tomorrow, Take a LuK inside . . . ", 7th LuK Symposium, vol. 11./12., Apr. 2002, pp. 80-87.

(Continued)

*Primary Examiner*—Vicky A Johnson
(74) *Attorney, Agent, or Firm*—Oblon, Spivak, McClelland, Maier & Neustadt, L.L.P.

(57) ABSTRACT

A control system of a power transmission mechanism, in which a transmission torque capacity between transmission members varies according to a pressure to be applied to the transmission members and in which the pressure to be applied to the transmission members is controlled on the basis of such a slip condition between the transmission members as accompanies the lowering of the pressure. The control system comprises: a pressure lowering device for lowering the pressure by a preset value; and a pressure setter for setting the pressure, in case the slip between the transmission members is not detected even by lowering the pressure by a preset value with the pressure lowering device, on the basis of the lowered minimum value of the pressure.

25 Claims, 29 Drawing Sheets

FOREIGN PATENT DOCUMENTS

| | | |
|---|---|---|
| JP | 59-29863 | 2/1984 |
| JP | 62-71032 | 5/1987 |
| JP | 04-131564 | 5/1992 |
| JP | 6-11022 | 1/1994 |
| JP | 9-500707 | 1/1997 |
| JP | 09-500707 | 1/1997 |
| JP | 10-2390 | 1/1998 |
| JP | 10-184897 | 7/1998 |
| JP | 2001-12593 | 1/2001 |
| JP | 2001-108082 | 4/2001 |
| JP | 2001-254814 | 9/2001 |
| JP | 2001-330099 | 11/2001 |
| JP | 2001-330119 | 11/2001 |
| JP | 2001-330126 | 11/2001 |
| JP | 2003-49934 | 2/2003 |
| JP | 2003-65428 | 3/2003 |
| JP | 2003-83430 | 3/2003 |

OTHER PUBLICATIONS

U.S. Appl. No. 10/557,418, filed Nov. 18, 2005, Iwatsuki et al.

* cited by examiner

FIG.28
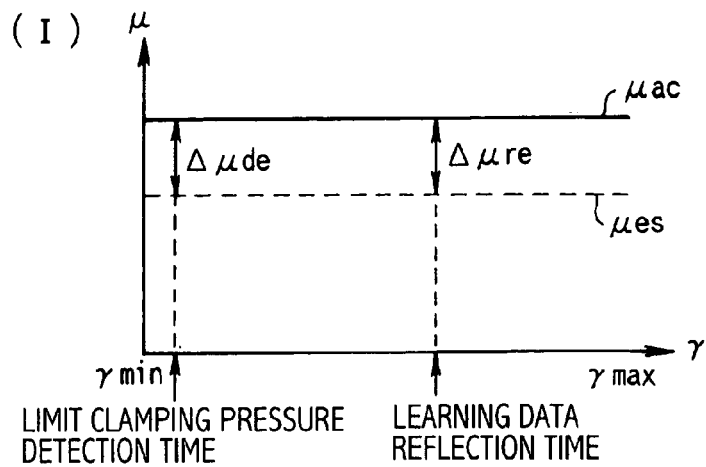
(I)
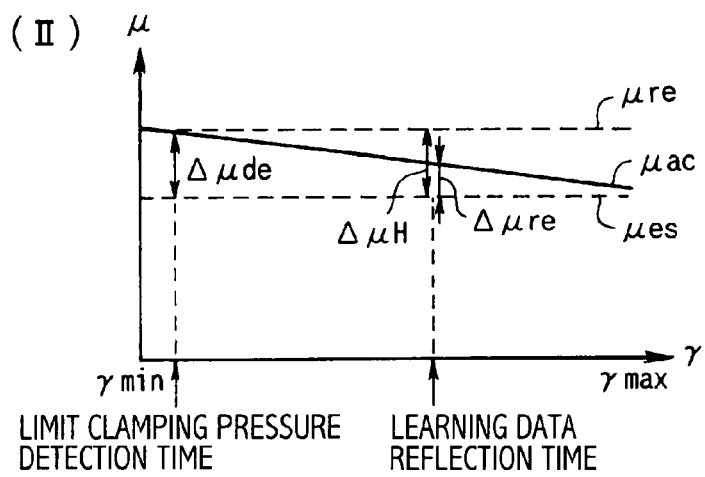
(II)
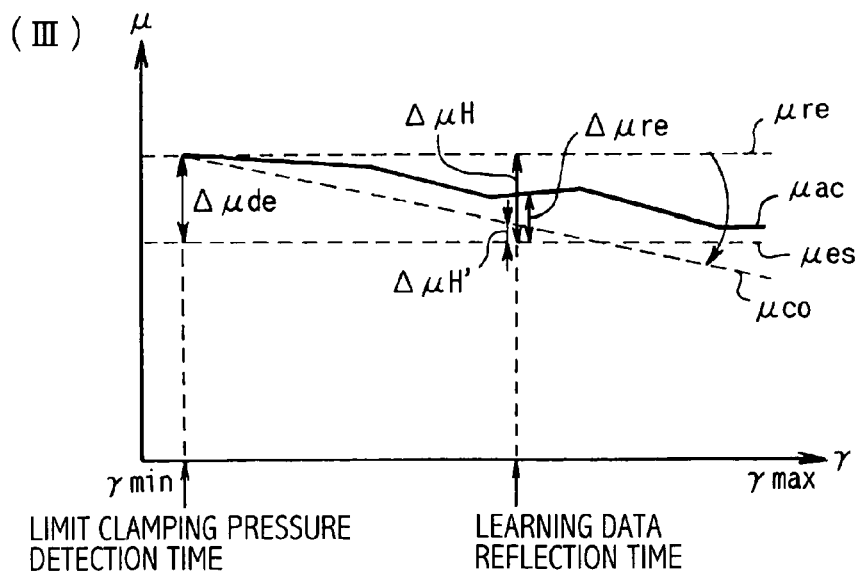
(III)

CONTROL SYSTEM FOR POWER TRANSMISSION MECHANISM

BACKGROUND OF THE INVENTION

1. Field of the Invention

This invention relates to a control system either for a power transmission mechanism having a transmission torque capacity varied according to the pressure applied, such as a continuously variable transmission or a friction applying device, or for a power line including the power transmission mechanism.

This invention relates to the subject matter contained in Japanese Patent Application No. 2003-86613, filed on Mar. 26, 2003, No. 2003-114919, filed on Apr. 18, 2003, No. 2003-132224, filed on May 9, and No. 2003-334260, filed on Sep. 25, 2003, which are expressly incorporated herein by reference.

2. Related Art

A belt type continuously variable transmission or a traction type continuously variable transmission transmits a torque by making use of a frictional force between a belt and pulleys or a shearing force of traction oil between discs and rollers. On the other hand, the friction applying device such as clutches or brakes transmits a torque by making use of a frictional force to occur on the surfaces of friction members. Therefore, these power transmission mechanisms are set to have transmission torque capacities according to the pressure to act on the portions in which the torque transmissions occur.

The aforementioned pressure in the continuously variable transmission is called the "clamping pressure", and the pressure in the friction applying device may also be called the "applying pressure". When this clamping pressure or applying pressure is raised, the transmission torque capacity can be increased to avoid a slip. On the contrary, there arises a disadvantage that a power is consumed more than necessary for establishing a high pressure or that the transmission efficiency of the power is degraded. Therefore, the clamping pressure or applying pressure is generally set as low as possible within a range of no unintentional slip.

In a vehicle carrying the continuously variable transmission, for example, the mileage can be improved by controlling the speed of an engine with the continuously variable transmission. In order not to deteriorate this advantage, therefore, the clamping pressure is controlled to a level as low as possible within a range of no slip so that the power transmission efficiency in the continuously variable transmission may be improved as high as possible. For this control, it is necessary to detect the pressure to start the slip (i.e., the slip limit pressure). In the related art, various methods are used to detect the slip or the slip limit pressure.

One example is enumerated in JP-A-2001-12593. This discloses a slip detecting method for either the continuously variable transmission for transmitting the power by frictional contacts or its transmission system. In this method, the slip is decided by detecting a rise in the frictional efficiency, as accompanying the lowering of a contacting force (i.e., the clamping pressure or the applying force). The method disclosed in JP-A-2001-12593 is a control method for the continuously variable transmission, which is provided with a pair of conical discs and a driving member to run on the conical discs with wrapping those discs. In this method, the contacting force is gradually lowered while the force to be transmitted, the speed or the transmission ratio being substantially constant, and is stepwise increased when the slip is detected in terms of a rise in an oil temperature. After this, the contacting force is set at a level higher than that at the slip time.

In the invention disclosed in JP-A-2001-12593, moreover, there are stored the characteristic fields, which relate to various different speeds, torques, gear ratios and temperatures and which indicate the contacting force necessary for a specific slip, so that the contacting force between the conical discs is adjusted to correspond to those characteristic fields.

In JP-T-9-500707, on the other hand, there is disclosed a method for detecting a slip in a clutch arranged between an engine and a belt type continuously variable transmission. In this method, a clutch is lowered stepwise from a first pressure level to a second pressure level, and a slight speed difference such as about 50 revolutions is detected so that the slip is decided on the basis of the detection result. In the materials distributed in 7th Luk Symposium 11./12., April 2002, there is disclosed a method for detecting a slip of a belt by varying a belt clamping pressure periodically.

In the method disclosed in JP-A-2001-12593, the slip of the case, in which the clamping pressure is lowered, is detected in terms of the rise in the frictional efficiency. However, a time delay inevitably occurs between the instant, at which the slip actually occurred, and the instant at which the rise in the frictional efficiency is detected in terms of the rise in the oil temperature. Even if the contacting force is stepwise increased by the decision of the slip, therefore, the slip may become excessive. In the method disclosed in JP-A-2001-12593, moreover, the contacting force is increased at the instant when the rise of the frictional efficiency is detected. In case the rise in the frictional efficiency was not detected for any cause, the contacting force is further decreased. As a result, the excessive slip may be caused by the increase in the reduction width of the contacting force.

On the other hand, the torque capacity in the continuously variable transmission is set to correspond to the torque to be inputted to the continuously variable transmission so that the clamping pressure or contacting force corresponds to the input torque. Therefore, the control to determine the slip limit by lowering the contacting force (i.e., the clamping pressure), as disclosed in JP-A-2001-12593, is executed in the actual running state having various input torques.

The prerequisite condition for lowering the contacting force is that the force to be transmitted, the transmission ratio and so on be constant. While the vehicle is running, however, it is ordinary that the running conditions such as the vehicle speed or the torque are varying, although slightly. According to the method disclosed in JP-A-2001-12593, therefore, in case the time period from the lowering instant of the contacting force to the instant of detecting the slip or deciding the slip limit is long, the detection precision of the slip limit may be degraded by the change in the meanwhile drive or running state. Alternatively, the detection of the slip may have to be interrupted. If the lowering gradient of the contacting force is large, on the contrary, an excessive slip or a damage such as wear may be caused by an overshoot.

On the other hand, JP-A-2001-12593 has failed to disclose a specific method for reflecting the slip starting pressure on the proper control of the power transmission mechanism.

SUMMARY OF THE INVENTION

This invention has an object to provide a control system capable of optimizing a pressure to be applied to transmission members thereby to set a transmission torque capacity, without any excessive slip or control delay between those transmission members.

Another object of this invention is to precisely detect the slip between the transmission members or the pressure at the slip staring time.

In the control system of this invention, the pressure for determining the transmission torque capacity is lowered by a preset value, and the pressure for setting the transmission torque capacity is determined, in case the slip is not detected, on the basis of the pressure at the lowered minimum level. The lowering of the pressure may be stepwise, slowly with a preset gradient, or stepwise and then slowly. In any case, the lower limit of the pressure to be lowered is regulated to avoid the excessive lowering of the pressure and the excessive slip between the transmission members.

Moreover, the aforementioned lowering of the pressure can be limited within a preset constant time period. Therefore, the input torque is hardly varied while the pressure is being lowered. Thus, it is possible to reduce the possibility of the excessive slip between the transmission members. It is also possible to decide for a short time period whether or not the slip occurs between the transmission members.

According to this invention, in case no slip occurs in the transmission members even by lowering the aforementioned pressure, the lowering control of the pressure is executed again with a change in the pressure lowering tendency or a lowering width. Therefore, it is possible to reduce the possibility that the excessive slip may occur according to the lowering of the pressure.

In this invention, while the aforementioned pressure is being lowered, the limit pressure for causing the slip of the transmission members is detected. In case the power transmission mechanism is a continuously variable transmission, the decision of the slip start is made on the basis of either the result of comparison between an estimated value of the gear ratio and the actual gear ratio or a gear changing rate.

When a slip is caused in the continuously variable transmission by lowering the clamping pressure of the continuously variable transmission, a slip limit clamping pressure can be achieved to provide a learned value on the basis of the slip limit clamping pressure. In case the clamping pressure is set by using the learned value, the actual gear ratio and the estimated gear ratio are compared. In case the result of this comparison is outside of a preset range, the learned value is not adopted as data for setting the clamping pressure. In other words, the slip of the continuously variable transmission by an erroneous learning can be prevented according to this invention.

In case the pressure for causing the slip between the transmission members is detected, the pressure to be applied to the transmission members can be set on the basis of the so-called "slip starting pressure". In this invention, in case the slip starting pressure is to be reflected on the setting control of the aforementioned pressure, the preset physical quantities, which are determined on the basis of the slip starting pressure and the input torque at the slip starting time, are used to perform the setting control of the pressure. The object of this control can be the clamping pressure of the continuously variable transmission. Therefore, the clamping pressure is set by the control, on which the physical quantities determined from the relation between the input torque and the slip starting pressure are reflected. Therefore, the clamping pressure is lowered as much as possible within the range of no slip, so that the transmission efficiency of the power and the durability of the continuously variable transmission are improved.

In this invention, moreover, in case the slip is detected, the aforementioned pressure is stepwise raised by instructing a pressure higher than that at the lowering starting time. Therefore, it is possible to prevent the slip from becoming excessive. In case the slip is detected, moreover, the aforementioned pressure is raised, and the input torque is lowered, so that the slip can be promptly converged and prevented from becoming excessive.

In this invention, moreover, the transmission torque capacity of the clutch, which is arrayed in tandem with respect to the power transmission mechanism, is set to cause the slip earlier than the power transmission mechanism. In case a high torque acts on the transmission line including the power transmission mechanism and the clutch, therefore, the slip occurs in the clutch so that no torque higher than that applied to the clutch acts on the power transmission mechanism. As a result, it is possible to prevent the slip of the power transmission mechanism reliably.

The above and further objects and novel features of this invention will more fully appear from the following detailed description when the same is read with reference to the accompanying drawings. It is to be expressly understood, however, that the drawings are for purpose of illustration only and are not intended as a definition of the limits of the invention.

BRIEF DESCRIPTION OF THE DRAWINGS

FIG. 28 presents diagrams for explaining relations between: an actual friction coefficient and an estimated friction coefficient at a limit clamping pressure detection time, and an actual friction coefficient and an estimated friction coefficient at a learning data reflection time; and a gear ratio.

DETAILED DESCRIPTION OF THE PREFERRED EMBODIMENT

Figure 1:
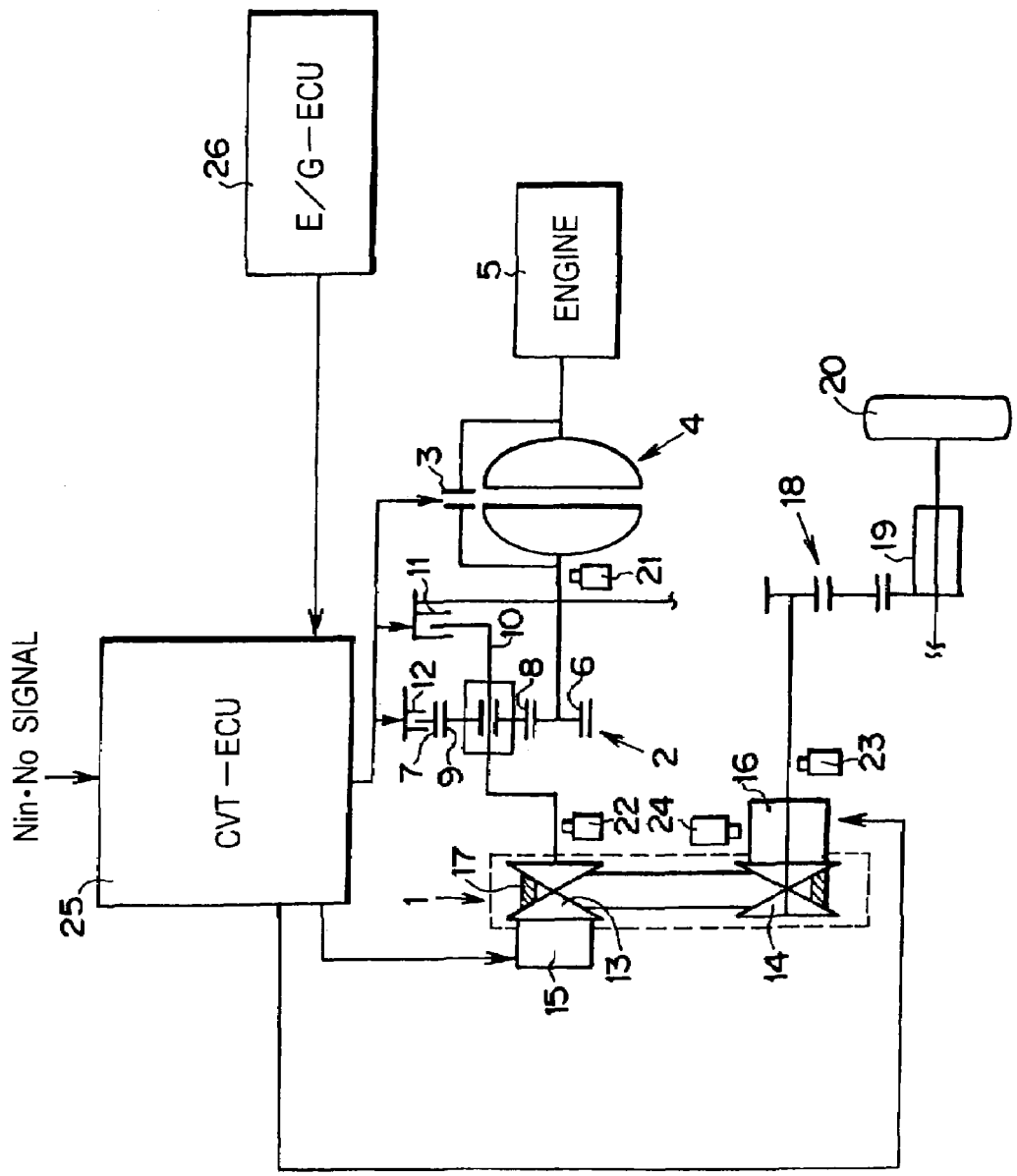
FIG. 1 is a diagram schematically showing one example of a transmission line including a power transmission mechanism, to which this invention is applied.

This invention will be described on the basis of its specific examples. First of all, here will be described one example of a transmission line including a power transmission mechanism, to which this invention is applied. FIG. 1 schematically shows a drive mechanism including a belt type continuously variable transmission 1 as the power transmission mechanism. This continuously variable transmission 1 is connected to a prime mover 5 through a forward/backward switching mechanism 2 and through a fluid transmission mechanism 4 having a lockup clutch 3.

The prime mover 5 is constructed of an internal combustion engine; an internal combustion engine and an electric motor; or an electric motor. In the following description, the prime mover 5 will be called the "engine 5". On the other hand, the fluid transmission mechanism 4 has a construction similar to that of the torque converter of the related art. Specifically, the fluid transmission mechanism 4 is constructed to include: a pump impeller to be rotated by the engine 5; a turbine runner arranged to confront the pump impeller; and a stator interposed between them, so that the turbine runner may be rotated to transmit the torque by feeding it with a spiral flow of a fluid generated by the pump impeller.

In torque transmission through the fluid, an inevitable slip occurs between the pump impeller and the turbine runner to cause a drop in the power transmission efficiency. In order to avoid such factor, there is provided the lockup clutch 3 for directly connecting an input side member such as the pump impeller and an output side member such as the turbine runner. This lockup clutch 3 is constructed to be controlled by an oil pressure into a completely applied state, a completely released state and a slip state or their intermediate state, and is enabled to control the slip speed properly.

The forward/backward switching mechanism 2 is adopted as the rotating direction of the engine 5 is limited to one direction, and is constructed to output the input torque either as it is or in a reversed direction. In the example shown in FIG. 1, a double pinion type planetary gear mechanism is adopted as the forward/backward switching mechanism 2. Specifically, there are arranged a ring gear 7 concentrically with a sun gear 6. Between these sun gear 6 and ring gear 7, there are arranged a pinion gear 8 meshing with the sun gear 6 and another pinion gear 9 meshing with both that pinion gear 8 and the ring gear 7. Those pinion gears 8 and 9 are so held by a carrier 10 as to rotate thereon and to revolve around the carrier 10. The forward/backward switching mechanism 2 is further provided with: a forward clutch 11 for connecting two rotary elements (e.g., the sun gear 6 and the carrier 10) integrally; and a backward brake 12 for reversing the direction of the output torque by fixing the ring gear 7 selectively.

The continuously variable transmission 1 has the same construction as that of a belt type continuously variable transmission known in the related art. The continuously variable transmission 1 is constructed such that each of a drive pulley 13 and a driven pulley 14 arranged in parallel is composed of a stationary sheave and a movable sheave to be moved back and forth in the axial directions by hydraulic actuators 15 and 16. Therefore, the groove widths of the individual pulleys 13 and 14 are varied as the movable sheaves are axially moved, so that the running radii of a belt 17 (or the effective diameters of the pulleys 13 and 14) made to run on the individual pulleys 13 and 14 continuously vary, so as to change the gear ratio continuously. The drive pulley 13 is connected to the carrier 10 acting as the output element in the forward/backward switching mechanism 2.

Here, the hydraulic actuator 16 in the driven pulley 14 is fed through the not-shown oil pump and hydraulic control device with an oil pressure (e.g., a line pressure or its compensating pressure) according to the torque to be inputted to the continuously variable transmission 1. When the individual sheaves in the driven pulley 14 clamp the belt 17, therefore, the belt 17 is tensed to retain the clamping pressure (or the contact pressure) between the individual pulleys 13 and 14 and the belt 17. On the contrary, the hydraulic actuator 15 in the drive pulley 13 is fed with a pressure oil according to the gear ratio to be set, thereby to set a groove width (or an effective diameter) according to the target gear ratio.

The aforementioned driven pulley 14 is connected through a gear pair 18 to a differential 19, so that the torque is outputted from the differential 19 to a drive wheel 20. In the drive mechanism thus far described, therefore, the lockup clutch 3 and the continuously variable transmission 1 are arrayed in tandem between the engine 5 and the drive wheel 20.

There are provided a variety of sensors for detecting the action state (or the running state) of a vehicle carrying the continuously variable transmission 1 and the engine 5 thus far described. Specifically, the sensors are: a turbine speed sensor 21 for detecting the input speed (i.e., the speed of the aforementioned turbine runner) to the continuously variable transmission 1 to output a signal; an input speed sensor 22 for detecting the speed of the drive pulley 13 to output a signal; an output speed sensor 23 for detecting the speed of the driven pulley 14 to output a signal; and an oil pressure sensor 24 for detecting the pressure of the hydraulic actuator 16, which is disposed on the side of the driven pulley 14 so as to set the belt clamping pressure. Although not shown especially, there are also provided: an accelerator opening sensor for detecting the depression of an accelerator pedal to output a signal; a throttle opening sensor for detecting the degree of opening of the throttle valve to output a signal; and a brake sensor for outputting a signal when a brake pedal is depressed.

There is further provided a transmission electronic control unit (CVT-ECU) 25 for performing the controls to apply/release the aforementioned forward clutch 11 and backward brake 12, the control of the clamping pressure of the aforementioned belt 17, the control of the gear ratio, and the control of the lockup clutch 3. This electronic control unit 25 is constructed mainly of a microcomputer, for example, to perform operations according to preset programs on the basis of the data inputted and the data stored in advance, thereby to execute: the setting of various states such as forward, reverse or neutral and the clamping pressure demanded; the setting of the gear ratio; the application/release of the lockup clutch 3; and the control of the slip speed or the like.

Here are enumerated examples of data (or signals) to be inputted to the transmission electronic control unit 25. The signal of an input speed (e.g., an input number of revolutions per minute) Nin of the continuously variable transmission 1, and the signal of an output speed (e.g., an output number of revolutions per minute) No of the continuously variable transmission 1 are inputted from the respectively corresponding sensors. From an engine electronic control unit (E/G-ECU) 26 for controlling the engine 5, there are also inputted the signal of an engine speed Ne, the signal of an engine (E/G) load, the throttle opening signal, the accelerator opening signal indicating the depression of the (not-shown) accelerator pedal, and so on.

The continuously variable transmission 1 can control the engine speed or the input speed steplessly (or continuously) thereby to improve the mileage of the vehicle having this transmission mounted thereon. For example: a target drive force is determined on the basis of a demanded drive expressed by the accelerator opening and a vehicle speed; a target output necessary for achieving the target drive force is determined on the basis of the target drive force and a vehicle speed; an engine speed for achieving the target output with an optimum mileage is determined on the basis of a prepared map; and the gear ratio is controlled to establish the engine speed.

The power transmission efficiency in the continuously variable transmission 1 is so controlled in a satisfactory state that the advantage of the mileage improvement may not be deteriorated. Specifically, the torque capacity, i.e., the belt clamping pressure of the continuously variable transmission 1 is controlled to a level so low as possible as to transmit the target torque determined on the basis of the engine torque and as to cause no slip of the belt 17. This control is executed by lowering the clamping pressure to cause a slight slip in the continuously variable transmission 1 thereby to set the clamping pressure at the slipping time as a slip limit pressure so that the clamping pressure may be set to either a pressure estimating a preset safety factor in the slip limit pressure or a pressure having an added pressure corresponding to an input from the road surface.

Figure 2:
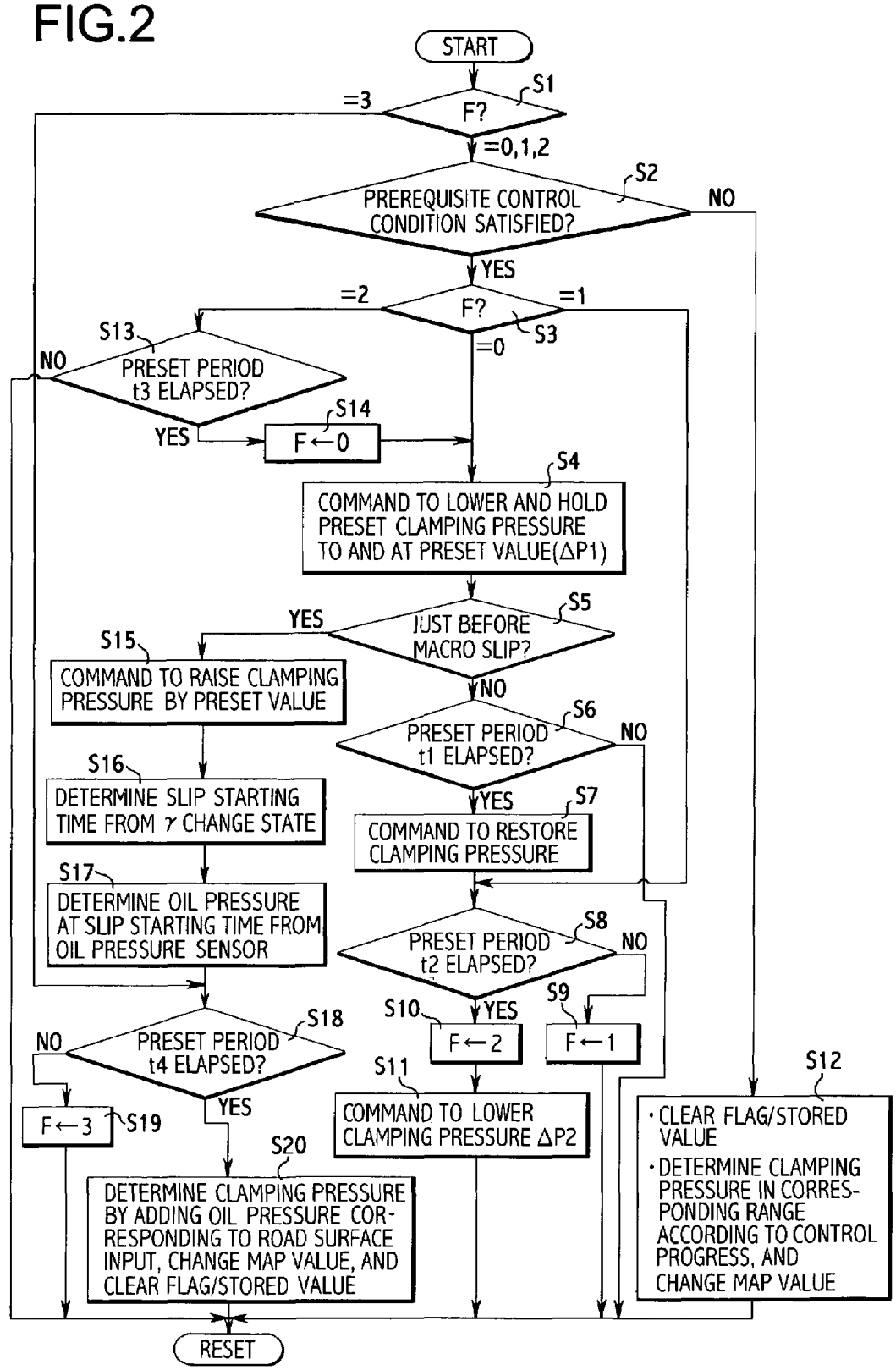
FIG. 2 is a flow chart for explaining one example of controls according to a control system of this invention.
Figure 3:
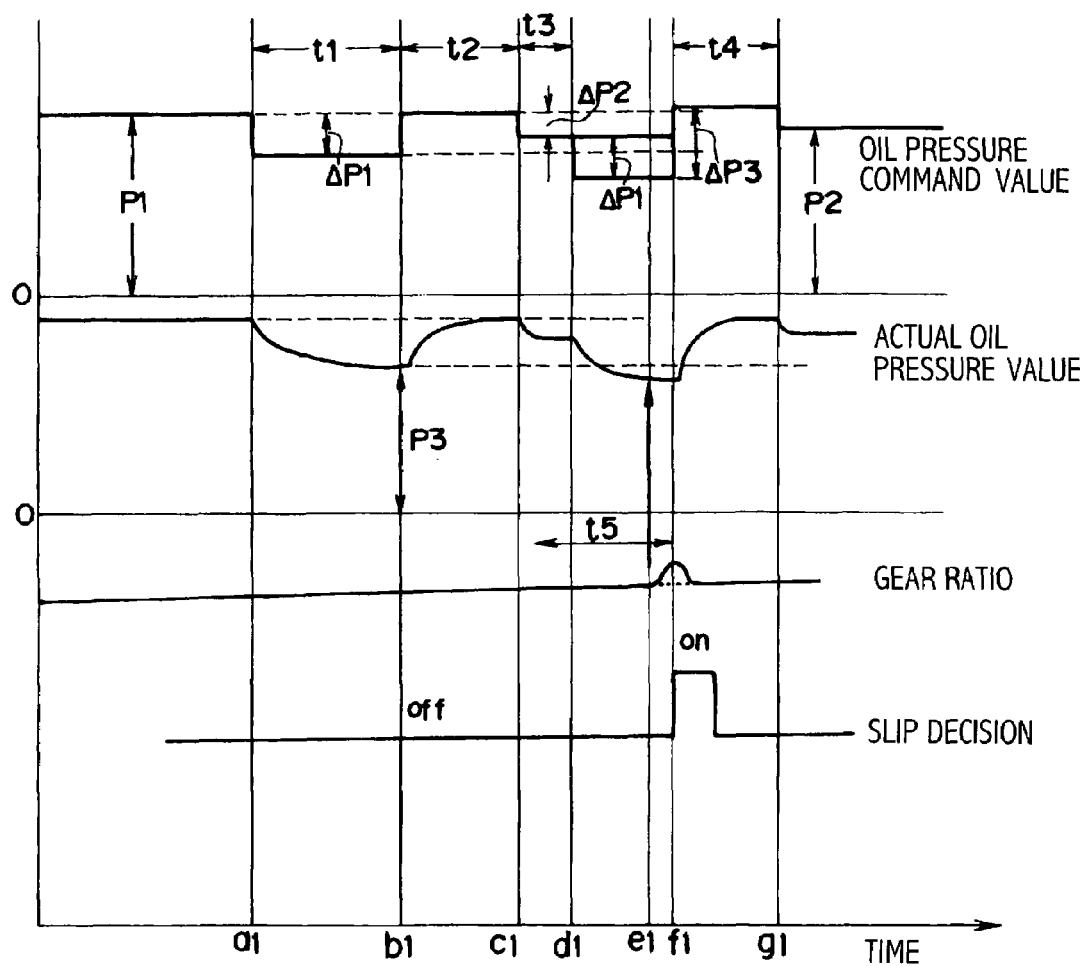
FIG. 3 is a diagram showing one example of a time chart of the case, in which the controls of FIG. 2 are executed.

The control system according to this invention is constructed to control the lowering of the clamping pressure, to detect the slip and to set the clamping pressure thereafter. FIG. 2 is a flow chart for explaining an example of the controls, which are executed repeatedly for every preset periods. On the other hand, FIG. 3 is a time chart illustrating the changes in the oil pressure and the gear ratio in case the controls shown in FIG. 2 are executed.

In FIG. 2, a flag F is decided at first (at Step S1). This flag F is set to "0" to "3" with the lapse of time, as will be described hereinafter, and is set at "0" at first. In this case, therefore, it is decided (at Step S2) whether or not the prerequisite control condition is satisfied. This prerequisite control condition is exemplified by: that the road surface covered is flat, not excessively rough or muddy; that the vehicle is running at a constant speed higher than a preset value; that the belt clamping pressure is not completely corrected; that the control device does not fail; and so on.

In case the prerequisite control condition is satisfied so that the answer of Step S2 is YES, the flag F is decided again (at Step S3). Since the flag F is set at "0" at first, the routine advances so that a command to lower and hold the clamping pressure to and at a preset value (at Step S4). In FIG. 3: the clamping pressure at the control starting time is indicated by P1; the lowered preset value of the clamping pressure by ΔP1; and the instant of outputting the command by a1. In the example being described, moreover, the command value at Step S4 is outputted for lowering the clamping pressure stepwise. Therefore, the actual clamping pressure becomes lower with a preset delay. This situation is illustrated by a curve in FIG. 3.

Next, the decision is made on the change in the slipping state, which is caused by lowering the belt clamping pressure in the aforementioned manner. Specifically, it is decided (at Step S5) whether or not the state is just before a macro slip or whether or not a slip has occurred. Here, the "macro slip" is such a slip state exceeding an inevitable "micro slip" between the belt 17 and the pulleys 13 and 14 as is established either by the extension/shrinkage of the belt 17 or by the relative movements of metallic members (as also called elements or blocks) composing the belt 17. The macro slip is a slip for causing the wear or the adhesion. Moreover, the "state just before" is the state before the slip extent or slip percentage increases to the macro slip, and can be decided or detected in terms of the slip percentage, for example.

In case the answer of Step S5 is NO, that is, in case no slip is detected, it is decided (at Step S6) whether or not a preset period t1 has elapsed from the lowering command of the clamping pressure. In case the preset period t1 has not elapsed so that the answer of Step S6 is NO, this routine is passed through without starting any new control for awaiting the lapse of time. In case the preset time t1 has elapsed from the lowering command of the clamping pressure so that the answer of Step S6 is YES, on the contrary, a command to restore the clamping pressure is outputted (at Step S7).

The instant of outputting the restoration command is indicated at an instant b1 in FIG. 3, and a command signal is outputted to return the clamping pressure to the P1 pressure. In short, the command is to raise the aforementioned drop ΔP1 of the clamping pressure. This restoration command is a stepwise rise command, as illustrated in FIG. 3. As a consequence, the actual clamping pressure changes with a preset delay in response to the command signal.

For awaiting the arrival at the pressure of the restoration command, it is decided (at Step S8) whether or not the lapse time from the output of the restoration command has reached a preset value t2. In case the answer of Step S8 is NO, the flag F is set to "1" (at Step S9). After this, this routine is once passed through for awaiting the time lapse.

In this case, the decision of "F=1" holds at the aforementioned Step S1 in the next cycle. However, the routine advances to Step S2, and it is decided whether or not the prerequisite control condition also in this case. If there is no change in the state such as running state, the answer of Step S2 is YES. Then, at the next Step S3, the decision of "F=1"

holds so that the routine advances to Step S8 immediately, and it is decided whether or not the preset time t2 has elapsed.

If the preset time t2 has elapsed so that the answer of Step S8 is YES, the clamping pressure has returned to the aforementioned pressure P1 before the lowering start. Therefore, the flag F is set to "2" (at Step S10), and a command to lower the clamping pressure by a preset value ΔP2 is outputted (at Step S11). This occurs at an instant c1 of FIG. 3. This preset value ΔP2 is smaller than the aforementioned lowering width ΔP1 at Step S4. Thus, the clamping pressure is lowered without the slip (or the macro slip), and the next lowering control is started from the low clamping pressure.

If the prerequisite control condition becomes unsatisfactory in the procedure for restoring the clamping pressure or for lowering the clamping pressure by the preset value ΔP2, the answer of Step S2 is NO. In this case, the flag F or the stored value is cleared. At the same time, the clamping pressure corresponding to the input torque is determined according to the control progress state, and the map value is changed (at Step S12). For example, in the procedure after the control start to the instant after the command to lower the clamping pressure initially at P1 by the preset value ΔP2 has been outputted, the state of the belt slip or just before the macro slip is not detected, and the lowest value of the clamping pressure in that procedure is an actual oil pressure P3 (as referred to FIG. 3) achieved by the command to lower by the preset value ΔP1. Therefore, the clamping pressure, i.e., the sum of that actual oil pressure P3 and the oil pressure corresponding to the road surface input is determined as the pressure according to the progress of the control. Here, the actual oil pressure P3 may be either the oil pressure detected by the oil pressure sensor 24 or the preset pressure achieved by the command to lower the preset value ΔP1. In short, the lowest pressure with no slip, as detected in the procedure of the control, is reflected on the clamping pressure so that the clamping pressure can be as low as possible within a range of no slip.

If the prerequisite control condition is satisfied in the state having the flag F set at "2", on the other hand, the decision of "F=2" holds at Step S3. In this case, it is decided (at Step S13) whether or not a preset period t3 has elapsed. This preset period t3 is sufficient for the clamping pressure to lower to a level according to the lowering command of the preset value A P2. In case the answer of Step S13 is NO because that period has not elapsed, therefore, this routine is once passed through without starting any new control for awaiting the lowering of the clamping pressure.

In case the preset period t3 has elapsed so that the answer of Step S13 is YES (at an instant d1 of FIG. 3), on the contrary, the flag F is set at "0" (at Step S14), and the routine advances to the aforementioned Step S4. Specifically, there are executed again a series of controls to output the command to lower the clamping pressure stepwise by the preset value ΔP1, to detect the state (or the slip) just before the macro slip, and to lower the clamping pressure by the preset value ΔP2 in case the state just before the macro slip is not detected. In short, there are executed again the controls to lower the clamping pressure so as to detect the slip from the state, in which the clamping pressure has been lowered by the preset value ΔP2.

The controls to lower and restore the clamping pressure are repeated while lowering the pressure to start the lowering of the clamping pressure, as described above. When either the state just before the macro slip is restored or the slip is caused according to either of the lowering controls, the answer of Step S5 is YES. This decision is indicated at an instant f1 in FIG. 3.

In case the answer of Step S5 is YES, there is outputted (at Step S15) a command to raise the clamping pressure stepwise by a preset value ΔP3. This rising width ΔP3 is set larger than either the preset value ΔP1 for lowering the clamping pressure to cause the slip or the sum of the preset value ΔP1 and the lowering width ΔP2 due to no slip. This setting is made to prevent the slip due to the inertial torque, which is caused by the rotation change accompanying the prompt increase in the clamping pressure or the stop of the slip.

On the basis of the detection of the slip, moreover, the slip staring time is determined (at Step S16). As described above, the decision of the slip holds if the slip extent or slip percentage grows to some value. Therefore, a temporal deviation is between the deciding instant of the slip and the starting instant of the actual slip. Thus, an instant e1 just before the decision of the slip, at which a slight deviation occurs between the gear ratio (as illustrated by a broken line in FIG. 3) determined from the past changing tendency and the actually measured gear ratio (as illustrated by a solid line in FIG. 3), is determined as the slip starting instant. Specifically, in the example shown in FIG. 3, the gear ratio γ has an increasing tendency, and this increasing tendency can be determined by detecting and comparing it sequentially. When the slip occurs as the clamping pressure lowers, on the contrary, the gear ratio exhibits a change different from the previous changing tendency (for the past t5 period from the present time, as illustrated in FIG. 3). Therefore, the instant (a preset period before the present instant), at which the deviation between the gear ratio in the non-slip state illustrated by the broken line in FIG. 3 and the measured gear ratio illustrated by the solid line exceeds a threshold value, can be determined as the slip starting instant.

As has been described with reference to FIG. 1, the drive line aimed at is provided with the oil pressure sensor 24, which detects the clamping pressure every moment. Therefore, the oil pressure at the slip starting time is determined (at Step S17) from the detected oil pressure value and the time determined at Step S16. After this, it is decided (at Step S18) whether or not a preset period t4 has elapsed. This preset period t4 is sufficient for the clamping pressure to reach the pressure raised by the command. In case the period has not elapsed so that the answer of Step S18 is NO, therefore, the flag F is set to "3" (at Step S19), and this routine is once passed through without performing any new control for awaiting the time lapse, i.e., the clamping pressure to reach the command value.

In the next cycle, therefore, the decision of "F=3" holds at Step S1, and the routine advances to Step S18. In short, it is not decided whether or not the prerequisite control condition is satisfied. This is because the slip has already been detected and the clamping pressure at the slip starting time has been determined, so that the clamping pressure is not lowered any more to cause the slip.

When the preset period t4 has elapsed so that the answer of Step S18 is YES (at an instant g1 of FIG. 3), a clamping pressure P2 is determined by adding the oil pressure corresponding to the road surface input to the clamping pressure based on the oil pressure at the slip starting time. On the basis of the clamping pressure P2, the map value is changed, and the flag F or the stored value is cleared (at Step S20). Specifically, the clamping pressure at the slip starting time contains the centrifugal oil pressure and is influenced by the elastic force of the spring built in the hydraulic actuator 16. Considering these pressure factors, therefore, a pressure having a safety factor of about 1 for the slip is determined from the pressure at the slip starting time. This is the clamping pressure based on the oil pressure at the slip starting time. With only this clamping pressure, the belt slip may be caused by the input resulting from the roughness of the road surface. The clamping pressure is set by adding the component corresponding to the road surface input to it.

With the aforementioned control, therefore, if no slip is detected in case the clamping pressure is lowered by a preset value, the clamping pressure is restored. It is, therefore, possible to prevent the situation, in which the clamping pressure excessively lowers or in which the macro slip is accordingly caused. In case the prerequisite control condition becomes unsatisfactory to stop the control in the procedure to detecting the slip starting pressure, on the other hand, the clamping pressure is lowered on the basis of the lowest value, which has been obtained till then for no slip. Therefore, the clamping pressure can be lowered without any useless control, that is, by making effective use of the data obtained in the control procedure. Considering the time difference between the occurrence and the detection of the actual slip, the pressure at a preset instant before the instant, at which the slip is detected, is employed the clamping pressure at the slip starting instant, so that the clamping pressure can be precisely set with reference to the slip limit pressure.

According to the control system of this invention constructed for performing the controls thus far described, in case the clamping pressure is lowered by a preset level so that no slip is detected, the clamping pressure is lowered and is lowered again from the starting pressure of the lowered clamping pressure to cause the slip. Therefore, it is possible to lower the clamping pressure efficiently for causing the slip. Here in this invention, the control to lower the clamping pressure subsequent to the case, in which the slip is not detected, may be performed not by lowering the lowering starting pressure but by making the lowering quantity more than the preceding one. In this case, the time period for the pressure to drop so low as to cause the slip may be elongated to some extent, but the clamping pressure can be properly set for the slip limit pressure. In case a slip is detected, moreover, the clamping pressure is stepwise raised to a higher level than that of the initial clamping pressure so that the clamping pressure can be promptly raised to prevent the excessive slip. Moreover, the clamping pressure can be set to correspond to the inertial torque so that the excessive slip can also be prevented in this respect.

Figure 4:
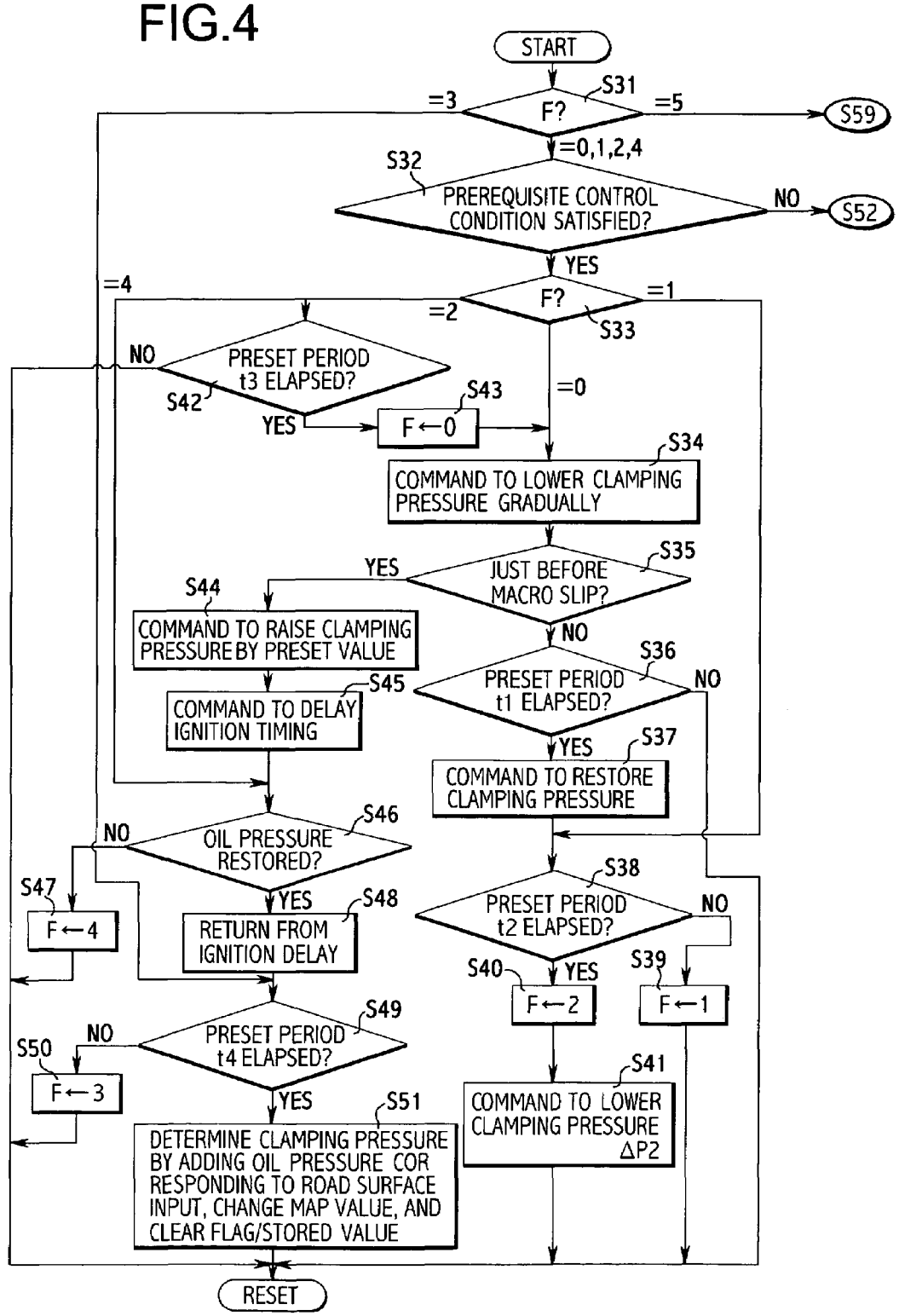
FIG. 4 is a diagram showing a portion of a flow chart for explaining another control example by the control system of this invention.
Figure 5:
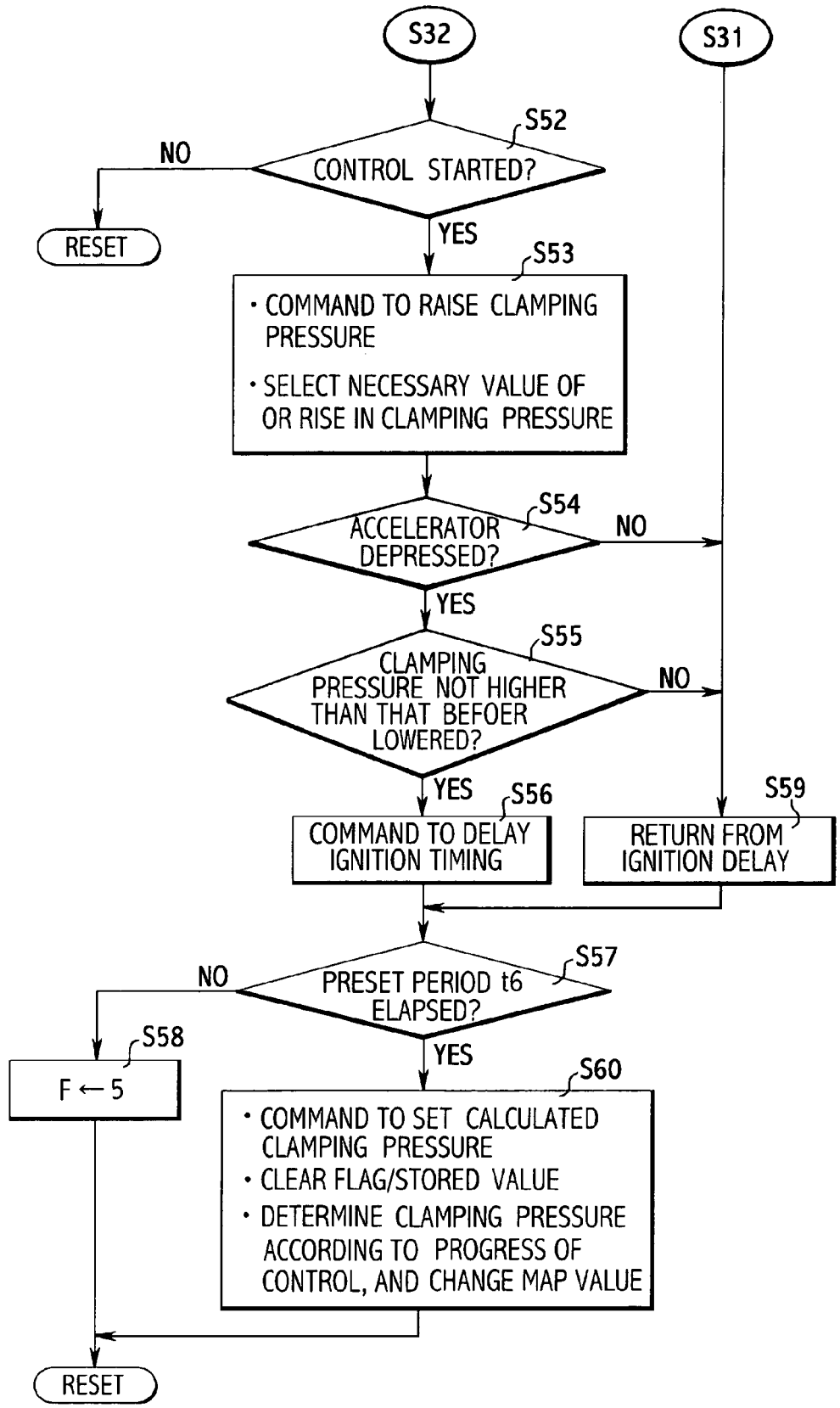
FIG. 5 is a diagram showing the other portion of the flow chart for explaining another control example by the control system of this invention.
Figure 6:
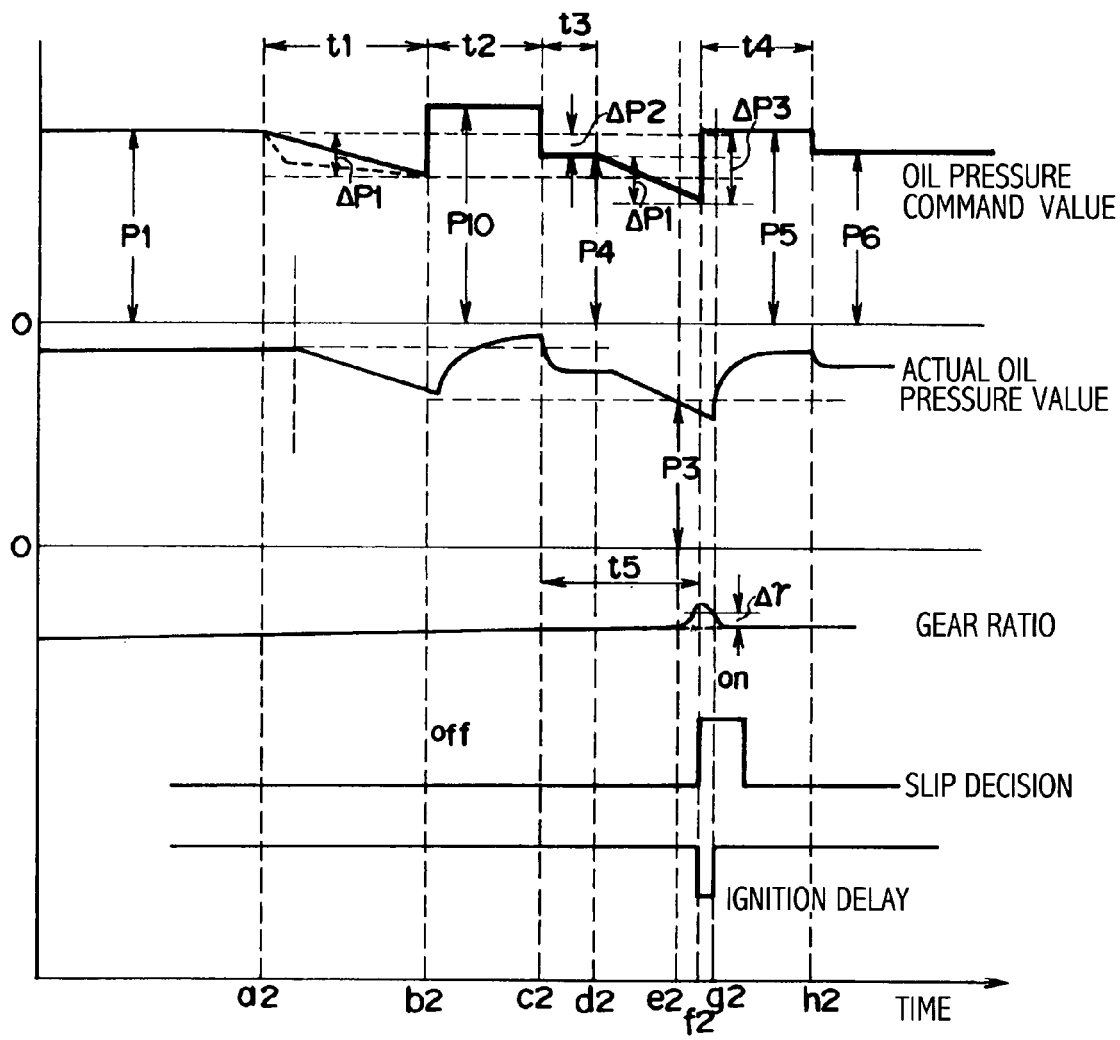
FIG. 6 is a diagram showing one example of a time chart of the case, in which the controls shown in FIG. 4 and FIG. 5 are executed.

Here will be described another example of the control by the control system according to this invention. FIG. 4 and FIG. 5 are flow charts for explaining the control example, and FIG. 6 is a time chart illustrating the changes in the oil pressure, the gear ratio and so on in case that control is performed.

In FIG. 4, the flag F is decided at first (at Step S31). This flag F is set at "0" to "5" according to the control progressing situation, as will be described hereinafter. At the beginning of the control start, the flag F is set at "0". In this case, it is decided (at Step S32) whether or not the prerequisite control condition is satisfied. This decision of this Step S32 is similar to that of Step S2 of the control example shown in FIG. 2.

In case the prerequisite control condition is satisfied so that the answer of Step S32 is YES, the flag F is decided again (at Step S33). Since the decision of "F=0" holds just after the control start, a gradually decreasing command to lower (or sweep down) the clamping pressure gradually is outputted (at Step S34). This occurs at an instant a2 in FIG. 6. This Step S34 is a substitution for Step S4 shown in FIG. 2. At Step S4 shown in FIG. 2, the command value is outputted to lower the clamping pressure stepwise. At Step S34 shown in FIG. 4, the lowering command value is gradually decreased to reduce the deviation between the command value and the actual clamping pressure (or the oil pressure).

After the lowering control of the clamping pressure was thus started, it is decided (at Step S35) whether or not the state is just before the macro slip, or whether or not a slip has occurred. This decision is similar to that of Step S5 shown in FIG. 2. In case the answer of Step S35 is NO, the lapse of the preset period t1 is awaited. In case the preset period t1 has passed so that the answer of Step S36 is YES, a command to restore the clamping pressure is outputted (at Step S37). These operations are similar to those of Step S6 and Step S7 of the control example shown in FIG. 2.

The command to restore the clamping pressure is outputted at an instant b2 of FIG. 6. This restoring command is to raise the clamping pressure stepwise. Moreover, the pressure restored is a pressure P10 higher than the pressure P1 before the lowering start. This higher pressure is intended to prevent the delay in the restoration of the clamping pressure and the occurrence of the slip to be caused the delay.

Next, the following operations are similar to those of the control example shown in FIG. 2: the decision (at Step S38) to decide whether or not the preset period t2 sufficient for restoring the clamping pressure has passed; if this answer is NO, the flag F is set at "1" (at Step S39), and this routine is then once passed through; in case the preset period t2 has elapsed (at an instant c2 of FIG. 6), the flag F is set at "2" (at Step S40), and a command signal to lower the clamping pressure by the preset value ΔP2 is outputted (at Step S41); the lapse of the preset period t3 is then awaited (at Step S41); and in case the preset period t3 has elapsed (at the instant d2 of FIG. 6), the flag F is set at "0" (at Step S43), and the command to lower the clamping pressure is outputted again (at Step S34).

Thus, either the state just before the macro slip or the slip occurs in the procedure, in which the gradual decrease and the restoration of the clamping pressure are repeated while lowering the clamping pressure by the preset level, and the answer of Step S35 is YES. This corresponds to an instant f2 of FIG. 6. In this case, a clamping pressure raising command is outputted to raise the clamping pressure by the preset value ΔP3 (at Step S44). This preset value ΔP3 is a value for setting the clamping pressure at a pressure P5 higher than the pressure (as indicated by P4 in FIG. 6) before the gradually lowering control of the clamping pressure having the slip is started. Simultaneously with this, there is executed (at Step S45) the control to lower the output torque of the engine 5 temporarily, that is, the control to delay the ignition timing in the engine 5. This is the control to lower the torque to be inputted to the continuously variable transmission 1 so as to avoid the belt slip accompanying the control delay of the oil pressure.

At the instant when the slip occurs, the gear ratio γ exhibits a change different from that of the preset period t5 before the slip instant. Therefore, the deviation between the gear ratio (as indicated by the broken line in FIG. 6) determined from the change for the preset period t5 just before and the measured gear ratio exceeds the threshold value Δγ, so that the slip can be decided. In this invention, therefore, it is arbitrary to perform in parallel both the aforementioned slip decision based on the slip extent or slip percentage and the slip decision based on the change in the gear ratio.

After the aforementioned ignition delaying command was outputted, it is decided (at Step S46) whether or not the clamping pressure (or the oil pressure) has restored a considerable level. This pressure is the pressure P3 at the instant when the answer of the slip decision is YES. Alternatively, the pressure is the one at the slip starting instant because the slip starting instant and the pressure at the instant can be determined as in the control example shown in FIG. 2. This pressure can be decided on the basis of the detected value of the aforementioned oil pressure sensor 24. In case the answer of Step S46 is NO, the flag F is set at "4" (at Step S47), and this routine is once passed through for continuing the restoring control. In this case, the decision of "F=4" is satisfied at Step S33 of the next cycle so that the routine advances immediately to Step S46 to decide the restoration of the oil pressure.

When the oil pressure rises as the time elapses so that the answer of Step S46 is YES, the ignition delay control having been executed to lower the engine torque is ended (at Step S48). In short, this is the return from the ignition delay control. This occurs at an instant g2 of FIG. 6.

After this, it is decided (at Step S49) whether or not the lapse time from the instant when the slip decision holds has reached the preset period t4. In case the preset period t4 has not elapsed, the flag F is set to "3" (at Step S50); and this routine is once passed through for awaiting the time lapse. In case the preset period t4 has elapsed, on the contrary, the clamping pressure is determined at a pressure P6 by adding the pressure corresponding to the road surface input to the slip limit pressure. At the same time, the map value is changed, and the flag and the stored value are cleared (at Step S51). This is an instant h2 of FIG. 6.

These controls of Steps S49, S50 and S51 are similar to those of Steps S18, S19 and S20 shown in FIG. 2. In this case, too, an instant e2 a preset period before the instant, when the slip decision holds, is determined as the slip starting instant as in the control shown in FIG. 2, and the oil pressure at the slip starting instant is determined from the detected value of the oil pressure sensor 24. A slip limit pressure of a safety factor of about "1" is determined considering the detected oil pressure, the centrifugal oil pressure, the spring force at the hydraulic actuator 16 and so on. Thus, the clamping pressure is determined by adding the pressure corresponding to the road surface input, to the slip limit pressure. Therefore, it is possible to set a clamping pressure as low as possible within the range of no slip.

In the control procedure thus far described, the prerequisite control condition may not be satisfied. This occurs, for example, in case the accelerator pedal is deeply depressed or in case the vehicle is abruptly decelerated. A control example of this case is shown in FIG. 5. The answer of Step S32 is NO, and it is decided (at Step S52) whether or not the control has been started. In case the control is not started yet so that the answer of Step S52 is NO, this routine is instantly passed through.

In case the control has already been started so that the answer of Step S52 is YES, on the contrary, the control to boost the clamping pressure for preventing the belt slip is executed. Specifically, there is selected (at Step S53) the higher pressure from the command to raise the clamping pressure by a preset value from the pressure at that instant and the necessary clamping pressure calculated on the basis of the input torque at that time and the running radii of the belt 17 with the pulleys 13 and 14.

Next, it is decided (at Step S54) whether or not the factor for having the prerequisite control condition dissatisfied is caused by the demand for increasing the engine output by depressing the accelerator pedal. In case the answer of Step S54 is YES, it is decided (at Step S55) whether or not the control to lower the clamping pressure has already been started, that is, whether or not the clamping pressure at that instant is at or lower than the level before the lowering start.

If the answer of Step S55 is YES, the situation is that the clamping pressure has lowered although the engine torque has been increased, so that the belt is liable to slip. Therefore, the control to delay the ignition timing is executed (at Step S56) to lower the engine torque. It is then decided (at Step S57) whether or not a preset period t6 has elapsed. This preset period t6 is sufficient for the clamping pressure to rise to the pressure selected at Step S53. In case the answer of Step S57 is NO, therefore, the routine is once passed through after the flag F is set to "5" (at Step S58).

In this case, the decision of "F=5" holds at Step S31 shown in FIG. 4. Therefore, the return control to quit the ignition delay control (at Step S59), and the routine advances to Step S57, at which the lapse of the preset period t6 is decided. Here, the routine also advances to Step S59, in case the accelerator pedal is not depressed so that the answer of Step S54 is NO and in case the clamping pressure is higher than the level before its lowering start so that the answer of Step S55 is NO. When the preset period t6 has elapsed so that the answer of Step S57 is YES, moreover, the command to set the clamping pressure determined by the calculation is outputted, and the flag F and the stored value are cleared. Moreover, the clamping pressure corresponding to the input torque at that instant is determined according to the control progressing situation, and the map value is changed on the basis of that clamping pressure (at Step S60). These controls are substantially identical to those of Step S12 shown in FIG. 2. In short, the clamping pressure is set by adding the oil pressure corresponding to the road surface input, to the lowest value just before the oil pressure, which has been lowered without any slip in the continuously variable transmission 1. This lowest value (i.e., the lowest value of this invention) may be either the measured oil pressure detected by the oil pressure sensor or the oil pressure, which has been determined by operations from the lowering gradient of the oil pressure and the preset period t1 shown in FIG. 6.

Even in the case of the construction to execute the controls shown in FIG. 4 and FIG. 5, therefore, the so-called "slip limit pressure" of the clamping pressure can be determined without causing the overshoot of the clamping pressure lowering control or its accompanying excessive slip, thereby to set a clamping pressure as low as possible within a range to cause no slip based on the slip limit pressure. In case the clamping pressure is lowered for determining the slip limit pressure, the aforementioned example is constructed to hold the lowering gradient constant. Alternatively, the lowering gradient may be changed at a plurality of stages.

Figure 7:
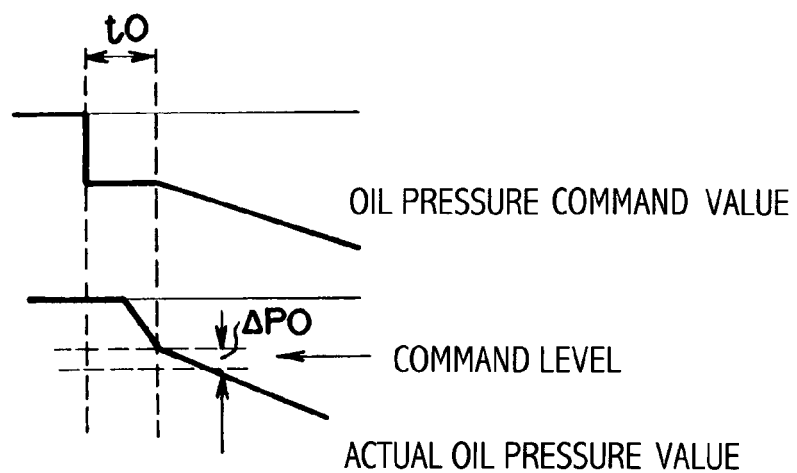
FIG. 7 is a partial time chart showing the changes in the command value and the actual oil pressure and explaining another example of a pressure lowering command.

For example, as illustrated by the broken line in FIG. 6, the controls may be executed by enlarging the gradient at the beginning of the lowering start of the clamping pressure and by reducing the lowering gradient after a preset period. Alternatively, a command signal to lower the clamping pressure stepwise may also be outputted at first, as illustrated as a portion of the time chart in FIG. 7. Then, the command signal may be held for a preset period t0, and the clamping pressure may be lowered with a preset small lowering gradient. In this case, the change in the actual oil pressure can be reflected on the preset period t0. For example, the instant when the deviation between the command value and the actual oil pressure becomes the preset value ΔP may be the lapse instant of the preset period to so that the clamping pressure may be lowered from that instant with a preset small gradient.

In any of these cases, it is possible to shorten the time period till the target lowering width ΔP1 is reached and to reduce the changing range of the clamping pressure just before the target value is approached thereby to avoid or suppress the overshoot in advance. As a result, it is possible to improve the control responsibility. It is also possible to avoid and suppress the return response delay from the clamping pressure lowering control and the accompanying macro slip in advance.

In the case of the construction to execute the controls shown in FIG. 4 and FIG. 5, moreover, the command signal is outputted to return the clamping pressure stepwise to a higher pressure than the pressure at the lowering starting time if the slip decision is not satisfied even with the lowering in the clamping pressure. In this respect, too, it is possible to avoid or suppress the return delay or its accompanying macro slip.

In case the decision of the slip or the decision of the state just before the macro slip holds so that the clamping pressure is raised, moreover, the control to lower the input torque to the continuously variable transmission 1 is additionally executed. Even with a delay in the pressure control, it is possible to avoid or suppress the macro strip.

Figure 8:
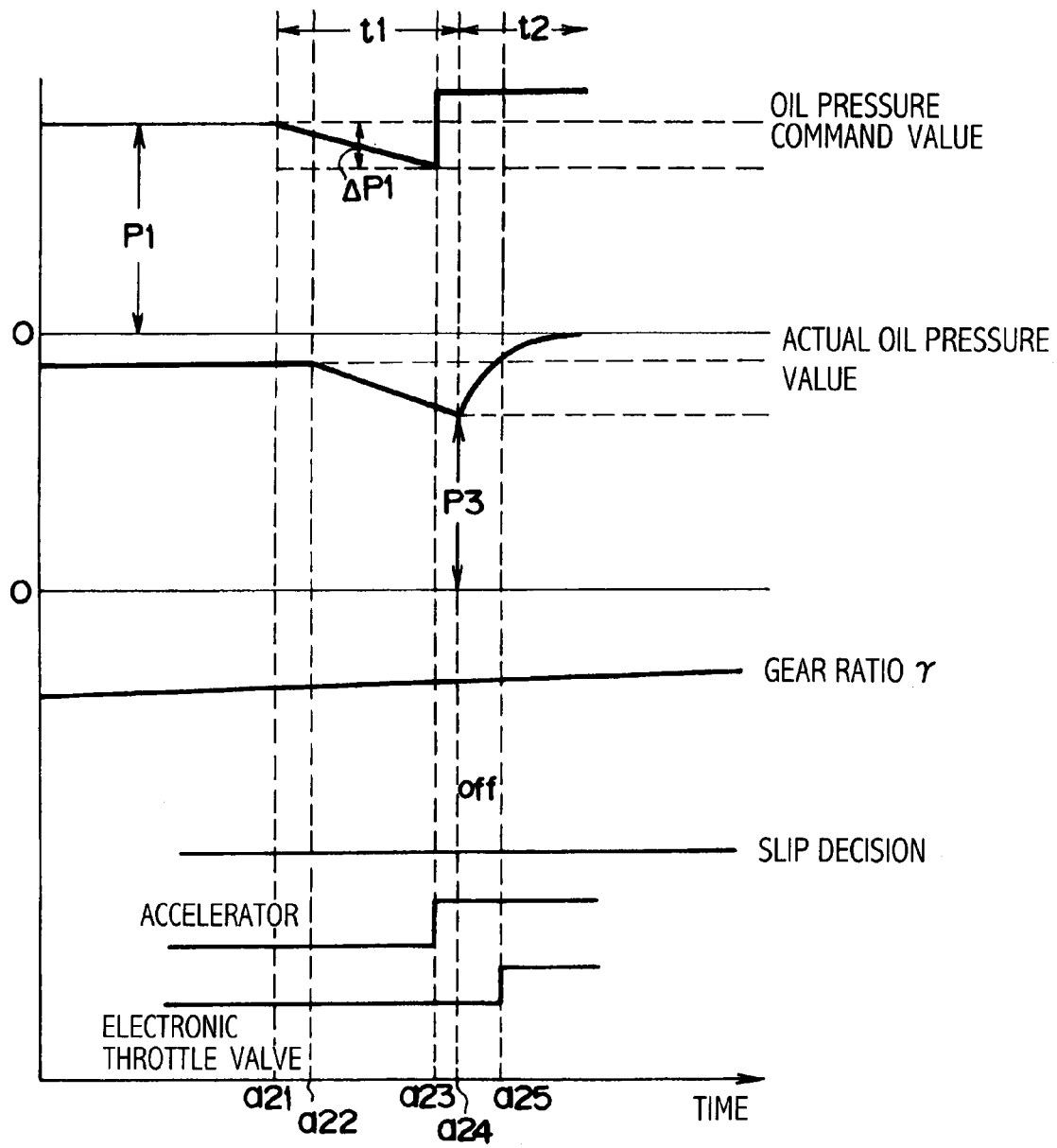
FIG. 8 is a time chart illustrating one example of the control of an electronic throttle valve of the case, in which prerequisite control conditions are not satisfied by the depression of an accelerator pedal.

Here will be described a control example of the case, in which the increase in the engine output is demanded in the procedure to lowering the clamping pressure by the preset value $\Delta P1$ so that the demand causes a dissatisfaction of the prerequisite control condition. FIG. 8 shows an example, in which the accelerator pedal is depressed in the procedure to lowering the clamping pressure gradually from the preset pressure P1. At an instant a21, the command signal to lower the clamping pressure is outputted. At an instant a22 just after the instant a21, the actual clamping pressure begins to lower. Substantially simultaneously as the accelerator pedal is depressed at an instant a23 so that the so-called "accelerator ON" is detected, a command signal to raise the clamping pressure stepwise is outputted.

The aforementioned engine 5 shown in FIG. 1 can be exemplified by an engine provided with an electronic throttle valve for controlling the throttle opening electrically. In the example shown in FIG. 8, the electronic throttle valve (as also called the "electro-thro") is activated with a delay from the depression of the accelerator pedal. At the instant a23, therefore, the degree of opening of the electro-thro is kept as before. On the other hand, the clamping pressure still has a lowering tendency inevitably because of the response delay. At an instant a24 just after this, the clamping pressure begins to rise. This lowest value is indicated by P3. As a result, the actual clamping pressure rises to the pressure P1 before the lowering start. At this instant a25, the opening of the electro-thro is raised according to the accelerator opening. By this control, therefore, the input torque to the continuously variable transmission 1 does not rise till the clamping pressure is restored, so that the macro slip at the continuously variable transmission 1 can be avoided or suppressed.

The control system according to this invention is constructed to determine the slip limit pressure of the power transmission mechanism such as the continuously variable transmission 1, so that the pressure for setting the transmission torque capacity such as the clamping pressure or the applying pressure may be set on the basis of that slip limit pressure to a proper pressure as low as possible within a range of no slip. In the procedure to determine the slip limit pressure, therefore, the pressure such as the clamping pressure is lowered. If an unsupposed sate such as the response delay of the control or the disturbance occurs, therefore, an excessive slip (i.e., the macro slip) may occur. In order to prevent this excess slip in the unsupposed state in advance, the control system of this invention may be constructed to execute the following controls.

Figure 9:
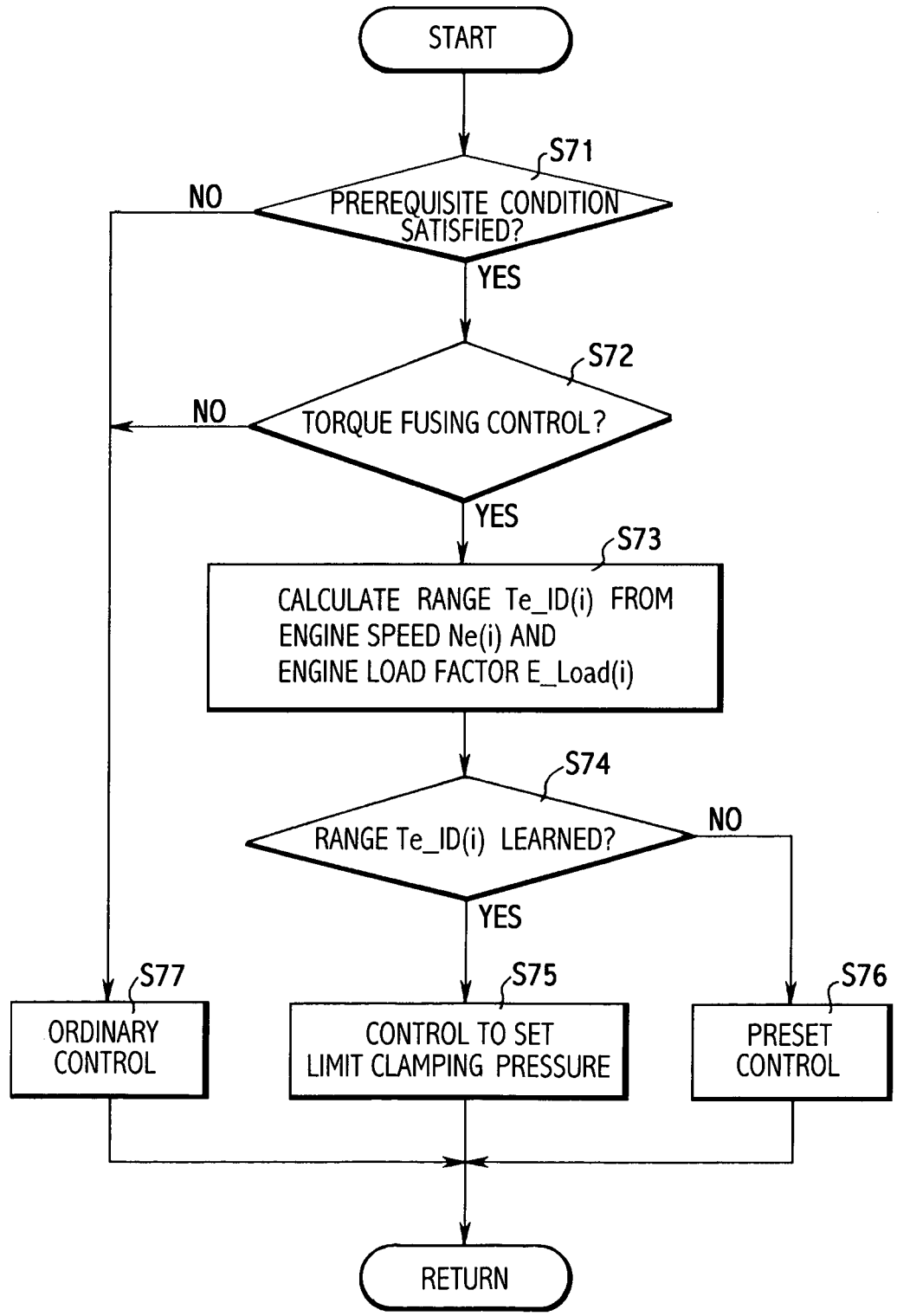
FIG. 9 is a flow chart for explaining still another control example by the control system of this invention.

FIG. 9 is a flow chart showing an example of the control. First of all, it is decided (at Step S71) whether or not the prerequisite condition of the control is satisfied. This operation of Step S71 is similar to that of Step S2 shown in FIG. 2 or Step S32 shown in FIG. 4. In case the answer of Step S71 is YES, it is decided (at Step S72) whether or not a torque fusing control is being executed.

This torque fusing control is one to limit the torque to act on the continuously variable transmission 1 with the clutch arrayed in tandem with respect to the continuously variable transmission 1. In case the torque to act on the transmission line increases, the torque fusing control sets the transmission torque capacity between the continuously variable transmission 1 and the lockup clutch 3, i.e., the clamping pressure and the applying pressure so that the slip may occur at the lockup clutch 3 prior to the continuously variable transmission 1, for example. In other words, the torque fusing control reduces the margin of the transmission torque capacity till the slip occurs, not at the continuously variable transmission 1 but at the lockup clutch 3.

If this torque fusing control is executed, the lockup clutch 3 slips to limit the torque to act on the continuously variable transmission 1, even if a high torque is caused to act by the disturbance in the procedure to lower the belt clamping pressure in the continuously variable transmission 1. As a result, it is possible to lower the clamping pressure to the slip limit pressure. In case the answer of Step S72 is YES, therefore, a range Te_ID(i) is calculated (at Step S73) from an engine speed Ne(i) and an engine load factor E_load(i) at that instant.

This range is each of the ranges divided in a matrix with parameters of the engine load factor E_load(i) and the engine speed Ne(i), by dividing the engine load factor E_load(i) into a plurality sections and taking them on an ordinate for example, and by dividing the engine speed Ne(i) into a plurality of sections and taking them on an abscissa. This is because the proper value or learned value of the clamping pressure is determined not for every input torques but for every ranges.

Next, it is decided (at Step S74) whether or not the calculated range Te_ID(i) is the learned range having the learned value. In case the answer of Step S74 is YES, the control to set the limit clamping pressure is executed (at Step S75) by utilizing that learned value. For example, the clamping pressure is set by adding the learned value to the pressure, which is determined on the basis of the input torque and the gear ratio at that instant.

In case the running state at that instant has entered an unlearned range having no learned value obtained so that the answer of Step S74 is NO, on the contrary, a preset control is executed (at Step S76) to achieve the learned value. This preset control will be described hereinafter. In case the prerequisite condition is not satisfied so that the answer of Step S71 is NO and in case the torque fusing control is not executed so that the answer of Step S72 is NO, on the contrary, an ordinary control is executed (at Step S77) to use the clamping pressure as either the line pressure (or the initial pressure of the hydraulic control device for the continuously variable transmission 1) or its corrected pressure.

Figure 10:
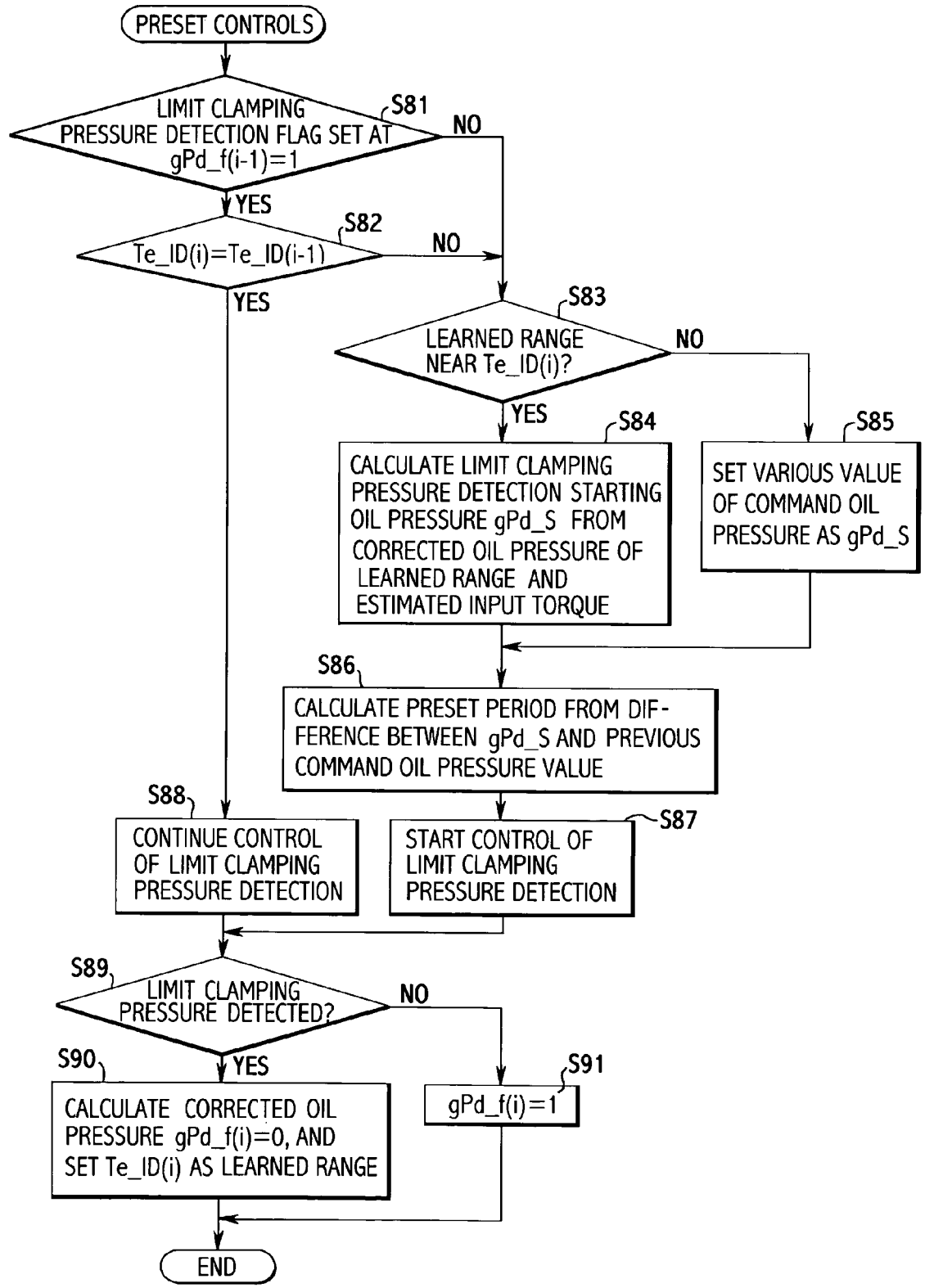
FIG. 10 is a flow chart showing the contents of a preset control in the flow chart shown in FIG. 9.

FIG. 10 shows an example of the preset control for detecting the limit clamping pressure. First of all, it is decided (at Step S81) whether or not a limit clamping pressure detection execution flag gPd_l(i−1) is set at "1". This flag gPd_f(i−1) is set at "0", in case the detection of the limit clamping pressure is ended, but at "1" during the detection. If the limit clamping pressure is being detected so that the answer of Step S81 is YES, therefore, it is decided (at Step S82) whether or not the running state is kept. Specifically, it is decided whether or not the range Te_ID(i) detected at this time is equal to the preceding range Te_ID(i−1).

In case the answer of Step S82 is NO and in case the answer of Step S81 is NO, it is decided (at Step S83) whether or not the learned range is near or adjacent to the range Te_ID(i) at present. In case the learned range exists near or adjacent so that the answer of Step S83 is YES, an oil pressure gPD_S at the limit clamping pressure detection starting time is calculated (at Step S84) on the basis of the learned value and the estimated input torque. In case the learned range does not exist near or adjacent, on the contrary, the preceding command value of the clamping pressure is set (at Step S83) as the oil pressure gPD_S at the limit clamping pressure detection starting time.

Then, the preset period is calculated (at Step S86) from the oil pressure gPD_S at the starting time and the previous command oil pressure value. This preset period is sufficient for the actual oil pressure to stabilize at the value of the control starting time. After lapse of the preset period, the detection control of the limit clamping pressure is started (at Step S87). In short, the detection control of the limit clamping pressure is to lower the clamping pressure gradually to cause a slight slip in the continuously variable transmission 1 or to come into the state just before the macro slip thereby to calculate the clamping pressure on the basis of the oil pressure at that instant.

After the control was thus started and before the detected value is obtained, the flag gPd_f(i) is set at "1" so that the answer of Step S81 is YES. Without any change in the running state, therefore, the detection control of the limit clamping pressure, as affirmed at Step S82, is continued (at Step S88). It is decided (at Step S89) whether or not the limit clamping pressure has been detected. In case the answer of Step S89 is YES, the flag gPd_f(i) is set at "0", and the correction oil pressure component is calculated on the basis of the detected value. The calculated value is held as the learned value of the running range Te_ID(i), and this range Te_ID(i) is set as the learned range (at Step S90). In case the answer of Step S89 is NO, the flag gPd_f(i) is set at "1" (at Step S91), and the routine is then once passed through.

Figure 11:
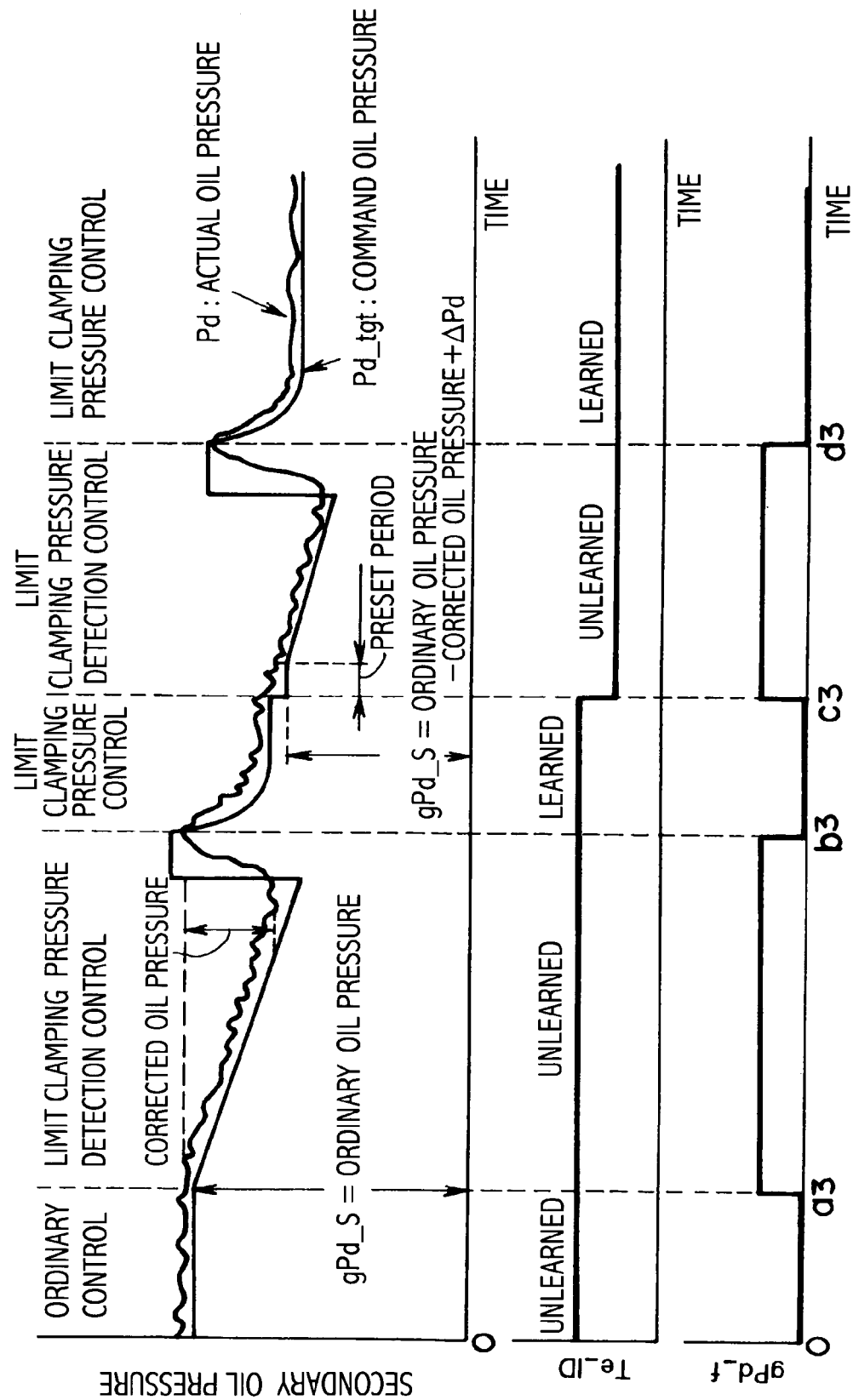
FIG. 11 is a diagram showing one example of the time chart of the case, in which the controls shown in FIG. 9 and FIG. 10 are performed.

FIG. 11 illustrates a time chart of the case, in which the controls shown in FIG. 9 and FIG. 10 are executed. In FIG. 11, the "secondary oil pressure" is the oil pressure to be pumped to and from the hydraulic actuator 16 on the side of the driven pulley 14 shown in FIG. 1, and corresponds to the clamping pressure. In the example shown in FIG. 11, the running state is in the unlearned range, and the prerequisite control condition holds in that state. At an instant a3, the control is started. The flag gPd_f(i) is set at "1", and the clamping pressure command value and the clamping pressure begin to become gradually lower.

As a result, the slight slip is detected, or the state just before the macro slip is detected. Then, the correction oil pressure is determined on the basis of the oil pressure at that instant. In order to eliminate the slip, the clamping pressure is once stepwise raised and is set as the learned range (at an instant b3). Here, the detected value is obtained so that the flag gPd_f(i) is set at "0". After this, the control to set the limit clamping pressure is executed by using the learned value. In other words, the clamping pressure is gradually lowered toward the pressure based on the learned value.

When the running state thus comes into the unlearned range (at an instant c3) with the clamping pressure being set at a low pressure based on the learned value, a command value to set the limit clamping pressure detection starting oil pressure gPD_S is outputted, and the flag gPd_f(i) is set at "1". Here, the limit clamping pressure detection starting oil pressure gPD_S is calculated, as shown in FIG. 11, by subtracting the correction oil pressure from the ordinary oil pressure and by adding the preset value ΔPd to that difference.

Awaiting the lapse of a preset period sufficient for the actual oil pressure to reach the starting oil pressure gPD_S, the clamping pressure is gradually lowered. When the state just before the slight slip or the macro slip is detected, moreover, the correction oil pressure is determined on the basis of the oil pressure at that instant, and the clamping pressure is once stepwise raised so that the range is set as the learned range. Moreover, the flag gPd_f(i) is set to "0" (at an instant d3). These operations are similar to those of the aforementioned control at the instant c3.

In the procedure of the aforementioned control accompanied by the lowering of the clamping pressure, there is executed the torque fusing control to set the margin for the slip of the lockup clutch 3 arrayed in tandem with respect to the continuously variable transmission 1, smaller than the margin for the slip of the clamping pressure in the continuously variable transmission 1. Even if an event for the input torque to increase midway of the control occurs, therefore, the slip of the lockup clutch 3 occurs prior thereby to limit the torque to the continuously variable transmission 1, so that the excessive slip in the continuously variable transmission 1 is prevented or suppressed.

In case the slip limit pressure (i.e., the limit clamping pressure matching the input torque) is to be determined by lowering the clamping force on the basis of the oil pressure to be fed to the actuator 16 on the side of the aforementioned driven pulley 14 and by detecting the resultant slip, the detection precision is influenced by the response delay or the change in the gear ratio if in the gear change. Therefore, the control system of this invention is constructed to execute the controls, as described in the following. Here, these following controls can be executed together with the aforementioned individual controls within the range, which does not conflicting the aforementioned individual controls.

Figure 12:
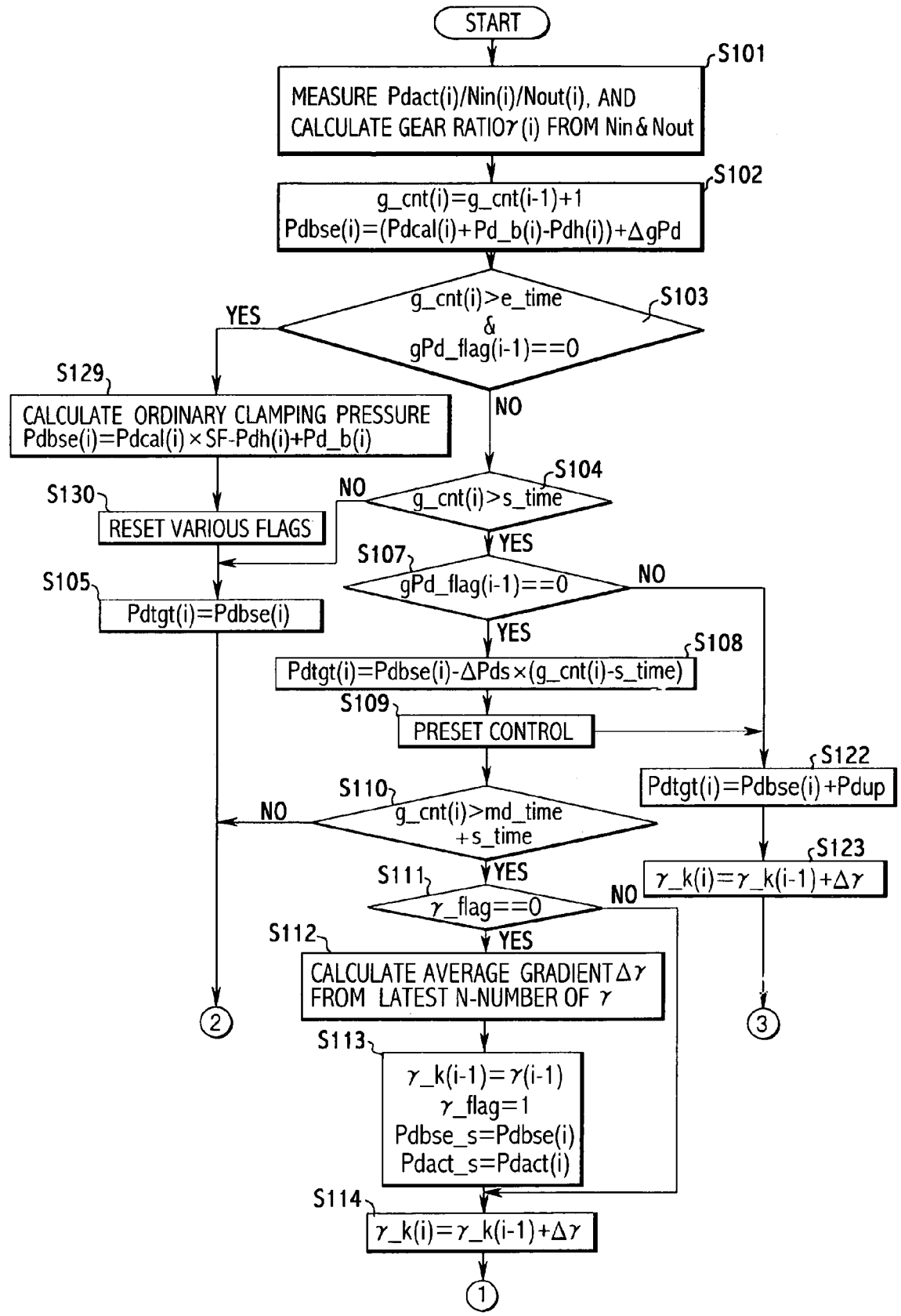
FIG. 12 is a diagram showing a portion of the flow chart for explaining still another control by the control system of this invention.
Figure 13:
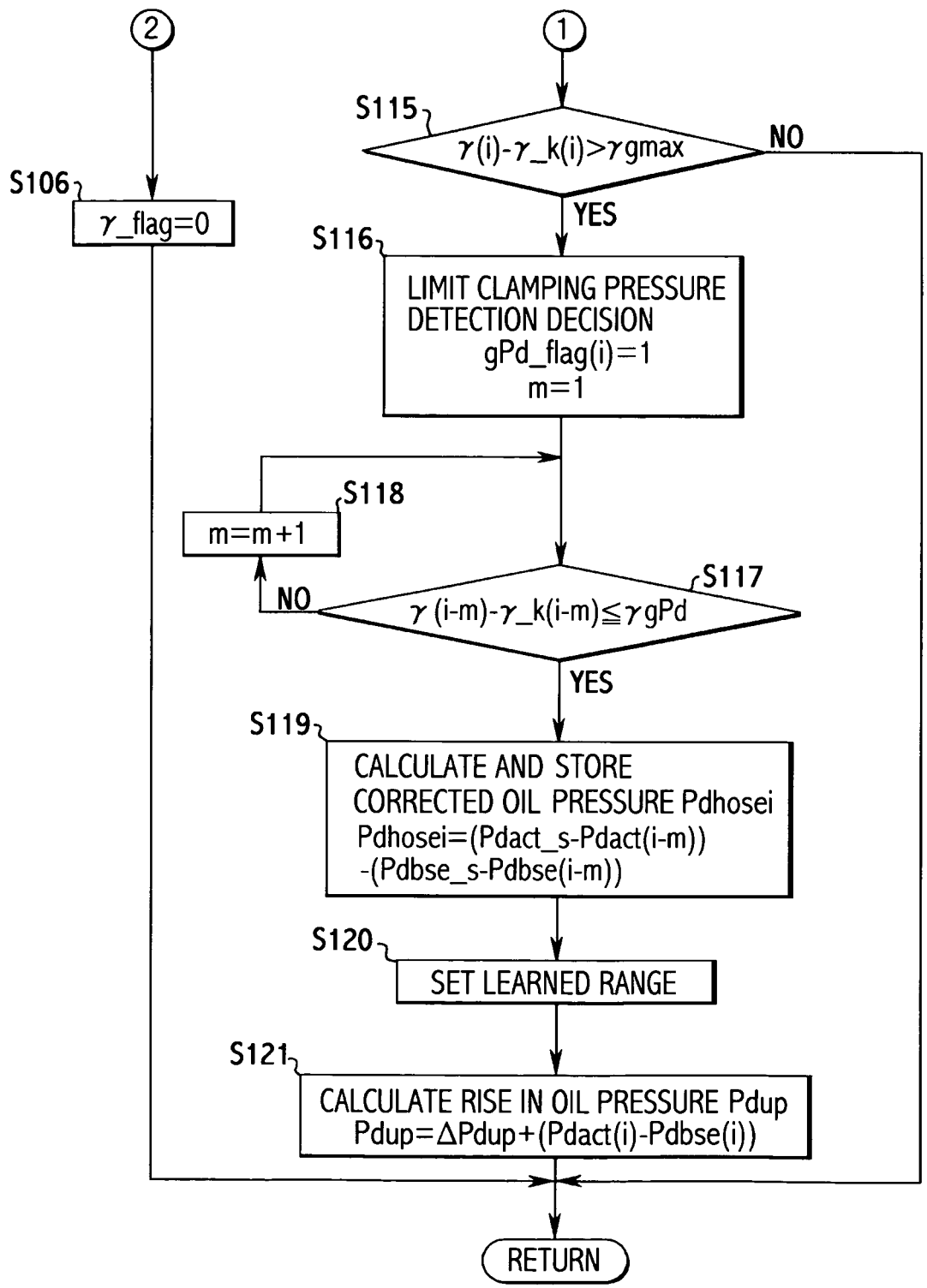
FIG. 13 is a diagram showing one portion subsequent to the flow chart shown in FIG. 12.
Figure 14:
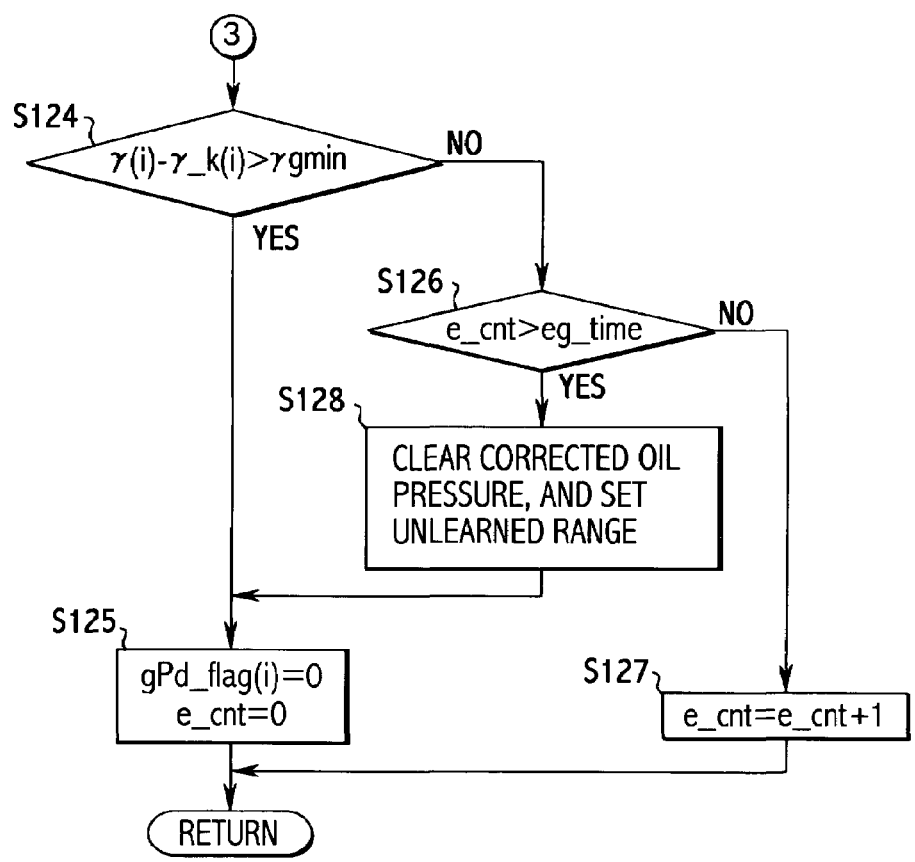
FIG. 14 is a diagram showing the other portion subsequent to the flow chart of FIG. 12.

FIG. 12 to FIG. 14 are flow charts showing the control example. First of all, an actual oil pressure Pdact(i), an input speed Nin(i) and an output speed Nout(i) in the actuator 16 on the side of the follower pulley 14 are measured, and a gear ratio γ(i) is calculated on the basis of the input speed Nin(i) and the output speed Nout(i) (at Step S101). Next, a counter (i.e., the limit clamping pressure start counter) g_cnt for measuring the time period after the detection control of the limit clamping pressure was started is incremented, and a lowering starting basic pressure Pdbse(i) is calculated (at Step S102).

This lowering starting basic pressure Pdbse(i) is an oil pressure command value to set the clamping pressure necessary for transmitting the input torque at that instant without any slip, and is calculated, as follows:

$$Pdbse(i)=Pdcal(i)+Pd\_b(i)-Pdh(i)+\Delta gPd.$$

Here, the term Pdcal(i) designates a theoretical clamping pressure, which is calculated on the basis of the input torque, the gear ratio (or the running radii of the belt 17) and the frictional coefficient between the belt 17 and the individual pulleys 13 and 14. Moreover, the term Pd_b(i) designates a variety of dispersion correction oil pressures such as the individual variations of the hydraulic control system. Moreover, the term Pdh(i) designates a hard correction oil pressure, which can be determined by the centrifugal oil pressure to be established in the actuator 16 on the side of the follower pulley 14 and the oil pressure corresponding to the elastic force (or the compression load) of a return spring built in that actuator 16. Moreover, the term ΔgPd designates an initially increased oil pressure, that is, an oil pressure, which is preset estimating the safety for no slip.

Next, it is decided (at Step S103) whether or not the value of the counter g_cnt exceeds a preset value e_time specifying the end time, and whether or not the previous value gPd_flag (i) of the limit clamping pressure detection flag gPd_flag is at "0". The preset value e_time is set for limiting the continuation period of the control so that it may not be influenced by the gear change in the procedure to detect the slip limit pressure by lowering the clamping pressure or by the disturbances, or so that the detection precision may not be accordingly degraded. That preset value e_time corresponds to the aforementioned preset period t1 shown in FIG. 3 or FIG. 6.

Moreover, the limit clamping pressure detection flag gPd_flag is set to "1", when the slip in the continuously variable transmission 1 is detected so that the control to restore the lowered clamping pressure is executed, and is set at "0" at the beginning.

At the beginning of the control start, therefore, the answer of Step S103 is NO. In this case, it is decided (at Step S104) whether or not the lapse time from the control start has elapsed over a preset period s_time, that is, whether or not the value of the counter g_cnt has exceeded the preset value s_time. Here, the preset period s_time is preset as the period after the decision of the control start held for ensuring the stable state of the clamping pressure and before the decision is fixed to output the command to lower the clamping pressure.

In case the answer of Step S104 is NO, the command signal to lower the clamping pressure is not outputted, but the state before the control start is kept. Therefore, the lowering starting basic oil pressure Pdbse(i) calculated at Step S102 is adopted (at Step S105) as the target oil pressure Pdtgt(i) of the actuator 16 on the side of the aforementioned follower pulley 14. Then, the routine advances to Step S106 shown in FIG. 13, at which a flag γ_flag is reset to zero, and the routine is returned. In short, the routine is once ended. Here, the flag γ_flag of Step S106 is the so-called "estimated gear ratio calculation flag", which is set to "1" when the command signal to lower the clamping pressure is outputted and when the calculation of the gear ratio γ is started after lapse of a preset period. At Step S106 at the beginning of the control start, therefore, the "empty control" is executed because the estimated gear ratio calculation flag γ_flag is still at "0".

When the preset period s_time elapses after the control start, on the other hand, the answer of Step S104 is YES. This occurs at an instant a4 in the time chart of FIG. 15. In this case, it is decided (at Step S107) whether or not the limit clamping pressure detection flag gPd_flag(i−1) has been set at "0" just before the present instant. At the beginning of the control start without any output of the command signal to lower the clamping pressure, no slip usually occurs. Therefore, this limit clamping pressure detection flag gPd_flag is set at "0" so that the answer of Step S107 is YES. Therefore, a command signal to lower the clamping pressure with a preset gradient ΔPds is outputted (at Step S108). Specifically, the target value Pdtgt(i) of the actuator 16 on the side of the follower pulley 14 is set, as follows:

$Pdtgt(i)=Pdbse(i)-\Delta Pds*(g\_cnt(i)-s\_time).$

In other words, the clamping pressure is lowered by ΔPds for every cycle times for executing the routines shown in FIG. 12 to FIG. 14.

After this, a preset control is executed (at Step S109). This control of Step S109 contains the decision on whether or not the slip has occurred in the continuously variable transmission 1 in the procedure to lower the clamping pressure gradually, as described above, and the control of the case, in which the clamping pressure reaches a preset lower limit while no occurrence of the slip being detected. This control will be described in detail hereinafter.

In case the preset control at Step S109 has failed to detect the slip of the continuously variable transmission 1, the command signal to lower the clamping pressure gradually is continuously outputted. In this case, it is decided (at Step S110) whether or not the lapse time period from the control start, i.e., the value g_cnt(i) of the counter g_cnt has elapsed over the time period of the sum of the preset period s_time and a dead period md_time. This dead period md_time is the so-called "response delay period of the oil pressure" after the command to lower the clamping pressure was outputted and before the actual oil pressure in the actuator 16 on the side of the follower pulley 14, that is, the actual clamping pressure begins to drop, and is set as a constant value or a map value.

In case the answer of Step S110 is NO, the actual clamping pressure does not lower yet. Therefore, the routine advances to Step S106 shown in FIG. 13, at which the estimated gear ratio calculation flag γ_flag is reset to zero and is then returned. In short, this routine is once ended. In case the dead period md_time has elapsed, on the contrary, the answer of Step S110 is YES. This occurs at an instant b4 of FIG. 15. In this case, it is decided (at Step S111) whether or not the estimated gear ratio calculation flag γ_flag is at "0". In short, it is decided whether or not the actual clamping pressure has already lowered.

Figure 15:
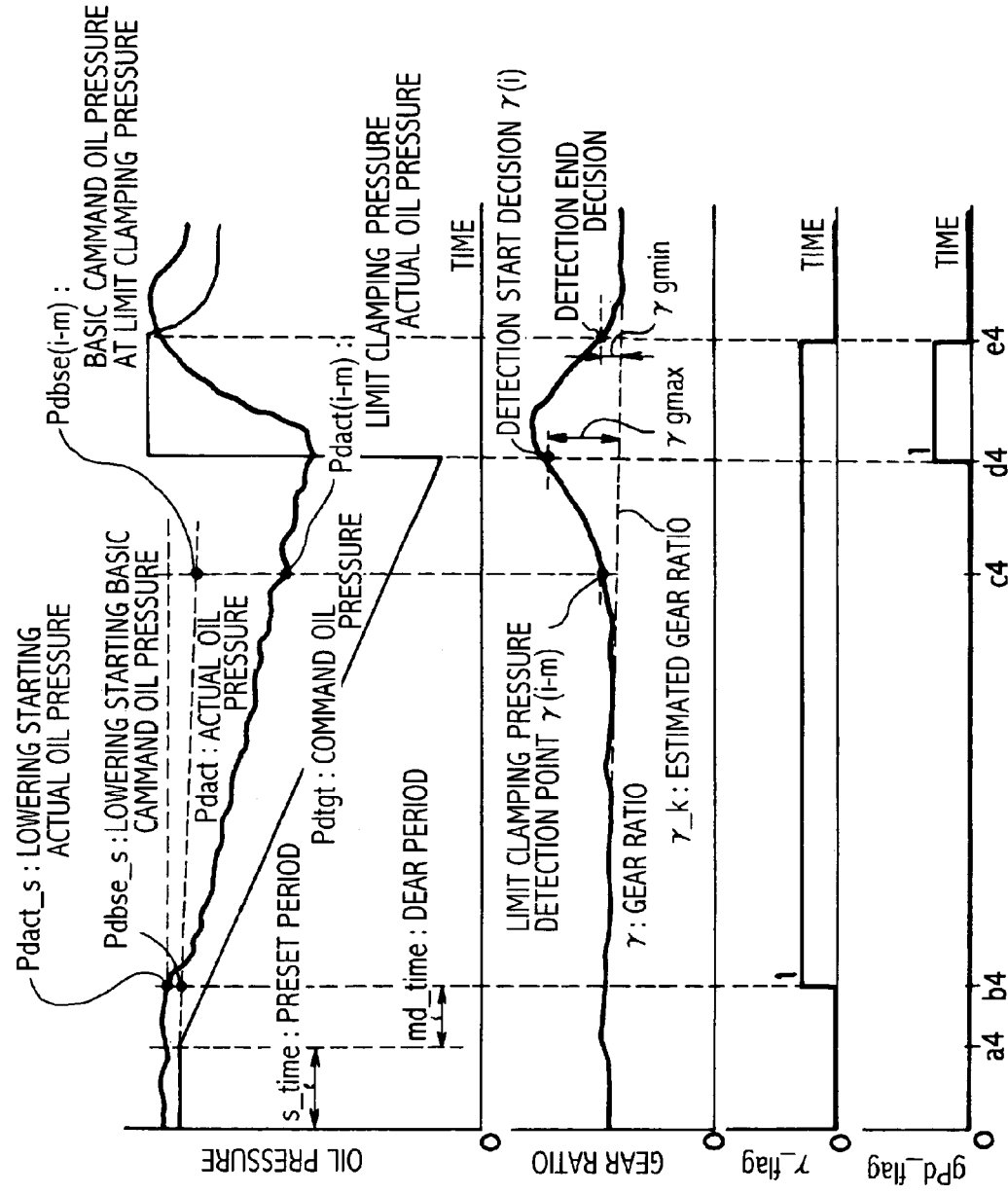
FIG. 15 is a time chart illustrating changes in the oil pressure, the gear ratio and so on of the case, in which the controls shown in FIG. 12 to FIG. 14 are performed.

At the beginning of the control start, all the flags are set at "0" so that the answer of Step S111 is YES. In other words, the state affirming the answer of Step S111 is the state, in which the actual clamping pressure is not lowered for the slip limit pressure detection, or in which the substantial control is not started. In this state, moreover, the average gradient Δγ is calculated (at Step S112) from the latest (i.e., just before the present instant) N-number of gear ratios γ. The operation of this Step S112 is executed before the actual clamping pressure does not begin to lower. If the average gradient Δγ takes a preset positive or negative value, therefore, an up or down gear change has occurred during the execution of the detection control of the slip limit pressure shown in FIG. 12 to FIG. 14. Here, the time chart of FIG. 15 illustrates the state of an upshift, in which the gear ratio γ slightly lowers.

Then (at Step S113): the actual gear ratio γ(i−1) at that instant is adopted as the estimated gear ratio γ_(i−1) at an instant once before that instant (i.e., at an instant just before); the estimated gear ratio calculation flag γ_flag is set to "1"; the oil pressure Pdbse(i) is adopted as the lowering starting basic oil pressure Pdbse_s; and the actual oil pressure Pdact(i) at that instant is adopted as an actual oil pressure Pdact_s of the actuator 16 on the side of the follower pulley 14 at the lowering starting time. Subsequently, the estimated gear ratio γ_k(i) at the present instant is calculated from the estimated gear ratio γ_k(i−1) just before and the average gradient Δγ. This calculation is exemplified by:

$\gamma\_k(i)=\gamma\_k(i-1)+\Delta\gamma.$

The estimated gear ratio γ_k(i−1) thus determined and the gear ratio γ(i) determined as the ratio of the input/output speed are compared (at Step S115). Specifically, it is decided whether or not the difference (γ(i)−γ_k(i−1)) is larger than a decision threshold value γgmax. In case the answer of Step S115 is NO, no slip has occurred in the continuously variable transmission 1. Therefore, the routine is returned without any control. In case the answer of Step S115 is YES, on the contrary, the actual gear ratio γ(i) is seriously different from the value γ_k(i−1) estimated as the gear ratio in the non-slip state. Therefore, it is decided that the slip has occurred, and the limit clamping pressure detection decision holds (at Step S116). This occurs at an instant d4 in the time chart of FIG. 15. Specifically, the limit clamping pressure detection flag gPd_flag(i) is set to "1", and a variable m is set to "1". Here, this variable m is used for retroacting to the past detection instant.

The aforementioned decision threshold value γgmax is set at such a considerably large value that the temporary disturbance or change of the gear ratio γ may not be misjudged as the occurrence of the slip. Therefore, the actual slip has already occurred before the difference between the gear ratio γ and the estimated gear ratio γ_k(i−1) exceeds the decision threshold value γgmax. In other words, it can be decided that the change in the gear ratio γ till the difference between the gear ratio γ and the estimated gear ratio γ_k(i−1) exceeds the decision threshold value γgmax is caused by the slip. By comparing the gear ratio γ retroactively with the estimated gear ratio γ_k, therefore, it is possible to specify the instant when the slip actually occurred.

At Step S117, therefore, the gear ratio γ and the estimated gear ratio γ_k are compared retroactively to the instant just before the instant when the decision of Step S116 is made after the affirmation of Step S115. In other words, it is decided whether or not the difference between the gear ratio γ(i−m) of the m-times before and the estimated gear ratio γ_k(i−m) is at or less than a preset threshold value γgPd. This threshold value γgPd is smaller than the decision threshold value γgmax at Step S115.

In case the answer of Step S117 is NO, it implies that the difference between the gear ratio γ(i−m) and the estimated gear ratio γ_k(i−m) is so large that the instant specified by the variable m has elapsed by some period from the occurrence of the slip. In this case, therefore, the variable m is incremented (at Step S118), and the routine returns to Step S117, at which it is decided again whether or not the difference between the gear ratio γ(i−m) and the estimated gear ratio γ_k(i−m) is at or lower than the threshold value γgPd. In other words, the decision instant sequentially retroacts till the difference between the gear ratio γ(i−m) and the estimated gear ratio γ_k(i−m) becomes the threshold value γgPd or less.

These decisions are repeated till the answer of Step S117 becomes affirmative. Specifically, the slip occurred in the continuously variable transmission 1 at the instant (i.e., at the instant c4 in the time chart of FIG. 15), which is specified by the variable m when the answer of Step S117 is YES. Therefore, a correction oil pressure Pdhosei is calculated on the basis of the actual oil pressure and the basic oil pressure for the clamping pressure at the past instant specified by that variable m and is stored (at Step S119).

This correction oil pressure Pdhosei is determined, for example, by subtracting the difference between a basic oil pressure Pdbse_s at the control starting time and the basic command oil pressure Pdbse(i−m) at the instant c4, as specified by the variable m, from the difference between the actual oil pressure Pdact_s at the control starting time and the actual oil pressure Pdact(i−m) at the instant c4, as specified by the variable m. Here, the difference of those basic oil pressures Pdhosei is made as a result that the running radii of the belt 17 with the pulleys 13 and 14 have changed according to the gear change. Moreover, the correction oil pressure Pdhosei is read out as the calculation base of the drop of the oil pressure relative to the ordinary clamping pressure at that instant, in case the condition for lowering the clamping pressure is satisfied in the steady running state or the quasi-steady running state of the vehicle, and is used for the correction to lower the clamping pressure.

The torque capacity of the continuously variable transmission 1 is set according to the clamping pressure so that the clamping pressure takes a level according to the torque to be inputted. Therefore, the correction oil pressure Pdhosei thus determined corresponds to the input torque or input torque range at that instant. Therefore, the range where the input torque at the instant belongs is set in the learned range (at Step S120).

Next, an oil pressure rise Pdup is calculated (at Step S121). This oil pressure rise Pdup sets an oil pressure command value necessary for eliminating the slip and for promptly reaching a clamping pressure slightly exceeding the clamping pressure needed at the present instant, and is added to the aforementioned basic command oil pressure Pdbse calculated from the input torque and the gear ratio at the present instant. The oil pressure rise Pdup is determined by adding a preset addition oil pressure ΔPdup to the actual oil pressure Pdact(i) at the slip decision time, for example, and by subtracting the basic command oil pressure Pdbse(i) at that instant.

When the correction oil pressure Pdhosei and the oil pressure rise Pdup are calculated according to the detection of the slip limit pressure, as described above, the limit clamping pressure detection flag gPd_flag(i) is set at "1". In case the answer of Step S103 is NO in the next cycle and in case the answer of Step S104 is YES, therefore, the answer of subsequent Step S107 is NO. As a result, the oil pressure, i.e., the sum of the basic command oil pressure Pdbse(i) at that instant and the oil pressure rise Pdup calculated at Step S121 is set (at Step S122) as a command oil pressure Pdgt(i) at that instant. Subsequently, an estimated gear ratio γ_k(i) at the present instance is calculated (at Step S123) by adding the aforementioned average gradient Δγto an estimated gear ratio γ_k(i−1) just before.

The individual steps subsequent to Step S123 are shown in FIG. 14. It is decided (at Step S124) whether or not the difference between the estimated gear ratio γ_k(i) determined at Step S123 and the gear ratio γ(i) is smaller than a preset end deciding threshold value γgmin. This is the step for deciding the convergence of the slip. In case the answer of Step S124 is YES, therefore, the limit clamping pressure detection flag gPd_flag(i) is reset to zero, and an end decision counter e_cnt is reset to zero (at Step S125). This occurs at an instant e4 in the time chart of FIG. 15.

This end decision counter e_cnt decides the propriety at the instant of the slip convergence, and counts the lapse time period from the instant (i.e., the instant d4 of FIG. 15) of Step S115, at which the limit clamping pressure detection decision was made. Specifically, if the answer of Step S124 is NO because of a large difference between the gear ratio γ(i) and the estimated gear ratio γ_k(i), it is decided (at Step S126) whether or not the time period of the reached present instant, as counted by the end decision counter e_cnt, exceeds the time period determined by a preset value eg_time specifying the end time. In case the answer of Step S126 is NO, moreover, the end decision counter e_cnt is incremented (at Step S127).

In case the end decision does not hold, the integration of time periods is continued by the end decision counter e_cnt. If the integrated value exceeds the preset value eg_time regulating the end time so that the answer of Step S126 is YES, the correction oil pressure Pdhosei calculated at Step S119 is cleared, and the torque range, to which the input torque at the instant of calculating the correction oil pressure Pdhosei, is set as the unlearned range (at Step S128). Specifically, even if the limit clamping pressure or the correction oil pressure Pdhosei based on the former is calculated, some fault may have occurred, in case the slip of the continuously variable transmission 1 is not converged within a preset time period even by the later so-called "return control" of the oil pressure. In order to eliminate that fault, the correction oil pressure Pdhosei is not reflected on the clamping pressure control.

This so-called "quit of control" applies to the case, in which the slip limit pressure of the continuously variable transmission 1 is not detected within a preset time period after the control start. More specifically, if the clamping pressure is lowered with a preset gradient but the slip limit pressure of the continuously variable transmission 1 is not detected meanwhile, the execution of the routine shown in FIG. 12 and FIG. 13 is repeated so that the counter g_cnt is sequentially incremented. If the value of the counter g_cnt exceeds the preset value e_time specifying the end time without the slip limit pressure being not detected, the answer of Step S103 is YES.

In this case, the ordinary clamping pressure is calculated (at Step S129). Specifically, the basic command oil pressure Pdbse(i) is determined by multiplying a theoretical clamping pressure Pdcal(i) determined from the input torque and the gear ratio at that instant, by the preset safety factor SF, by subtracting the hard correction oil pressure Pdh(i), and by adding a dispersion correction oil pressure Pd_b(i). This calculation is expressed by the following operation Formula:

$$Pdbse(i)=Pdcal(i)*SF-Pdh(i)+Pd\_b(i).$$

After the various flags were reset (at Step S130), the routine advances to Step S105, at which the basic command oil pressure Pdbse(i) determined at Step S128 is adopted as the command oil pressure Pdtgt(i). After this, the routine is returned through Step S106. In this case, the flag is reset at Step S129 so that the control at Step S106 is the so-called "empty control".

Specifically, in the control system thus constructed to execute the controls shown in FIG. 12 to FIG. 14, the controls are once ended in case the limit clamping pressure is not detected within a preset time period after the start of the detection control of the limit clamping pressure. As a result, the possibility of incorporating the error factors due to a large variation of the gear ratio γ in the control procedure or a change in the running state of the vehicle is lowered to improve the detection precision of the limit clamping pressure or the calculation precision of the correction oil pressure Pdhosei.

Figure 16:
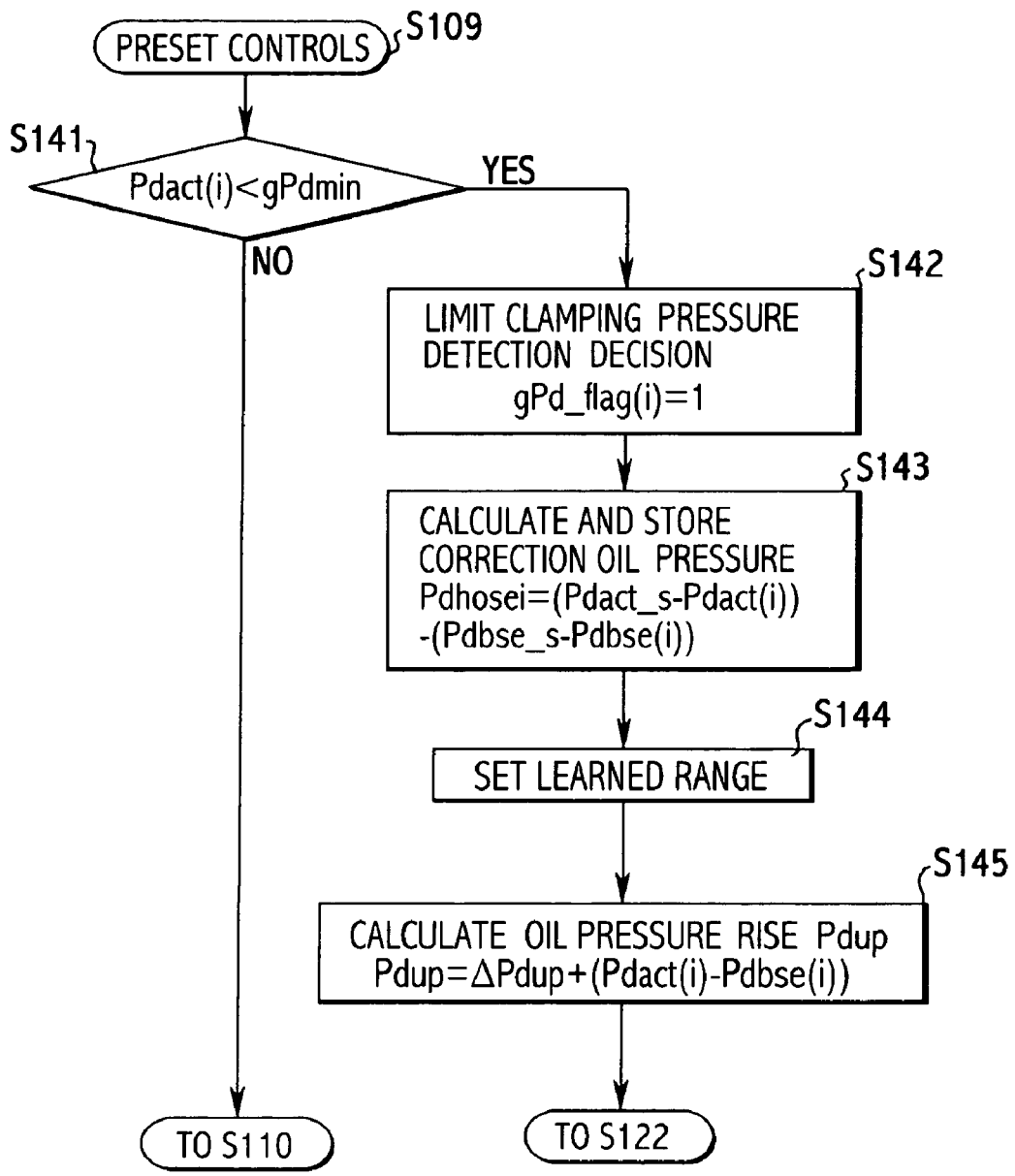
FIG. 16 is a flow chart showing one example of a preset control in the flow chart of FIG. 12.

Here will be described the aforementioned preset control at Step S109. This preset control is that of the case, in which the clamping pressure reaches the lower limit, as exemplified in FIG. 16. In this preset control, it is decided at first (at Step S141) whether or not the actual Pdact(i) is lower than a preset lower limit pressure gPdmin. This lower limit pressure gPdmin is a preset value such as a pressure set mechanically or a pressure preset estimating the safety. If the answer of Step S141 is NO, the control state is ordinary so that the routine advances to Step S110 shown in FIG. 12.

In case the answer of Step S141 is NO, on the contrary, the limit clamping pressure detection decision holds, and the limit clamping pressure detection flag gPd_flag(i) is set to "1" (at Step S142). This is because the slip of the continuously variable transmission 1 does not occur so that the actual oil pressure reaches the lower limit. At subsequent Step S143, therefore, the correction oil pressure Pdhosei is calculated and stored. Specifically, the correction oil pressure Pdhosei is determined by subtracting the difference between the basic oil pressure Pdbse_s at the control starting time and the basic command oil pressure Pdbse(i) at the present instant, from the difference between the actual oil pressure Pdact_s at the control starting time and the actual oil pressure Pdact(i) at the present instant. At Step S120, moreover, the torque range, to which the input torque at that instant belongs, is set in the learned range (at Step S144).

Moreover, the oil pressure rise Pdup is calculated (at Step S145). This operation is similar to that described on Step S121 shown in FIG. 13. After the oil pressure rise Pdup was thus calculated, the routine advances to Step S122, at which the end is decided.

According to the control system of this invention thus constructed to execute the aforementioned controls shown in FIG. 12 to FIG. 14 and FIG. 16, the detection of the limit clamping pressure by lowering the clamping pressure gradually is performed within the preset time period so that the possibility to incorporate the error factors such as the disturbances or to receive the influences is reduced to improve the detection precision of the slip and the detection precision of the limit clamping pressure. When the estimated gear ratio is used for deciding the slip, the dead period or the preset period s_time after the output of the oil pressure command is considered so that the estimated value of the gear ratio is less erroneous thereby to improve the detection precision of the slip and the detection precision of the limit clamping pressure. In case the slip converging situation fails to satisfy the condition such that the gear ratio fails to reach the preset value even after the limit clamping pressure or the correction oil pressure based on the former was detected, moreover, the learned value is not adopted in the later controls by eliminating the so-called "learned value" such as the limit clamping pressure or the correction oil pressure based on the former. Thus, it is possible to avoid or prevent the erroneous setting of the clamping pressure.

Here will be described another control example to be executed in the control system of this invention. The control example shown in FIG. 17 to FIG. 20 is constructed to decide the slip or the limit clamping pressure of the continuously variable transmission 1 on the basis of the gear changing rate and to decide the end according to the situation. First of all, in FIG. 17, it is decided (at Step S151) whether or not the control starting condition is satisfied. The limit clamping pressure is a limit pressure capable of transmitting the input torque without any slip. In order to detect this limit pressure, it is necessary that the input torque or the torque to act on the continuously variable transmission 1 be stable. It is decided at Step S151 whether or not such condition is satisfied. Specifically, it is decided whether or not the vehicle is running on a flat good road without any high acceleration/deceleration, that is, whether or not the vehicle is in the steady running state or the quasi-steady running state.

In case the decision of Step S151 is NO, there is not executed the limit pressure detecting control, which is accompanied by the lowering of the clamping pressure. Thus, the limit clamping pressure detection execution counter g_cnt, the limit clamping pressure detection flag gPd_flag(i), and the end deciding threshold value calculation flag γ_flag and the end decision counter gpd_cnt are individually reset (at Step S152).

Figure 21:
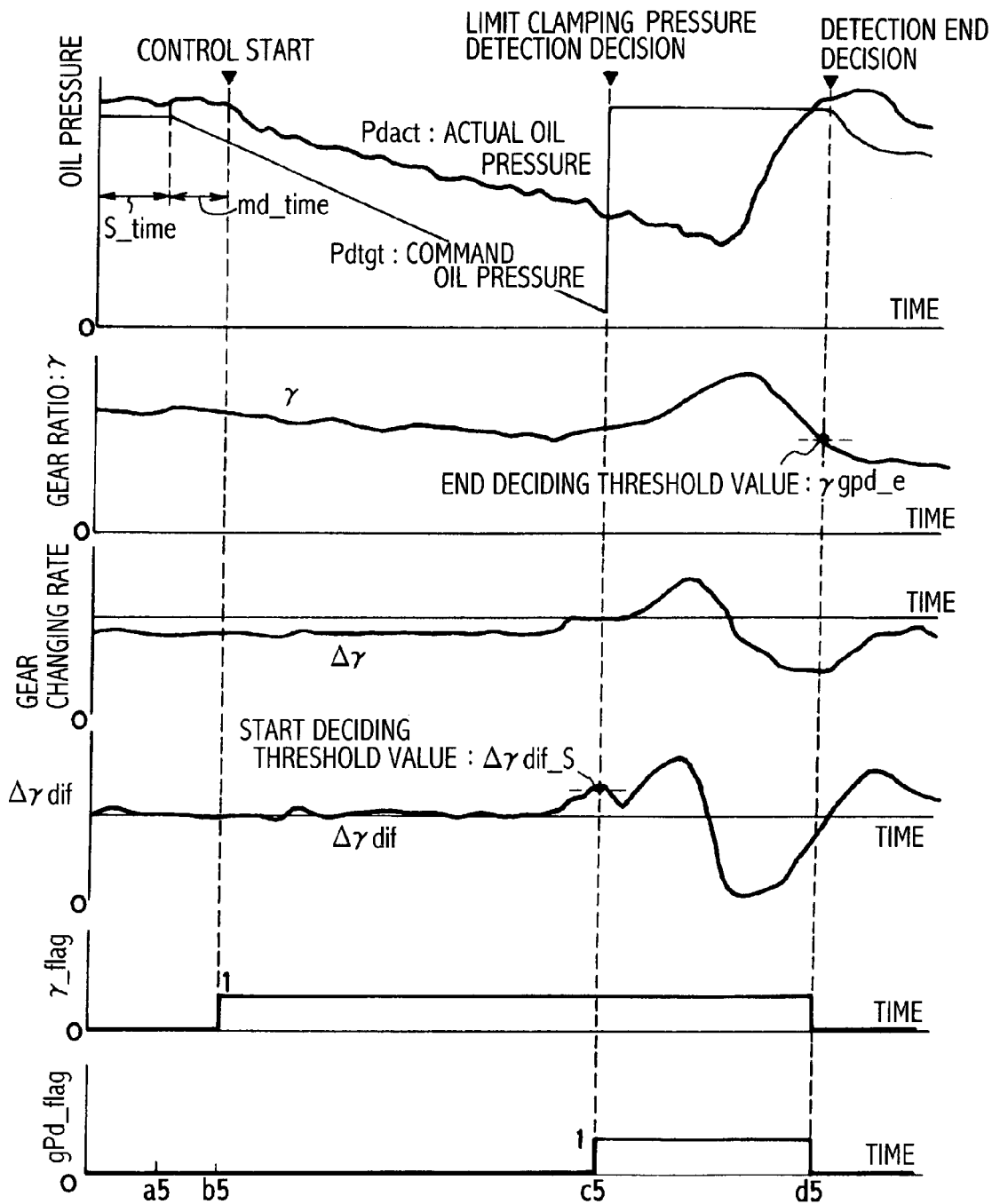
FIG. 21 is a time chart illustrating the changes in the oil pressure, the gear ratio and so on of the case, in which the controls shown in FIG. 17 are performed.

If the control starting condition is satisfied, on the contrary, the answer of Step S151 is YES. This occurs at the 0 instant in the time chart of FIG. 21. In this case, the input speed Nin(i) and the output speed Nout(i) are measured, and the gear ratio γ(i) is calculated on the basis of the input speed Nin and the output speed Nout (at Step S153). The gear changing rate Δγ(i) at the present instant is calculated (at Step S154) from the latest (or just before) N-number of gear ratios γ thus calculated and held.

Next, it is decided (at Step S155) whether or not the counted value of the limit clamping pressure detection execution counter g_cnt has exceeded the preset time period s_time. This preset period s_time is similar to that described with reference to FIG. 12, and is the time period after the control starting condition held and before the lowering command of the clamping pressure is outputted. Therefore, the lowering command to lower the clamping pressure with the preset gradient is outputted, although not shown in FIG. 17. The command oil pressure Pdtgt is indicated by a solid line in the time chart of FIG. 21.

In case the answer of Step S155 is NO, the counter g_cnt is incremented (at Step S165), and the routine is returned. In case the time elapses so that the answer of Step S155 is YES, the preset control is executed (at Step S156). This occurs at an instant b5 in the time chart of FIG. 21.

Figure 18:
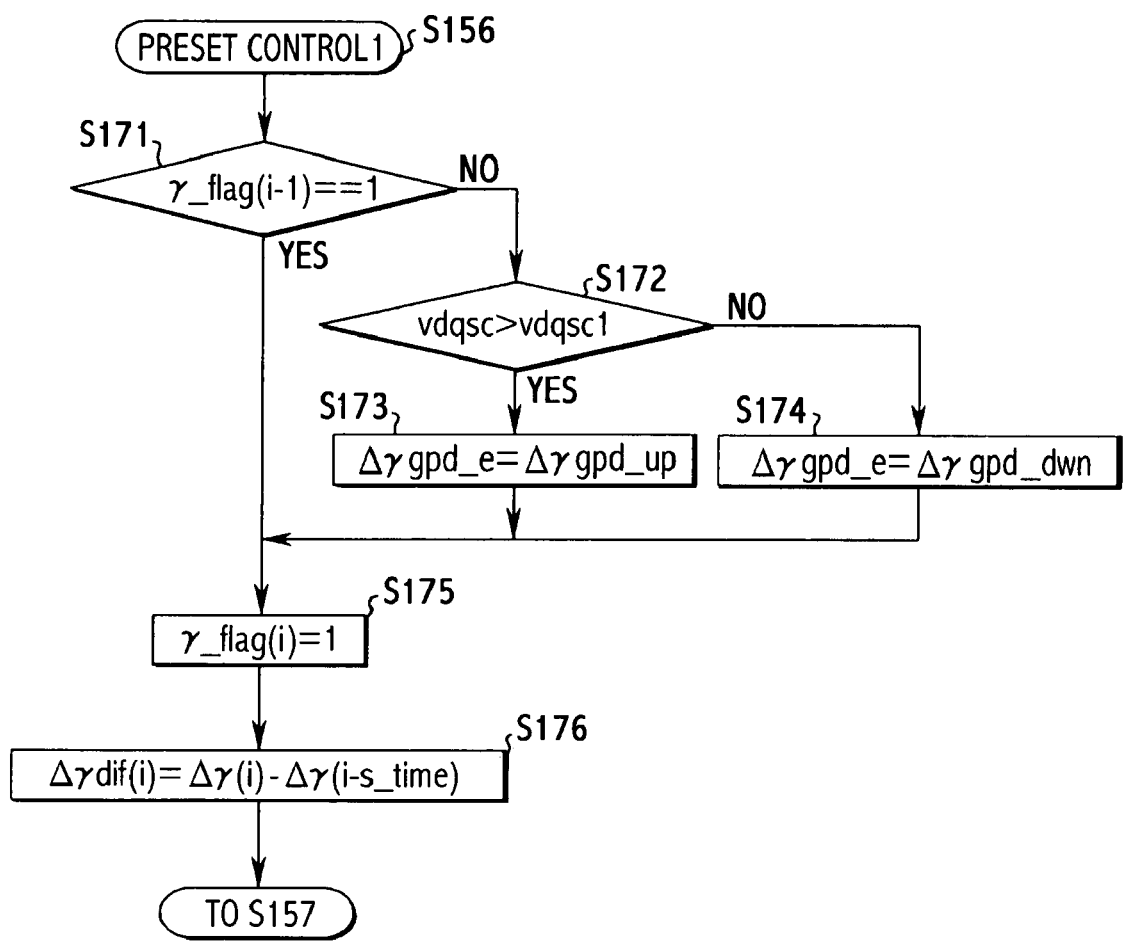
FIG. 18 is a flow chart showing one example of a preset control in the flow chart shown in FIG. 17.
Figure 19:
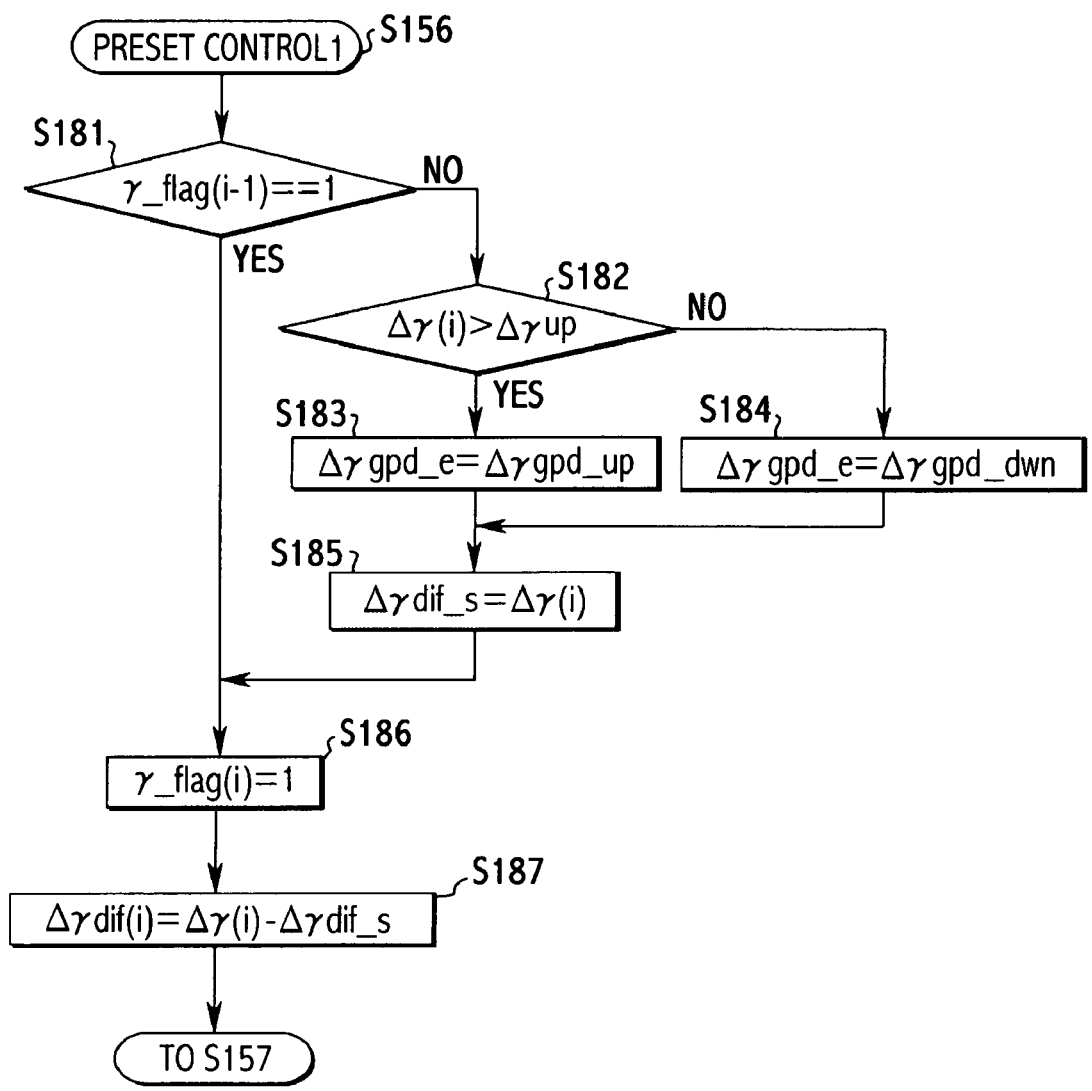
FIG. 19 is a flow chart showing another example of a preset control in the flow chart shown in FIG. 17.
Figure 20:
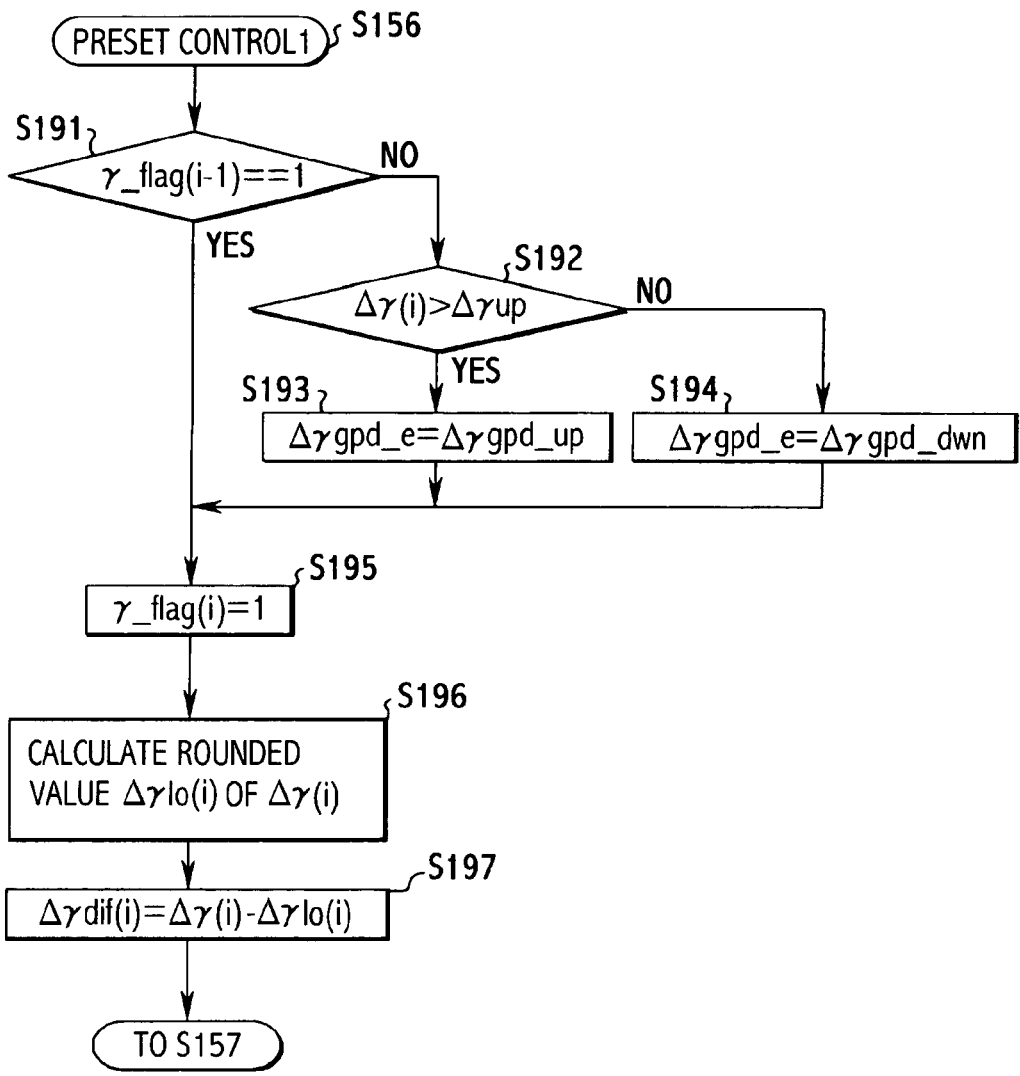
FIG. 20 is a flow chart showing still another example of a preset control in the flow chart shown in FIG. 17.

Examples of this control are shown in FIG. 18 to FIG. 20. In the example shown in FIG. 18, an end deciding threshold value correction $\Delta\gamma gpd\_e$ is determined on the basis of a gear change command value vdqsc, and the gear changing rate at the control starting time is used as the estimated gear changing rate. First of all, it is decided (at Step S171) whether or not the end deciding threshold value calculation flag $\gamma\_flag$ (i−1) just before is at "1". In other words, it is decided whether or not the end deciding threshold valve correction component $\Delta\gamma gpd\_e$ has already been calculated. At the beginning of the control start, the end deciding threshold valve correction component $\Delta\gamma gpd\_e$ is not calculated so that the answer of Step S171 is NO, and it is decided (at Step S172) whether or not a gear change command value vdqsc is larger than a preset decision reference value vdqsc1.

In case the gear change command value vdqsc is larger than the decision reference value vdqsc1 so that the answer of Step S172 is YES, the preset value $\Delta\gamma gpd\_up$ is set (at Step S173) as the end deciding threshold value correction component $\Delta\gamma gpd\_e$. In case the gear change command value vdqsc is relatively smaller than the decision reference value vdqsc1 so that the answer of Step S172 is NO, on the contrary, a preset value $\Delta\gamma gpd\_dwn$ is set (at Step S174) as the end deciding threshold value correction component $\Delta\gamma gpd\_e$.

After the end deciding threshold value correction component $\Delta\gamma gpd\_e$ was set at either of Step S173 or Step S174, the end deciding threshold value calculation flag $\gamma\_flag$ is set to "1" (at Step S175). Then, a difference $\Delta\gamma dif(i)$ between the gear changing rate $\Delta\gamma(i)$ and the estimated gear changing rate is calculated (at Step S176). As this estimated gear changing rate, there is adopted in the example shown in FIG. 18, a gear changing rate $\Delta\gamma(i-s\_time)$ at the instant for outputting the lowering command of the clamping pressure, that is, the gear changing rate at an instant of the time chart of FIG. 21 (i.e., the gear changing rate at the control starting time). Here in case the answer is Step S171 is YES, the routine promptly advances to Step S175.

Another example of the preset control is shown in FIG. 19. In the shown example, the end deciding threshold correction component $\Delta\gamma gpd\_e$ is determined on the basis of the gear changing rate $\Delta\gamma(i)$ at the present instant, and this gear changing rate $\Delta\gamma(i)$ at this instant is used as the estimated gear changing rate in the control procedure. First of all, as in the control example shown in FIG. 18, it is decided (at Step S181) whether or not the end deciding threshold value calculation flag $\gamma\_flag(i-1)$ just before is at "1". In other words, it is decided whether or not the end deciding threshold value correction component $\Delta\gamma gpd\_e$ has already been calculated. Since the end deciding threshold value correction component $\Delta\gamma gpd\_e$ is not calculated at the beginning of the control start, the answer of Step S181 is NO, and it is decided (at Step S182) whether or not the gear changing rate $\Delta\gamma(i)$ at the present instant is higher than a preset decision reference value $\Delta\gamma up$.

In case the gear changing rate $\Delta\gamma(i)$ is larger than the decision reference value $\Delta\gamma up$ so that the answer of Step S182 is YES, a preset value $\Delta\gamma gpd\_up$ is set (at Step S183) as the end deciding threshold value correction component $\Delta\gamma gpd\_e$. In case the gear changing rate $\Delta\gamma(i)$ is relatively smaller than the decision reference value $\Delta\gamma up$ so that the answer of Step S182 is NO, on the contrary, the preset value $\Delta\gamma gpd\_dwn$ is set (at Step S184) as the end deciding threshold value correction component $\Delta\gamma gpd\_e$.

After the end deciding threshold value correction component $\Delta\gamma gpd\_e$ was set either at Step S183 or Step S184, the gear changing rate $\Delta\gamma(i)$ at that instant is used (at Step S185) as an estimated gear changing rate $\Delta\gamma dif\_s$ in the subsequent control. Then, the end deciding threshold value calculation flag $\gamma\_flag$ is set at "1" (at Step S186). Next, the difference $\Delta\gamma dif(i)$ between the gear changing rate $\Delta\gamma(i)$ and the estimated gear changing rate $\Delta\gamma dif\_s$ is calculated (at Step S187). In case the answer of Step S181 is YES, the routine promptly advances to Step S186.

Still another example of the preset control is shown in FIG. 20. In this example, the end deciding threshold value correction component $\Delta\gamma gpd\_e$ is determined on the basis of the gear changing rate $\Delta\gamma(i)$ at the present instant, and a rounded value (or a value delayed linearly) of the gear changing rate $\Delta\gamma(i)$ is used as the estimated gear changing rate in the control procedure. First of all, as in the control example shown in FIG. 19, it is decided (at Step S191) whether or not the end deciding threshold value calculation flag $\gamma\_flag(i-1)$ just before is at "1". In other words, it is decided whether or not the end deciding threshold value correction component $\Delta\gamma gpd\_e$ has already been calculated. Since the end deciding threshold value correction component $\Delta\gamma gpd\_e$ is not calculated at the beginning of the control start, the answer of Step S191 is NO, and it is decided (at Step S192) whether or not the gear changing rate $\Delta\gamma(i)$ at the present instant is higher than a preset decision reference value $\Delta\gamma up$.

In case the gear changing rate $\Delta\gamma(i)$ is larger than the decision reference value $\Delta\gamma up$ so that the answer of Step S192 is YES, a preset value $\Delta\gamma gpd\_up$ is set (at Step S193) as the end deciding threshold value correction component $\Delta\gamma gpd\_e$. In case the gear changing rate $\Delta\gamma(i)$ is relatively smaller than the decision reference value $\Delta\gamma up$ so that the answer of Step S192 is NO, on the contrary, the preset value $\Delta\gamma gpd\_dwn$ is set (at Step S194) as the end deciding threshold value correction component $\Delta\gamma gpd\_e$.

After the end deciding threshold value correction component $\Delta\gamma gpd\_e$ was set either at Step S193 or Step S194, the end deciding threshold value calculation flag $\gamma\_flag$ is set to "1" (at Step S195). Next, a rounded value $\Delta\gamma lo(i)$ of the gear changing rate $\Delta\gamma(i)$ is calculated (at Step S196). There is also calculated (at Step S197) the difference $\Delta\gamma dif(i)$ between the gear changing rate $\Delta\gamma(i)$ and the aforementioned rounded value $\Delta\gamma lo(i)$. In short, the rounded value $\Delta\gamma lo(i)$ is adopted as the estimated gear changing rate in the control procedure. In case the answer of Step S191 is YES, the routine promptly advances to Step S195.

Figure 17:
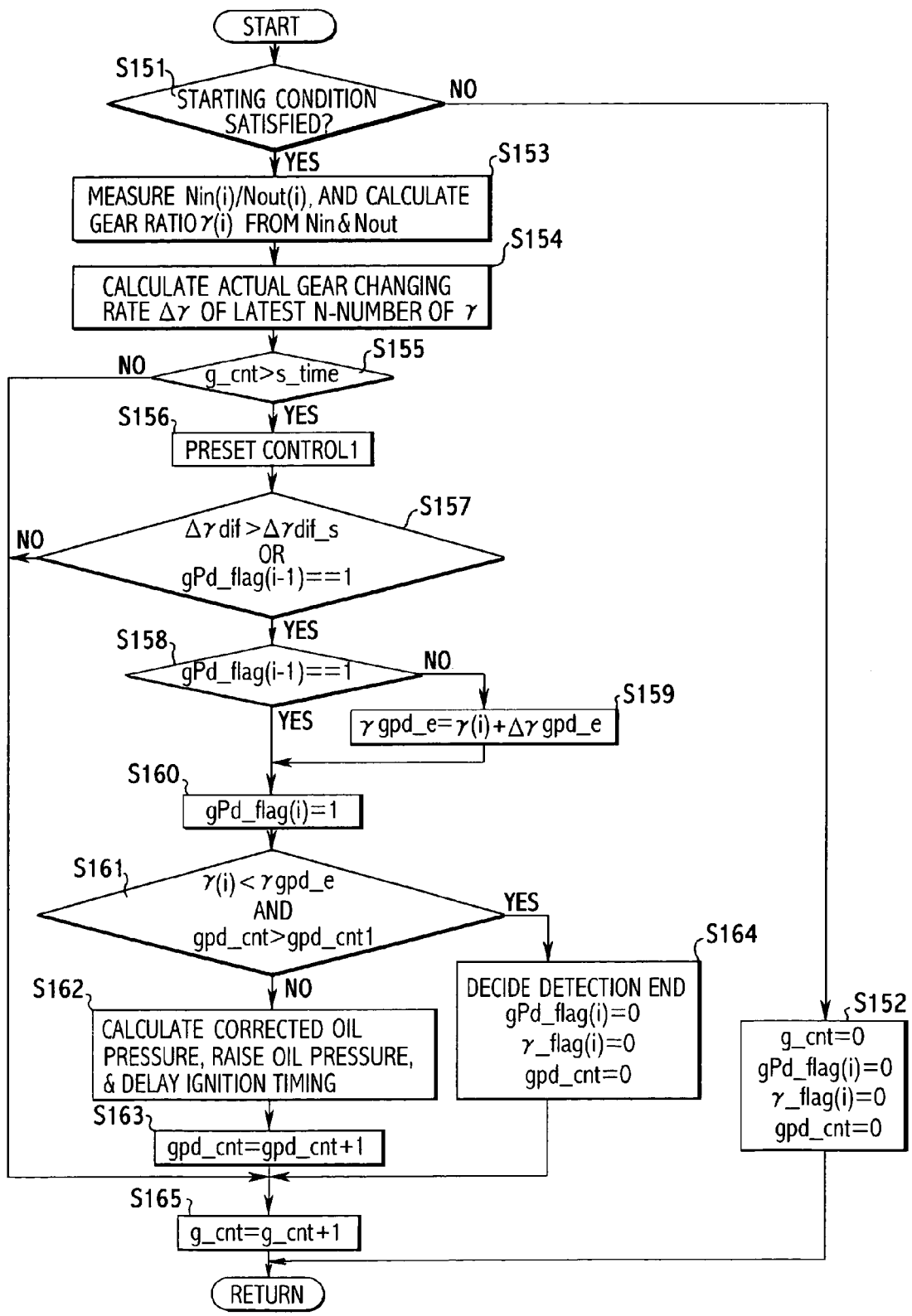
FIG. 17 is a flow chart for explaining still another control example by the control system of this invention.

At Step S156 of the flow chart shown in FIG. 17, any of the aforementioned preset controls of FIG. 18 to FIG. 20, is executed. It is decided (at Step S157) whether or not the difference $\Delta\gamma dif(i)$ between the gear changing rate $\Delta\gamma(i)$ obtained by the preset control and the estimated gear changing rate is larger than the start deciding threshold value $\Delta\gamma dif\_s$, or whether or not the previous value gPd_flag(i−1) of the limit clamping pressure detection flag gPd_flag is at "1". In short, it is decided whether or not the limit clamping pressure detection decision holds.

In case the limit clamping pressure detection decision does not hold so that the answer of Step S157 is NO, the routine advances to Step S165, at which the limit clamping pressure detection execution counter g_cnt is incremented, and the routine is returned. When the gear changing rate $\Delta\gamma$ is made higher than the estimated gear changing rate by the slip having occurred in continuously variable transmission 1, on the contrary, the answer of Step S157 is YES. In short, the limit clamping pressure detection decision holds. This occurs at an instant c5 in the time chart of FIG. 21. In case the limit clamping pressure detection decision has already held, on the other hand, the answer of Step S157 is YES.

In case the answer of Step S157 is YES, it is decided again (at Step S158) whether or not the previous value gPd_flag(i−1) of the limit clamping pressure detection flag gPd_flag is at "1". In other words, it is decided whether or not the decision of the limit clamping pressure has changed from dissatisfaction to satisfaction or has already been satisfied. In case the decision of the limit clamping pressure has changed from the dissatisfaction to the satisfaction so that the answer of Step S157 is YES, the limit clamping pressure detection flag gPd_flag(i−1) just before is at "0", so that the answer of Step S158 is NO. In this case, the end deciding threshold value γgpd_e is set (at Step S159) to the value or the sum of the gear ratio γ(i) at that instant and the end deciding threshold value correction component Δγgpd_e. This end deciding threshold value correction component Δγgpd_e is set on the basis of the gear change command value and the gear changing rate, as described hereinbefore, the drive situation of the vehicle such as the gear change command value or the gear changing rate is reflected on the end decision.

Either after the control of Step S159 was executed or in case the answer of Step S158 was YES, the current limit clamping pressure detection flag gPd_flag(i) is set to "1" (at Step S160). Next, it is decided (at Step S161) whether or not the gear ratio γ(i) at the present instant is lower than the end deciding threshold value correction component Δγgpd_e and whether or not the end decision counter gpd_cnt has exceeded the preset time period gpd_cnt1. This end decision counter gpd_cnt is a counter having a starting instant at the instant when the limit clamping pressure detection decision holds. Specifically, the gear ratio may be varied while vibrating higher or lower by the cause of a stick slip. Just after the slip occurred in the continuously variable transmission 1 or just before the slip converges, therefore, the gear changing rate γ may be lower than the end deciding threshold value γgpd_e. In case the gear ratio γ(i) becomes lower than the end deciding threshold value γgpd_e, therefore, the aforementioned end decision counter gpd_cnt is provided for satisfying the decision of Step S161.

In case the answer of Step S161 is NO, the state is just after the slip accompanying the gradual lowering of the clamping pressure was detected so that the limit clamping pressure detection decision held. Therefore: the correction oil pressure is calculated; the oil pressure for setting the clamping pressure is raised; and the ignition timing of the engine 5 is delayed for lowering the torque input to the continuously variable transmission 1 (at Step S162). Here, the calculation of the corrected oil pressure and the control to raise the oil pressure are executed as in the control example, which has been described with reference to FIG. 12 to FIG. 14.

Next, the end decision counter gpd_cnt is incremented (at Step S163), and the routine advances to Step S165, at which the limit clamping pressure detection execution counter g_cnt is incremented. After this, the routine is returned.

Just after the start of the slip, the time period counted by the end decision counter gpd_cnt is short. In the state where the slip is not in the converging direction, moreover, the gear ratio γ(i) is at or higher than the end deciding threshold value γgpd_e so that the answer of Step Step S161 is NO. Therefore, the end decision counter gpd_cnt is sequentially incremented.

As the time period thus lapses to some extent, the time period measured by the end decision counter gpd_cnt exceeds the preset time period gpd_cnt1. When the slip converges in this state so that the gear ratio γ(i) becomes lower than the end deciding threshold value γgpd_e, the answer of Step S161 is YES.

In other words, the decision of the detection end holds (at Step S164). This occurs at an instant d5 in the time chart of FIG. 21. Then, the individual flags gPd_flag(i) and γ_flag and the end decision counter gpd_cnt are reset. After this, the routine advances to Step S165.

According to the control system of this invention constructed to execute the aforementioned controls shown in FIG. 17 to FIG. 20, the slip or the limit clamping pressure (i.e., the clamping pressure to balance the input torque), as based on the lowering of the clamping pressure, is detected on the basis of the result of the contrast between the gear changing rate Δγ and the estimated gear changing rate so that its detection precision is improved. Especially in case the estimated gear changing rate is exemplified by the rounded value of the gear changing rate, the gear changing rate at an instant a preset period before the present instant or the gear changing rate in the vicinity of the control starting instant such as the instant to start the lowering command of the clamping pressure, the estimated error of the gear changing rate is reduced to improve the detection precision such as the slip or the limit clamping pressure of the continuously variable transmission 1. In case the end of the detection control of the convergence of the slip or the limit clamping pressure accompanying the slip convergence is to be decided, the gear change command value or the gear changing rate at a preceding instant is reflected on the end decision so that the precision of the end decision of the control is improved.

Figure 22:
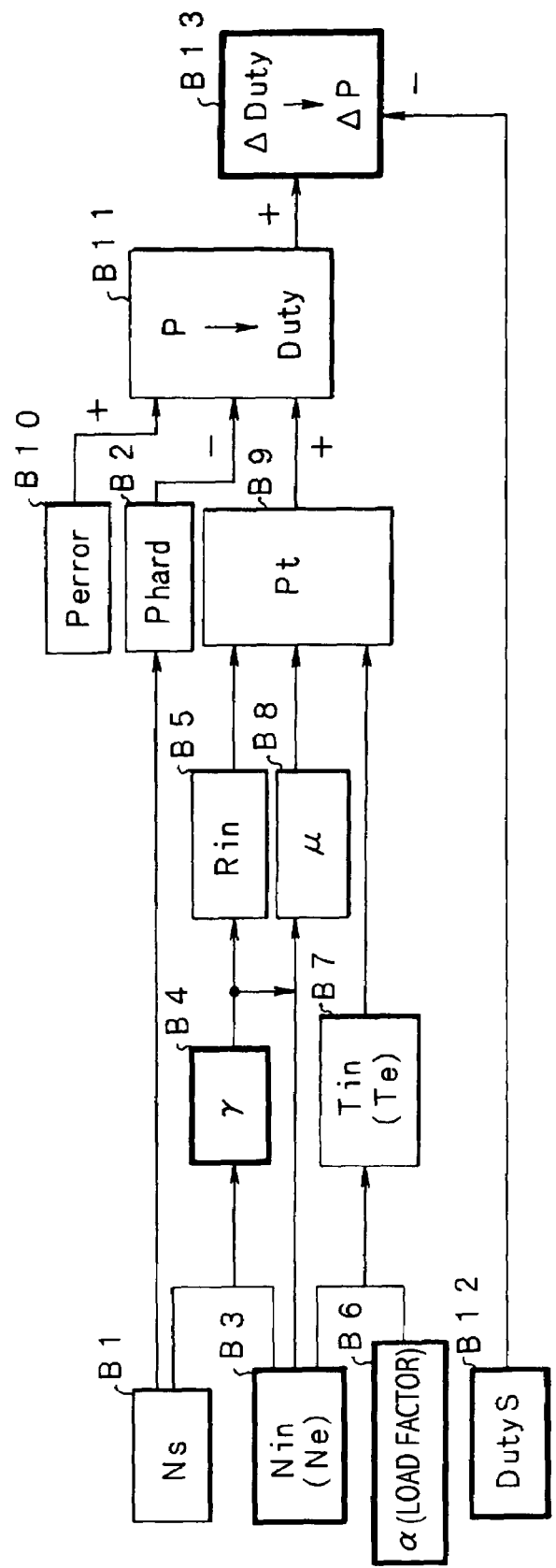
FIG. 22 is a block diagram for explaining one example (of a learning correcting method) of the controls by the control system of this invention.
Figure 23:
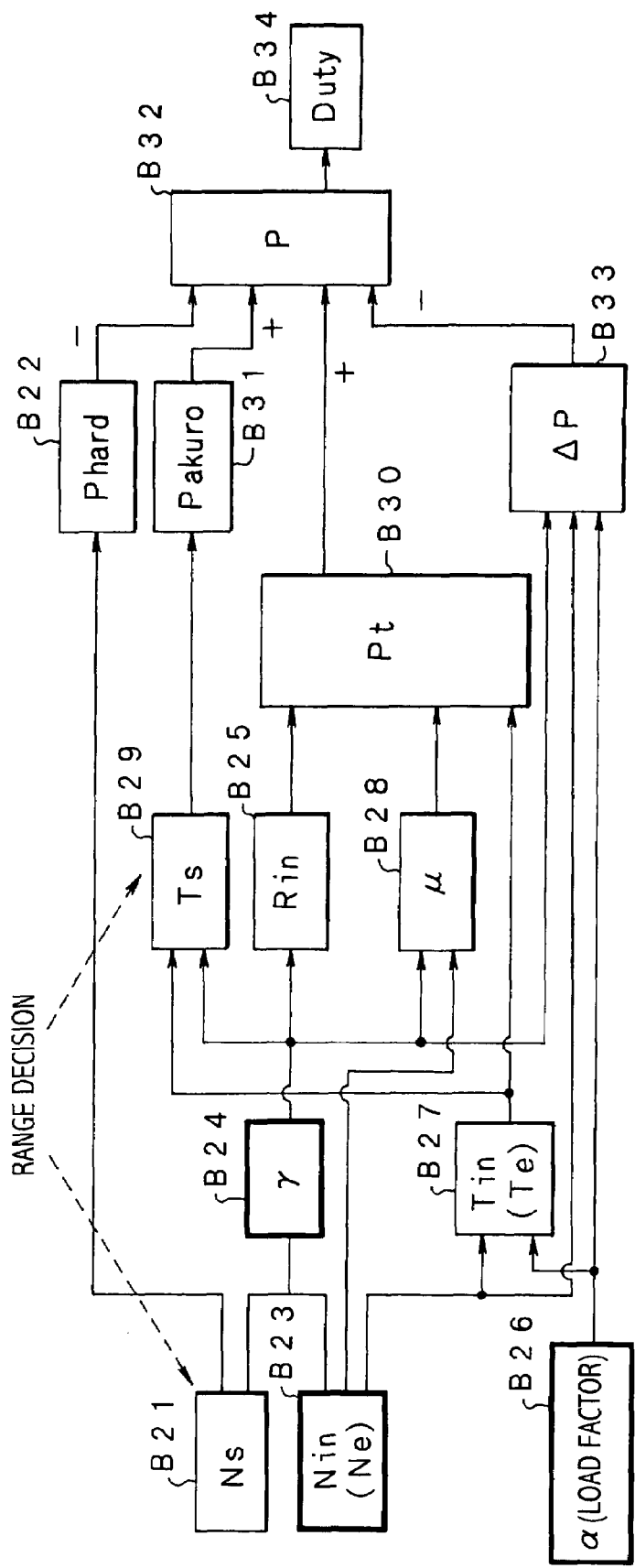
FIG. 23 is a block diagram for explaining one example (of a clamping pressure determining method) of the controls by the control system of this invention.

The control system according to this invention executes the lowering control of the clamping pressure and the detection of the accompanying slip, as described above. This execution makes the clamping pressure to be set later, as low as possible within a range to cause no slip of the belt 17. In other words, the lower limit clamping pressure or limit clamping pressure detected is reflected on the subsequent clamping pressure control. FIG. 22 and FIG. 23 are block diagrams for explaining examples of the control, in which the lower limit clamping pressure or the limit clamping pressure is reflected on the clamping pressure control. Here, the controls to be described hereinafter can be executed in parallel with the foregoing individual controls within a range not to conflict with those controls.

With reference to FIG. 22, here will be described the case, in which the slip starting pressure, i.e., the limit clamping pressure is to be learned and corrected by lowering the clamping pressure gradually and by detecting the belt slip caused thereby. First of all, the belt slip is caused by the lowering control of the clamping pressure, and the speed of the follower pulley 14, i.e., an output shaft speed Ns at the slip detection time is detected (at a block B1). From this output shaft speed Ns, there is determined (at a block B2) a pressure Phard corresponding to the pressure, which is the sum of a centrifugal oil pressure to act on the follower pulley 14 and the spring force of the hydraulic actuator 16.

The speed of the drive pulley 13 at the slip detection time, that is, the input shaft speed Nin (i.e., the engine speed Ne) is detected (at a block B3), and the gear ratio γ is determined (at a block B4) from the input shaft speed Nin (or Ne) and the output shaft speed Ns. From this gear ratio γ, moreover, there is determined (at a block B5) an input side pulley running radius Rin at that time, that is, the running radius Rin of the belt 17 with the drive pulley 13.

An input torque Tin (i.e., an engine torque Te) is determined (at a block B7) from the input shaft speed Nin (Ne) and a load factor α (at a block B6). Here, this load factor α is an index value of the engine torque relating to the engine speed, as indicated by the throttle opening, for example, so that the input torque Tin (Te) can be determined with the load factor α and the input shaft speed Nin (Ne). Moreover, a friction coefficient μ of the belt clamping portions is determined (at a block B8) from the input shaft speed Nin (Ne) and the gear ratio γ.

A theoretical clamping pressure Pt or the clamping pressure necessary for causing no belt slip is determined, as follows:

$$Pt = K\, Tin/(\alpha \cdot Rin) \cdot SF.$$

Here, letter K designates a constant, and letters SF designate a safety factor for the clamping pressure. By setting the safety factor SF, therefore, the theoretical clamping pressure Pt is determined (at a block B9) with the input torque Tin (Te), the friction coefficient μ and the input side pulley running radius Rin.

A corresponding command value Duty or the command value at the clamping pressure lowering time is set by determining a calculated clamping pressure P. This calculated clamping pressure P is determined, as follows:

$$P = Pt - P\text{hard} + P\text{error}.$$

Here, the pressure Perror corresponding to the oil pressure compensation is the compensation value, which is preset considering the temperature characteristics in the drive line or the dispersion in the oil pressure due to the influences such as the irreproducibility, and is read (at a block B10) from the stored data. The calculated clamping pressure P is determined from the pressure Perror corresponding to the oil pressure compensation, the pressure Phard corresponding to the centrifugal oil pressure and the spring force, and the theoretical clamping pressure Pt, and the corresponding command value Duty is set (at a block B11) from that calculated clamping pressure P.

A difference ΔDuty between an actual clamping pressure command value DutyS (at a block B12) at the slip starting time and the corresponding command value Duty is determined, and the quantity ΔP corresponding to the clamping pressure drop and having the value converted from that ΔDuty into the oil pressure is determined (at a block B13). This quantity ΔP corresponding to the clamping pressure drop is reflected on the map of "the input shaft speed Nin (Ne)*the load factor α*the gear ratio γ", and is learned and corrected.

By thus learning and correcting the quantity ΔP corresponding to the clamping pressure drop, the influences of the dispersion of the individual differences or the factors for mainly changing the limit clamping pressure, such as the input shaft speed Nin (Ne), the load factor α and the gear ratio γ can be properly learned and corrected.

Next, the case of setting the clamping pressure after the map correction will be described with reference to FIG. 23. First of all, the current output shaft speed Ns is detected (at a block B21). From this output shaft speed Ns, there are determined (at a block B22) the centrifugal oil pressure to act on the follower pulley 14 and the pressure Phard corresponding to the spring force.

The current input shaft speed Nin (Ne) is detected (at a block B23), and the gear ratio γ is determined (at a block B24) from that input shaft speed Nin (Ne) and the output shaft speed Ns. The input side pulley running radius Rin at present is determined (at a block B25) is determined from that gear ratio γ.

The input torque Tin (Te) is determined (at a block B27) from the input shaft speed Nin (Ne) and the load factor α (at a block B26). Moreover, the friction coefficient μ of the belt clamping portions is determined (at a block B28) from the input shaft speed Nin (Ne) and the gear ratio γ. A torque Ts of the follower pulley 14, i.e., the output shaft is determined (at a block B29) from that gear ratio γ and the input torque Tin (Te).

On the basis of the output shaft speed Ns and the output shaft torque Ts determined at the aforementioned blocks B21 and B29, here is confirmed whether or not the current action state is in the corrected clamping pressure using range. The corrected clamping pressure using range is such a preset range in the (not-shown) diagram setting the clamping pressure by using the vehicle speed and the output shaft torque Ts as parameters as has preset upper and lower widths with respect to a curve exhibiting the flat road load running state. Therefore, this control example to be set by learning and correcting the clamping pressure executes the control continuously, in case it is affirmed that the current running state is in the corrected clamping pressure using range. On the contrary, this control example is not executed in case it is denied that the current running state is not in the corrected clamping pressure using range.

When the control is continuously executed, the theoretical clamping pressure Pt is determined (at a block B30) with the input torque Tin (Te), the friction coefficient μ and the input side pulley running radius Rin. Moreover, a pressure Pakuro corresponding to the road surface input is determined (at a block B31) from the output shaft torque Ts. The pressure Pakuro corresponding to the road surface input is a pressure corresponding to the torque, which is estimated to act from the output side in accordance with the state of the road surface.

The calculated clamping pressure P is determined (at a block B32) from the centrifugal oil pressure, the pressure Phard corresponding to the spring force, the theoretical clamping pressure Pt and the pressure Pakuro corresponding to the road surface input. Moreover, the clamping pressure drop ΔP is determined (at a block B33) from the map of "the input shaft speed Nin (Ne)*the load factor α*and the gear ratio γ". Then, there is outputted (at a block B34) the corresponding command value Duty or the difference between the calculated clamping pressure P and the quantity ΔP corresponding to the clamping pressure drop.

In this control example for setting the clamping pressure, the difference between the calculated clamping pressure P at the belt slip starting time and the actual clamping pressure at the same time, so that the detection result of the limit clamping pressure can be used even if a more or less state change occurs during the detection period.

According to the control system of this invention constructed to execute the controls shown in FIG. 22 and FIG. 23, therefore, the major changing factors of the clamping pressure drop corresponding quantity ΔP such as the input shaft speed Nin (Ne), the load factor α and the gear ratio γ are incorporated into the correction, so that a proper learning correction is made. In case the state change occurs from the steady state to the unsteady state or in case the state is transient, moreover, the state change is reflected on the learning correction of the clamping pressure, so that the detection result of the limit clamping pressure can be used even if a more or less state change occurs during the detection period.

As a result, the clamping pressure can be set properly and highly precisely.

Here will be described another example of the control to be executed in the control system of this invention. In the control example shown in FIG. 24 to FIG. 29, relations such as the ratio between the theoretical clamping pressure at the time of detecting a clamping pressure balancing the input torque and the limit clamping pressure are calculated to determine a first correction coefficient β, and this first correction coefficient β is further corrected with a function of the gear ratio to determined a second correction coefficient β', so that the clamping pressure may be controlled or set by correcting it with the second correction coefficient β'.

Figure 24:
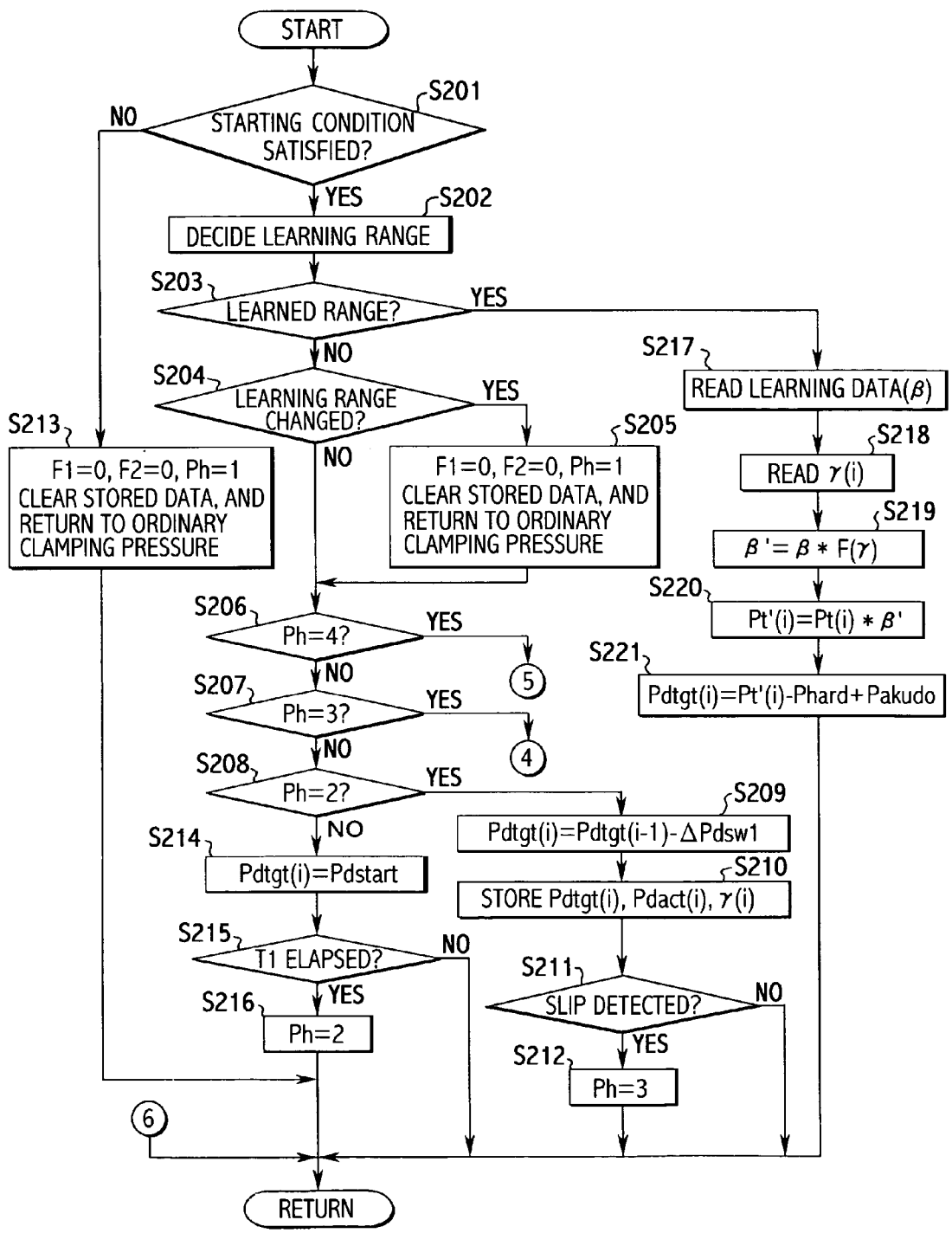
FIG. 24 is a diagram showing one portion of the flow chart for explaining one example of the controls by the control system of this invention.
Figure 25:
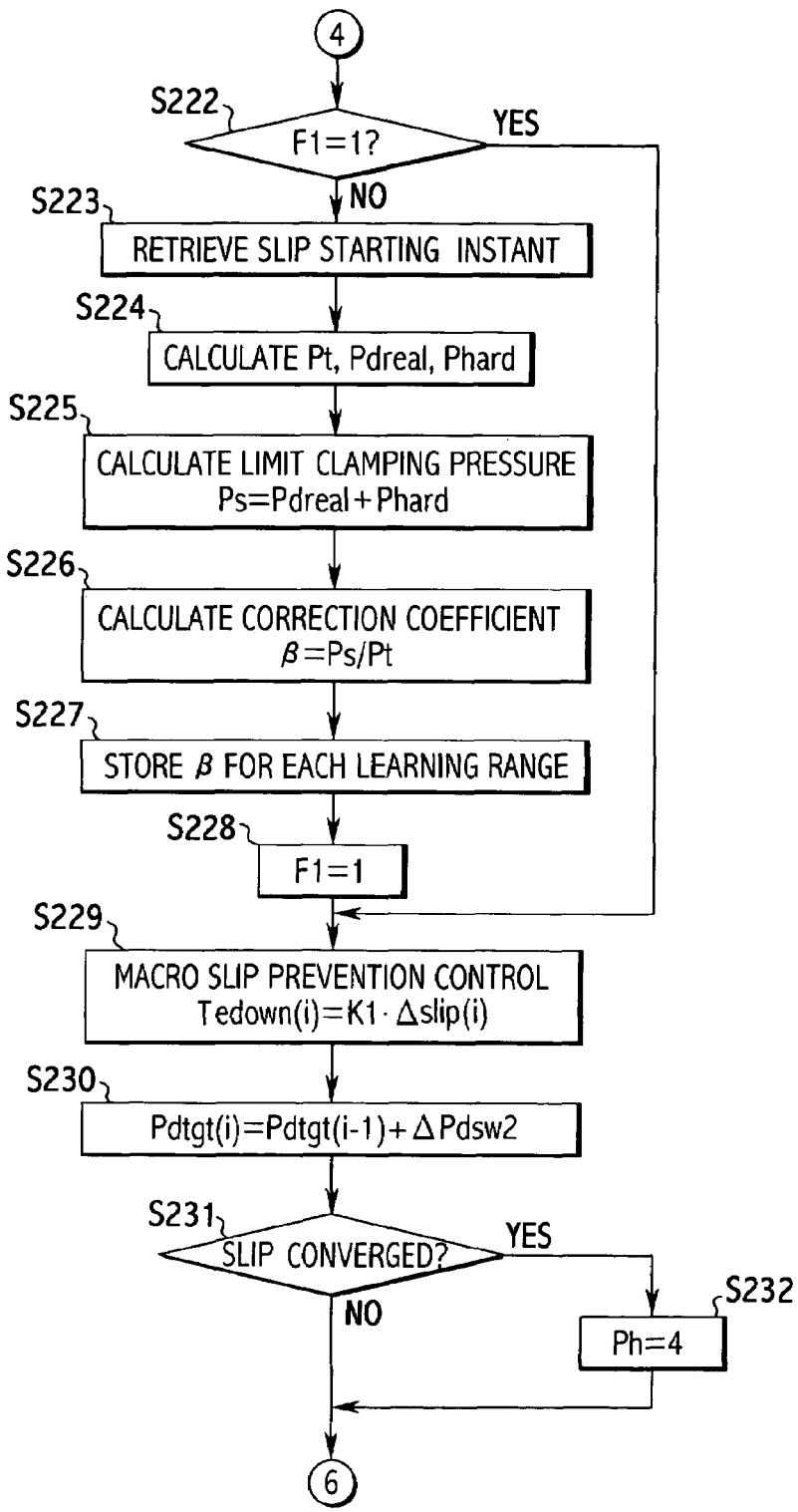
FIG. 25 is a diagram showing a portion subsequent to the flow chart shown in FIG. 24.
Figure 26:
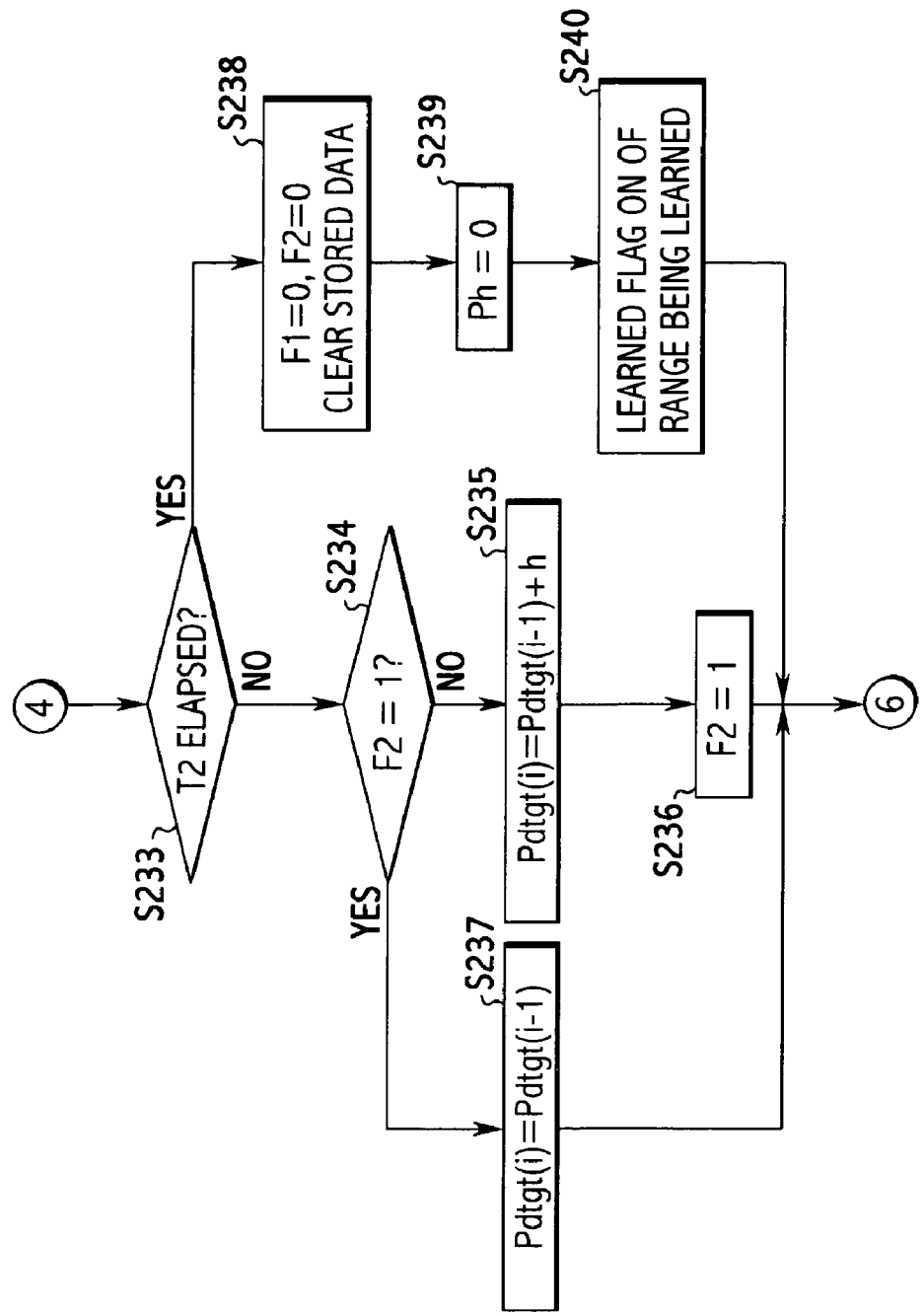
FIG. 26 is a diagram showing another portion subsequent to the flow chart shown in FIG. 24.
Figure 27:
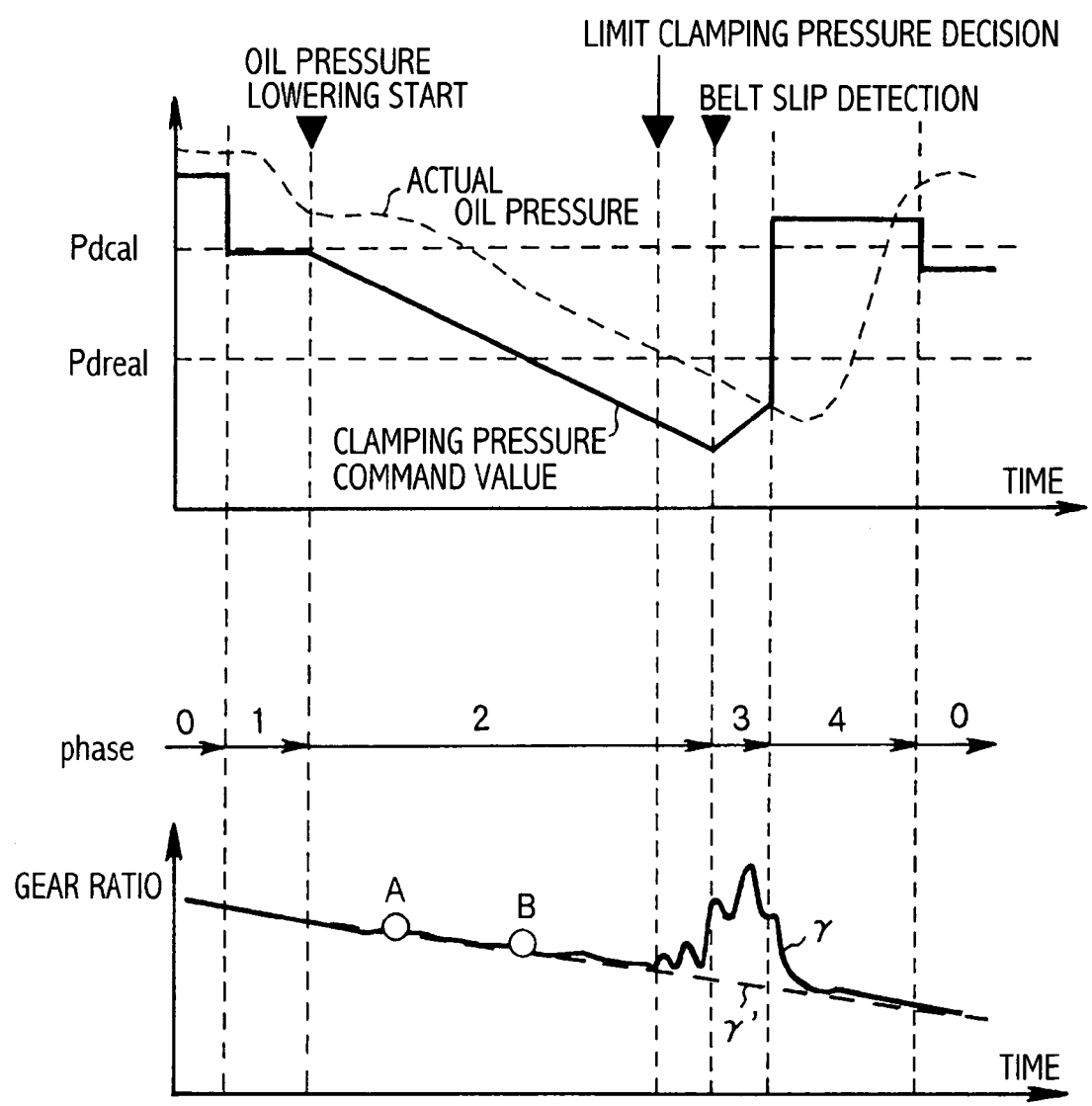
FIG. 27 is a time chart illustrating the contents of the controls and the changes in the clamping pressure in individual phases.

FIG. 24 to FIG. 26 are flow charts showing that example, and FIG. 27 is a time chart of the case in which a routine expressed by that flow chart is executed. The routine shown in the flow chart is repeatedly executed for every preset short time periods. First of all, it is decided (at Step S201) in FIG. 24 whether or not the control starting condition, i.e., the condition to execute either the control to set the clamping pressure at a relatively low pressure or the so-called "clamping pressure lowering control" to make the clamping pressure lower than the ordinary state is satisfied. In short, this condition is that the torque to act on the continuously variable transmission 1 is sable, and is satisfied by: that the vehicle is cruising at a medium or high speed; that the road surface is substantially flat and good; and that the running range is set by using the engine speed, the engine load factor or the gear ratio as parameters and that the later-described learning control is incomplete for the running range to which the current running state belongs.

In case this control starting condition is not satisfied so that the answer of Step S201 is NO: the individual flags F1, F2 and Ph are reset to zero; the stored data are cleared; and the clamping pressure at the ordinary time is restored (at Step S213) in case the clamping pressure has been lowered or raised. After this, the routine is once passed through. The individual flags F1, F2 and Ph will be described hereinafter.

On the other hand, the theoretical clamping pressure Pt(i) is a clamping pressure determined from the input torque to the continuously variable transmission 1, and is determined with the main parameters including the input torque, the friction coefficient at the continuously variable transmission 1, and the included angle of the belt 17 with the individual pulleys 13 and 14. The theoretical clamping pressure Pt(i) is calculated, as follows:

$$Pt = Tin \cdot \cos \theta / (2 \cdot \mu \cdot Rin).$$

Here: letters Ti designate the input torque; letter θ designates the included angle of the belt 17 with the pulleys 13 and 14; letter μ designates the friction coefficient between the pulleys 13 and 14 and the belt 17; and letters Rin designate the running radii (i.e., the input side pulley running radii) of the belt 17 with the drive pulley 13. As the input torque Tin and the friction coefficient μ, there are used the estimated values, which raise one cause for the error of the clamping pressure. The oil pressure command value Pdtgt(i) is determined by multiplying the theoretical clamping pressure Pt(i) by a preset safety factor SF(>1) and by subtracting the sum Phard of the oil pressure by the centrifugal force and the a pressure corresponding component by the elastic force of the return spring in the hydraulic actuator. Specifically, the theoretical clamping pressure Pt(i) is calculated, as follows:

$$Pdtgt(i) = Pt(i) \cdot SF - Phard.$$

In case the control starting condition is satisfied so that the answer of Step S201 is YES, on the contrary, the learning range is decided (at Step S202). Specifically, the aforementioned running range, to which the current running state belongs, is decided with the parameters such as the engine speed and the engine load factor. It is decided (at Step S203) whether or not the learning of the clamping pressure to be described has been ended on the learning range thus decided, that is, whether or not the range, to which the current running state belongs, is the learned range which has been learned on the items relating to the clamping pressure. In case the answer of Step S203 is NO, that is, in case the learned value is not achieved yet, the learning control is executed on the clamping pressure.

First of all, it is decided (at Step S204) whether or not the learning range has been changed. This learning range is the range which is set by using the engine speed, the engine load factor or the gear ratio as the parameters, as described above. If the running state of the vehicle is seriously changed in case the (not-shown) accelerator pedal is operated or in case the vehicle speed changes, the learning range may go out of the previous one. In this case, the answer of Step S204 is YES.

When the answer of Step S204 is YES, the routine advances to Step S205, at which the flags F1 and F2 are reset to zero but the flag Ph is set to "1". This flag Ph indicates the individual stages (or phases) of the control and is sequentially set at "0" before the control start to "4" after the control end. Moreover, the hydraulic command value Pdtgt(i)(=Pt(i) ·SF·Phard) is determined on the basis of the theoretical clamping pressure Pt(i) determined from the input torque at that instant. After this, the routine advances to Step S206. In case the answer of Step S204 is NO, on the contrary, the routine promptly advances to Step S206.

At the individual Steps from Step S206 to subsequent Step S208, the flag Ph indicating the phase is decided. Specifically, it is decided: at Step S206 whether or not the flag Ph is at "4"; at Step S207 whether or not the flag Ph is at "3"; and at Step S208 whether or not the flag Ph is at "2". In case the answer of Step S205 is YES, as described above, the flag Ph is set to "1". In case the answer is NO, on the contrary, the flat Ph remains at "0". In any case, the answers of Step S206 to Step S208 are NO. In this case, the oil pressure command value Pdtgt(i) is set and kept (at Step S214) at the oil pressure command value Pdstart at a preset oil pressure lowering starting time. This is the control of Phase 1.

It is then decided (at Step S215) whether or not a preset time period T1 has elapsed. In case this answer of Step S215 is NO, the routine is once passed through. In case the answer of Step S215 is YES, on the contrary, the flag Ph indicating the phase is set to "2" (at Step S216), and the routine is then once passed through. In short, the oil pressure command value Pdtgt(i) is kept at a constant value. Moreover, that preset time period T1 is a period sufficient for stabilizing the actual oil pressure Pdact(i) at a level corresponding to the oil pressure command value Pdtgt(i). For this preset time period T1, therefore, the mutual relations are stabilized between the actual oil pressure Pdact(i) and the oil pressure command value Pdtgt(i) or the oil pressure command value Pdtgt(i) based on the theoretical clamping pressure Pt(i).

The control to keep the oil pressure command value Pdtgt (i) and the actual oil pressure Pdact(i) based on the former constant is the control of Phase 1. After the preset time period T1 elapsed so that the flag Ph was set at "2", the answer of Step S208 is YES so that the control of Phase 2 is executed. In other words, the oil pressure command value Pdtgt(i) is gradually reduced with a preset gradient ΔPdsw1(at Step S209). Then, the oil pressure command value Pdgt(i), the actual oil pressure Pdact(i) and the gear ratio γ(i) in that procedure are stored (at Step S210). In the procedure to reduce the oil pressure command value Pdtgt(i) with the preset gradient ΔPdsw1, moreover, the slip in the continuously variable transmission 1 is detected (at Step S211).

The detection of the slip at this continuously variable transmission 1 can be performed by a suitable method known in the related art. For example, the changing gradient of a gear ratio is determined from an actual gear ratio γ1 at an instant a preset time Tpre1 before the present instant and an actual gear ratio γ2 at an instant a preset time Tpre2(<Tpre1) before the present instant, and an estimated gear ratio γ' at the present instant is determined on the basis of that changing gradient, so that the slip can be detected in terms of the excess of a preset reference value by the deviation between the estimated gear ratio γ' and the actual gear ratio γ. Alternatively, the slip may also be detected on the basis of the gear ratio changing rate (or the rate of change of the gear ratio).

In case the step is not detected so that the answer of Step S211 is NO, this routine is once passed through so as to continue the preceding control. On the contrary, in case the answer of Step S211 is YES, that is, in case the slip is detected, the flag Ph is set at "3", and the routine is once passed through.

In case the slip at the continuously variable transmission 1 is detected, the flag Ph is set at "3" so that the answer of Step S207 is YES. In this case, the routine advances to Step S222 of the flow chart shown in FIG. 25, at which it is decided whether or not the flag F1 is set at "1". This flag F1 indicates, when set at "1", that the learned value is stored for the learning range, to which the running state at that instant belongs, and is initially set at "0", as described above. In case the answer of Step S222 is NO, therefore, a slip starting instant (i.e., the instant at which the slip actually starts) is retrieved (at Step S223).

For the retrieving method, there can be suitably adopted a variety of methods known in the related art. For example, the estimated gear ratio γ' is estimated from the gradient between two points A and B in the time chart of FIG. 27 illustrating the gear ratio γ, that is, the two points (between the points A and B) a preset time period before the slip detection, and the estimated gear ratio γ' and the actual gear ratio γ are compared sequentially retroactively from the slip detecting instant to the past, so that the instant when the difference exceeds a preset reference value can be adopted as the slip starting instant. When the slip starting instant is thus retrieved, there are calculated (at Step S224) the theoretical clamping pressure Pt at that instant, an actual oil pressure Pdreal at the slip starting time, and the pressure Phard or the sum of the centrifugal oil pressure and the pressure based on the return spring.

A limit clamping pressure Ps at the limit clamping pressure detection time is calculated (at Step S225). This limit clamping pressure Ps is determined by adding the pressure Phard, i.e., the sum of the centrifugal oil pressure and the pressure based on the return spring, to the slip starting time actual oil pressure Pdreal calculated at Step S224. Specifically, the limit clamping pressure Ps is determined by the following calculation:

$$Ps = Pdreal + Phard.$$

By using these values, moreover, there is calculated (at Step S226) the first correction coefficient β. Specifically, this first correction coefficient β has a correlation, as indicated by the ratio of the limit clamping pressure Ps to the theoretical clamping pressure Pt at the limit clamping pressure detection time, as follows:

$$β = Ps/Pt.$$

The first correction coefficient β thus determined is stored for each learning range (at Step S227). For example, the map for the first correction coefficient β is updated. And, the flag F1 is set to "1" (at Step S228).

Subsequently, the slip of the continuously variable transmission 1 is detected so that a control to converge the slip is executed. Specifically, a torque reducing amount Tedown(i) of the engine 5 is determined by multiplying a slip amount Δslip(i) at the slip detecting instant by a preset coefficient K1, so that the torque reducing control (e.g., the ignition timing delaying control) of the engine 5 is executed on the basis of the torque reducing amount (at Step S229). In case the flag F1 is set at "1" so that the answer of Step S222 is YES, the first correction coefficient β has already been determined and stored for each learning range. Therefore, the routine skips over the individual steps of Step S223 to S227 and advances to Step S229, from which the subsequent controls are likewise executed.

Simultaneously with this, the oil pressure command value Pdtgt(i) is raised with a preset gradient Pdsw2 (at Step S230). In the procedure of these controls, the convergence of the slip is detected (at Step S231). This slip convergence detection can be performed in various methods. For example, the convergence of the slip can be decided when the difference between the estimated gear ratio and the actual gear ratio is at or lower than a preset value. In case the answer of Step S231 is NO, the routine is once passed through so as to continue the preceding control. In case the slip converges so that the answer of Step S231 is YES, on the contrary, the flag Ph is set to "4" (at Step S232) for the control of Phase 4. After this, this routine is once passed through.

In case the slip converges, the flag Ph is set at "4". Therefore, the answer of Step S206 shown in FIG. 24 is YES. In this case, the routine advances to Step S233 of the flow chart shown in FIG. 26, at which it is decided whether or not a preset time period T2 has elapsed. This preset time period T2 is counted from the instant at which the decision of the slip convergence held. At first, therefore, the answer of Step S233 is NO. Subsequent to this, it is decided (at Step S234) whether or not the flag F2 is at "1". This flag F2 is set to "1" when the control is made to step up the oil pressure command value Pdtgt(i) by a preset value h. At first, the flag F2 is at "0" so that the answer of Step S234 is NO. In this case, there is executed (at Step S235) the control (Pdtgt(i)=Pdtgt(i−1)+h) to step up the oil pressure command value Pdtgt(i) by the preset value h. Then, the flag F2 is set to "1" (at Step S236). After this, the routine is once passed through.

Even the preset time period T2 is not passed, the flag F2 is set at "1". After the answer of Step S233 was negated, the answer of Step S234 is affirmed. In this case, therefore, the previous value Pdtgt(i−1) of the oil pressure command value Pdtgt is adopted as the present value Pdgt(i) (at Step S237). In other words, the oil pressure command value Pdtgt(i) is kept at the value stepped up by the preset value h. In this procedure, the actual oil pressure (or the clamping pressure) gradually rises. After the preset time period T2 elapses, the answer of Step S233 is YES. In this case: the flags F1 and F2 are reset to zero; the stored data are cleared (at Step S238); the flag Ph indicating the phase is reset to zero (at Step S239); and the learned flag on the current range is turned ON (at Step S240). After this, the routine is once passed through.

When the learning data (or the first correction coefficient) β is thus obtained, it is decided that the running range is the learned range. Therefore, the answer of Step S203 shown in FIG. 24 is affirmed. In this case, the learning data β is read in as the first learning data (at Step S217), and the gear ratio γ(i) of the continuously variable transmission 1, which is determined from the input speed and the output speed of the continuously variable transmission 1 at that instant, is read in (at Step S218).

When the first learning data β and the gear ratio γ(i) of the continuously variable transmission 1 are read in, there is determined (at Step S219) the second learning data β', which is corrected from the first learning data β with the function F(γ) of the gear ratio γ. A theoretical clamping pressure Pt(i) at the time of reflecting the learning data is corrected with the second learning data β', to determine the clamping pressure Pt'(i) at the learning data reflection time (at Step S220). Specifically, the calculations are performed with the following corrections:

β'=β·F(γ);

and

Pt'(i) Pt(i)·β'.

When the clamping pressure Pt'(i) at the learning data reflection time is determined, the oil pressure command value Pdtgt(i) is determined (at Step S221) from the clamping pressure Pt'(i) at the learning data reflection time, the pressure Phard or the sum of the centrifugal oil pressure and the pressure based on the return spring, and the pressure Pakuro corresponding to the road surface input. Specifically, the oil pressure command value Pdtgt(i) is calculated, as follows:

Pdtgt(i)=Pt'(i)−Phard+Pakuro.

After this, this routine is once passed through.

In the limit clamping pressure detecting method of the related art, as described above, the oil pressure is gradually lowered from the oil pressure corresponding to the known clamping pressure, for example, so that the oil pressure just before the occurrence of the slip is detected as the oil pressure corresponding to the limit clamping pressure. Therefore, the detection result is the differential oil pressure between the oil pressure corresponding to the theoretical clamping pressure, as determined from the input torque at the time when the limit clamping pressure is detected, and the oil pressure corresponding to the limit clamping pressure. If the differential oil pressure or the detection result of the aforementioned limit clamping pressure is then stored in the map for every speeds, torques, temperatures or friction coefficients of the belt clamping portions, as in the aforementioned invention of Japanese Patent Publication No. 2001-13593, the clamping pressure can be precisely set as "the theoretical clamping pressure—the stored differential oil pressure".

If many parameters (or dimensions) such as speeds, torques, gear ratios, temperatures or friction coefficients are thus incorporated into the map, this map is so complicated and enlarged that it is not practical. If the dimensions of the map are increased, moreover, the number of detections of the limit clamping pressure are increased to invite the state, in which the clamping pressure is lowered for the detection, that is, to reduce the margin for the slip thereby to increase the frequency of the so-called "low state of the safety factor". Moreover, even a slight slip for the detection causes the degradation of the durability of the continuously variable transmission 1. In case the aforementioned deferential oil pressure is to be stored in the map for every speeds and torques so as to simplify the map, moreover, the clamping pressure cannot be precisely set because of the influences of the gear ratio or friction coefficient, which are not reflected on the map. As a result, the safety factor for the slip of the continuously variable transmission 1 may be lowered. In case the friction coefficient of the belt clamping portions has a large difference between the calculated value and the actual value as the gear ratio γ changes, for example, the clamping pressure cannot be precisely set.

Specifically, it is assumed that an actual friction coefficient μ ac or the actual friction coefficient of the belt clamping portions be constant, as illustrated at (I) in FIG. 28. With this assumption, a difference Δμ de between the actual friction coefficient μ ac at the limit clamping pressure detection time and an estimated friction coefficient μ es takes the same value as that of a difference Δμ re between the actual friction coefficient μ ac at the learning data reflection time and the estimated friction coefficient μ es. As a result, no problem arises even if the gear ratio γ of the continuously variable transmission 1 makes a large change between the limit clamping pressure detection time and the learning data reflection time. However, the actual friction coefficient μ ac of the belt clamping portions cannot be usually constant by the influences such as the deterioration of the oil but is changed according to the change in the gear ratio γ, as illustrated at (II) in FIG. 28. If the difference Δμ de between the actual friction coefficient μ ac at the limit clamping pressure detection time and the estimated friction coefficient μ es is then reflected as a difference Δμ H between a friction coefficient μ re at the learning data reflection time and the estimated friction coefficient μ es, the difference between the actual friction coefficient μ ac at the learning data reflection time and the estimated friction coefficient μ es is Δμ re in fact, and the error of "Δμ H-Δμ re" may occur. By the influence of this error, the clamping pressure at the learning data reflection time may then be set at a lower level to reduce the margin for the slip of the continuously variable transmission 1, i.e., the safety factor SF.

In order to correspond to the change in the actual friction coefficient μac, as illustrated at (III) in FIG. 28, therefore, a friction coefficient μ co at the corrected learning data reflection time is determined by correcting the friction coefficient μ re at the learning data reflection time in dependence upon the function F(γ) of the gear ratio γ at the reflection time, and the difference Δμ H' between the friction coefficient μ co at the corrected learning data reflection time and the estimated friction coefficient μ es is reflected on the setting of the clamping pressure. Thus, it is possible to prevent the reduction of the safety factor SF, as might otherwise be caused by the lower setting of the clamping pressure.

Here, the specific example described above presents the example, in which the correction is made with the function F(γ) of the gear ratio γ so that the influences of the change in the gear ratio γ may be reflected on the setting of the clamping pressure. However, the map, in which the dispersion of the predicted actual friction coefficient and the estimated friction coefficient with the gear ratio γ are corrected, can be used to correct the learning data by reflecting the gear ratio γ. At this time, the function F(γ) or the correction map is so set by considering that dispersion that the correction may be made on the safe side for the slip of the continuously variable transmission 1.

Figure 29:
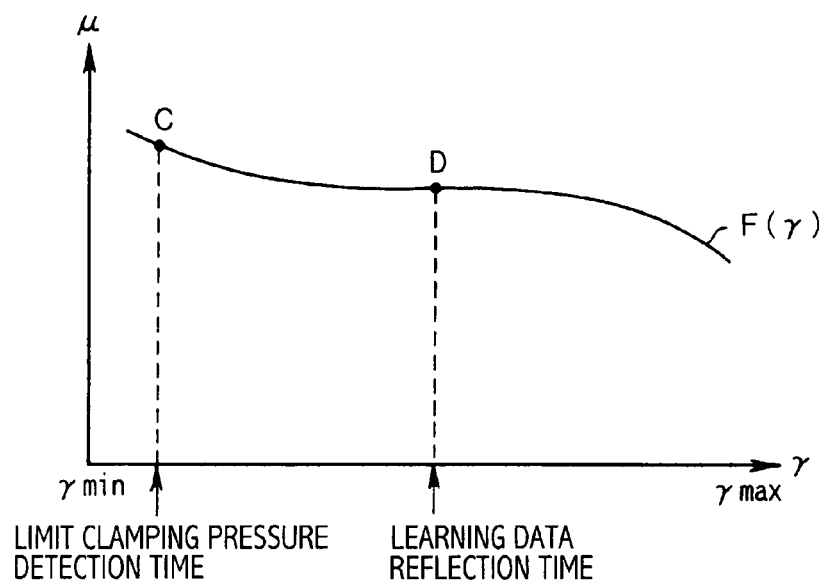
FIG. 29 presents a diagram for explaining another example of relations between: the actual friction coefficient and the estimated friction coefficient at the limit clamping pressure detection time, and the actual friction coefficient and the estimated friction coefficient at the learning data reflection time; and the gear ratio.

In the specific example shown in FIG. 28, moreover, the deviation between the actual friction coefficient at the limit clamping pressure detection time and the estimated friction coefficient is corrected so that the deviation at the learning data reflection time may be determined and reflected on the setting of the clamping pressure. As shown in FIG. 29, however, the actual friction coefficient (at point C) at the limit clamping pressure detection time is corrected and determined as a friction coefficient (at point D) at the leaning data reflection time by the function or correction map of a preset gear ratio γ so that the friction coefficient at the learning data reflection time may be reflected on the setting of the clamping pressure.

According to the control system of this invention thus constructed to execute the controls shown in FIG. 24 to FIG. 29, as has been described hereinbefore, the change in the friction coefficient μ is determined as the function of the gear ratio γ, and the clamping pressure is corrected with the corrected coefficient β' reflecting the change in the friction coefficient μ, so that the learning map can be simplified to execute the clamping pressure control on the basis of the limit clamping pressure. By thus reflecting the change in the friction coefficient μ on the clamping pressure control, moreover, the reduction of the safety factor SF of the continuously variable transmission 1 can be prevented or suppressed to improve the durabilities of the belt 17 or the individual sheaves of the continuously variable transmission 1.

Here, the aforementioned various controls can be executed by combining them suitably. In case the slip of the continuously variable transmission 1 is to be detected by lowering the clamping pressure for a preset constant time period or by lowering the oil pressure command value for setting the clamping pressure, for example, the clamping pressure may be lowered stepwise or gradually with a preset gradient, or may be lowered stepwise and then gradually. In this case, there may be executed the so-called "torque fusing control" or the control, in which the input torque is temporarily exploited in case the slip is detected. Moreover, the decision of the slip starting instant may be made by retroacting the comparison between the estimated gear ratio and the actual gear ratio from the present instant. In this invention, moreover, the slip starting pressure, as compared with the theoretical pressure determined from the input torque, may be the oil pressure at the slip starting time, as detected by any of the aforementioned controls, the oil pressure command value or the actual clamping pressure.

Here will be briefly described the relations between the aforementioned specific examples and this invention. The means for executing the controls of Step S4 or Step S34 corresponds to the pressure lowering means, the pressure re-lowering means or another pressure re-lowering means, and the means for executing the control of Step S12 or Step S60 corresponds to the pressure setting means. Moreover: the means for executing the control of Step S5 or Step S35 corresponds to the slip detecting means; the means for executing the control of Step S15 or Step S44 corresponds to the boosting means or the pressure restoring means; and the means for executing the control of Step S45 corresponds to the torque limiting means. Moreover, the means for executing the control of Step S102 corresponds to the slip control means. The means for executing the control of Step S17 corresponds to the slip pressure deciding means.

Moreover: the means for executing the controls of the Step S115 and Step S116 or Step S157 and Step S162 corresponds to the limit pressure detecting means of this invention; the means for executing the controls of Step S115, Step S157, Step S176, Step S187 and Step S197 corresponds to the slip limit deciding means of this invention; and the means for executing the controls of Step S110 to Step S113 corresponds to the estimated value calculating means of this invention. Moreover: the means for executing the controls of Step S119 or Step S162, Step S219 and Step S220 corresponds to the learning means or the learning correcting means of this invention; the means for executing the control of Step S124 corresponds to the comparison means of this invention; and the means for executing the control of Step S128 corresponds to the learning value unadopting means of this invention. And, the means for executing controls of Step S161 to Step S164, Step S172 to Step S174, Step S182 to Step S184 and Step S192 to Step S194 corresponds to the end deciding means of this invention.

Here, this invention should not be limited to the specific examples thus far described, but the power transmission mechanism, to which this invention relates, may be not only the aforementioned belt type continuously variable transmission but also frictional application means such as a toroidal type continuously variable transmission, a friction clutch or a friction brake. Therefore, the "pressure" in this invention contains not only the clamping pressure but also the applying pressure. Moreover, the clutch of the so-called "torque fusing control" may be not only the lockup clutch but also a clutch such as a start clutch, which is arranged in tandem with respect to the continuously variable transmission and has a variable transmission torque capacity.

Here will be generally described the advantages to be achieved by this invention. According to this invention, the pressure to be applied to establish the transmission torque capacity between the transmission members is set on the basis of the lowest value in the lowering procedure within a preset range, that is, the transmission torque capacity is determined on the basis of the lowest value. Therefore, the pressure to be applied to the transmission members can be lowered within a range to cause no slip, and the excessive slip due to the response delay of the pressure or the overshoot can be prevented in that procedure.

According to this invention, moreover, in case the pressure is lowered to change the slipping state between the transmission members, the pressure is lowered stepwise and then gradually. Therefore, the time period till the pressure reaches a preset low level can be shortened, and the lowering gradient at the instant when the preset low level is reached can be reduced. Therefore, it is possible to prevent or suppress the overshoot of the pressure drop or the accompanying excessive slip.

According to this invention, moreover, the pressure to be applied to the transmission members is lowered from a preset level. When a slip between the transmission members is detected, the aforementioned pressure to be applied is commanded to rise stepwise to a higher level than that at the lowering starting time. Therefore, the rise in the pressure to be actually applied to the transmission members can be accelerated to suppress or eliminate the slip between the transmission members promptly. In other words, it is possible to prevent the reach to the excessive slip.

According to this invention, still moreover, in case the slip between the transmission members is detected by lowering the pressure for setting the transmission torque capacity, the pressure is instructed to rise stepwise, and the torque of the prime mover, i.e., the torque to be inputted to the power transmission mechanism is lowered so that the slip between the transmission members can be promptly ended or suppressed.

According to this invention, moreover, in case the pressure such as the clamping pressure is to be lowered to establish the slip in the power transmission mechanism, the clutch arrayed in tandem with respect to the power transmission mechanism is controlled to establish the slip prior to the power transmission mechanism. Even in case the torque to act on the transmission line including the power transmission mechanism and the clutch increases, therefore, it is possible to prevent or suppress the excessive slip of the power transmission mechanism.

According to this invention, still moreover, in case the pressure to set the transmission torque capacity is to be lowered, the lowering width is limited to the preset value. In case the slip between the transmission members is not detected due to the drop, the preceding low pressure is lowered again by a preset value. Therefore, the slip between the transmission members can be caused to determine the so-called "slip limit pressure", while preventing or suppressing the excessive drop of the aforementioned pressure or the excessive slip.

According to this invention, moreover, in case the pressure for setting the transmission torque capacity is to be lowered, its lowering width is limited to a preset value. In case the slip between the transmission members is not detected due to that drop, the aforementioned pressure is lowered again with a larger width than the preceding one. Therefore, the slip between the transmission members can be caused to determine the so-called "slip limit pressure", while preventing or suppressing the excessive drop of the aforementioned pressure or the excessive slip.

According to this invention, more specifically, in case the aforementioned pressure is lowered to cause the slip between the transmission members and in case this slip is detected, the pressure at an instant before the detection instant of the slip is decided as the slip starting pressure. Even with an unavoidable delay in the slip detection, therefore, the slip starting pressure can be precisely decided.

According to this invention, on the other hand, in case the pressure for setting the transmission torque capacity between the transmission members is to be lowered, the command value is stepwise lowered to lower the aforementioned pressure. Therefore, the actual pressure lowers with a preset gradient with a response delay or along a changing curve so that the pressure in that changing procedure is decided as the pressure at the slip starting time before the slip detection instant. As a result, the decision precision can be improved.

According to this invention, on the other hand, the slip or the slip limit pressure (or the limit clamping pressure) is detected within a short time period, for which the running state or the drive state hardly changes, so that its detecting precision can be improved.

According to this invention, moreover, the slip accompanying the lowering of the clamping pressure is decided on the basis of the estimated value and the actual value of the gear ratio or the gear changing rate so that the decision is made within a preset time period. Therefore, the error in the estimated value or the actual value can be reduced to improve the detection precision of the slip or the accompanying limit pressure.

According to this invention, moreover, the estimated value is determined considering the dead time at the lowering time of the clamping pressure so that the error to be contained in the estimated value can be reduced to improve the decision precision of the slip or the detection precision of the slip limit pressure.

According to this invention, still moreover, the propriety of the learning value of the clamping pressure is decided, and the improper learning value is not reflected on the control. Therefore, it is possible to avoid or prevent the erroneous setting of the clamping pressure.

According to this invention, on the other hand, the gear changing rate at an instant just before the present instant is adopted as the estimated value of the gear changing rate, and the slip limit pressure is detected on the basis of the estimated value. Even in the gear changing operation with the gear ratio or gear changing rate being varied, therefore, the error of the estimated value of the gear changing rate can be reduced to improve the detection precision of the slip limit pressure.

According to this invention, still moreover, the gear changing rate at an instant near the instant to start the lowering of the clamping pressure is adopted as the estimated value of the gear changing rate, and the slip limit pressure is detected by contrasting that value and the gear changing rate at the present instant. Therefore, the error of the estimated value of the gear changing rate can be reduced to improve the detection precision of the slip limit pressure.

According to this invention, still moreover, when the slip limit pressure is detected, the end of the detection control of the slip limit pressure is decided on the basis of the gear ratio at that instant and the gear change command value or the gear changing rate before that instant. Therefore, it is possible to perform the end decision of the detection control of the slip limit pressure during the gear change properly.

According to this invention, moreover, when the pressure to be applied to the power transmission mechanism so as to set the transmission torque capacity, the slip starting pressure is detected by the preset method in the state, in which the preset input torque is acting, and the theoretical pressure is set on the basis of the input torque. Moreover, the physical quantities to be set on the basis of the slip starting pressure and the theoretical pressure are reflected on the controls so that the aforementioned pressure is set. As a result, it is possible to set the pressure to be applied to the power transmission mechanism, properly.

According to this invention, moreover, the physical quantities to be set on the basis of the slip starting pressure and the theoretical pressure are learned and corrected according to the change in the action state of the power transmission mechanism. In case the action state of the power transmission mechanism changes from the steady state to the unsteady state, for example, or in case the state is transient, the physical quantities are properly corrected so that the pressure to be applied to the power transmission mechanism can be set properly and precisely.

According to this invention, moreover, in case the power transmission mechanism includes the continuously variable transmission, the physical quantities to be set on the basis of the slip starting pressure and the theoretical pressure are learned and corrected on the basis of at least one of the input speed and the input torque and the gear ratio of the continuously variable transmission. As a result, the state change of the case, in which the action state of the power transmission mechanism changes from the steady state to the unsteady state or in which the state is transient, can be properly reflected to correct the physical quantities properly.

According to this invention, moreover, in case the power transmission mechanism includes the continuously variable transmission, the physical quantities to be set on the basis of the slip starting pressure and the theoretical pressure are learned and corrected on the basis of the function of the gear ratio of the continuously variable transmission. As a result, the physical quantities can be properly corrected by reflecting the change in the power transmission state such as the friction coefficient of the power transmission portion of the power transmission mechanism, so that the safety factor for the slip of the continuously variable transmission can be prevented or suppressed from lowering. Moreover, the learning map can be simplified to execute the clamping pressure control easily on the basis of the limit clamping pressure.

What is claimed is:

1. A control system of a power transmission mechanism, in which a transmission torque capacity between transmission members varies according to a pressure to be applied to said transmission members, in which a torque according to the transmission torque capacity is transmitted between a prime mover and a drive wheel, and in which the pressure to be applied to said transmission members is controlled on the basis of a slip condition between said transmission members as accompanies the lowering of said pressure, comprising:
decision means for deciding whether or not a predetermined prerequisite condition for lowering the pressure is satisfied,
pressure lowering means for lowering said pressure by a preset value when the decision means decides that the prerequisite condition is satisfied; and
pressure setting means for setting said pressure to a value obtained by adding a pressure corresponding to the road surface input to a lowered minimum value of said pressure, in case the prerequisite condition is unsatisfied during lowering the pressure and a control of lowering said pressure by the preset value using said pressure lowering means is thereby stopped without detecting the slip between said transmission members.

2. The control system of a power transmission mechanism according to claim 1,
wherein said pressure lowering means includes means for lowering a pressure command value stepwise and keeping the pressure command value constant for a preset time period and for outputting a command signal to raise said pressure command value after lapse of said preset time period.

3. The control system of a power transmission mechanism according to claim 1,
wherein said pressure lowering means includes means for lowering said pressure stepwise and then steplessly to a preset value.

4. The control system of a power transmission mechanism according to claim 1,
wherein said pressure lowering means includes means for lowering said pressure with a preset gradient for a preset time period and then raising said pressure.

5. The control system of a power transmission mechanism according to claim 1, further comprising:
pressure re-lowering means for lowering said pressure again, in case the slip between said transmission members is not detected in spite of lowering said pressure by a preset value using said pressure lowering means, by said preset value from a lower pressure than the pressure before lowered by said preset value.

6. The control system of a power transmission mechanism according to claim 1, further comprising:
another pressure re-lowering means for lowering said pressure again, in case the slip between said transmission members is not detected in spite of lowering said pressure by a preset value using said pressure lowering means, by more than said preset value from a pressure before lowered by said preset value.

7. The control system of a power transmission mechanism according to claim 1,
wherein said pressure lowering means includes means for lowering said pressure within a preset time; and
further comprising limit pressure detecting means for detecting a limit pressure for causing a slip in said transmission members while said pressure is being lowered by a preset value.

8. The control system of a power transmission mechanism according to claim 7,
wherein said power transmission mechanism includes a continuously variable transmission having a transmission torque capacity varied according to a clamping pressure;
wherein said pressure lowering means includes means for lowering said clamping pressure; and wherein said limit pressure detecting means includes means for detecting a slip limit pressure produced as said clamping pressure lowers.

9. The control system of a power transmission mechanism according to claim 8, further comprising:
slip limit deciding means for deciding the start of said slip on the basis of an estimated value, which is estimated from the gear ratio or gear changing rate before the present instant, and the gear ratio or gear changing rate at the present instant.

10. The control system of a power transmission mechanism according to claim 9, further comprising:
estimated value calculating means for determining said estimated value by considering a preset time period at the lowering start of said clamping pressure.

11. The control system of a power transmission mechanism according to claim 9,
wherein said slip limit deciding means includes means for adopting the estimated value of said gear changing rate as a gear changing rate at an instant just before the present instant.

12. The control system of a power transmission mechanism according to claim 9,
wherein said slip limit deciding means includes means for adopting a gear changing rate at an instant within a preset range containing an instant, at which the lowering of said clamping pressure is started, as the estimated value of said gear changing rate.

13. The control system of a power transmission mechanism according to claim 8, further comprising:
learning means for determining a learned value of said clamping pressure on the basis of said slip limit pressure;
comparison means for comparing the actual gear ratio after lapse of a preset time period from when said clamping pressure was set and an estimated gear ratio on the basis of said learned value; and
learned value unadopting means for not using said learned value for the clamping pressure control in case the value of the comparison result between the actual gear ratio and the estimated gear ratio at said comparison means is outside of a preset range.

14. The control system of a power transmission mechanism according to claim 8, further comprising:
end deciding means for deciding the end of the detection control of said slip limit pressure on the basis of a gear change command value or a gear changing rate before the slip limit detection and a gear ratio at the slip limit pressure detection time.

15. The control system of a power transmission mechanism according to claim 1, further comprising:
pressure applying means for setting said pressure to be applied to said power transmission mechanism, with physical quantities determined from the slip starting pressure, at which the slip between said transmission members is started by lowering said pressure when a preset input torque is acting, and a theoretical pressure determined on the basis of said input torque.

16. The control system of a power transmission mechanism according to claim 15, further comprising:
learning correction means for learning and correcting said physical quantities on the basis of the action state of said power transmission mechanism.

17. The control system of a power transmission mechanism according to claim 16,
wherein said power transmission mechanism includes a continuously variable transmission for changing the gear ratio continuously and changing a torque capacity according to the clamping pressure, and wherein said learning correction means includes means for learning and correcting said physical quantities on the basis of at least any of the input speed, the input torque and the gear ratio of said continuously variable transmission.

18. The control system of a power transmission mechanism according to claim 16, wherein said power transmission mechanism includes a continuously variable transmission for changing the gear ratio continuously and changing a torque capacity according to the clamping pressure, and wherein said learning correction means includes means for learning and correcting said physical quantities on the basis of the function of the gear ratio of said continuously variable transmission.

19. The control system of a power transmission mechanism according to claim 18, wherein said learning correction means includes means for learning and correcting said physical quantities by operating the changes in the friction coefficient in said continuously variable transmission as a function of said gear ratio.

20. The control system of a power transmission mechanism according to claim 1, comprising:

pressure lowering control means for lowering said pressure stepwise and then steplessly when said pressure is to be lowered so as to change the slip state between said transmission members.

21. The control system of a power transmission mechanism according to claim 1, comprising:

slip detecting means for detecting the slip between said transmission members as said pressure lowers; and pressure raising means for instructing to raise the pressure to be applied to said transmission members, in case the slip between said transmission members is detected by said slip detecting means, stepwise to a pressure higher than the pressure at the instant of starting said pressure lowering.

22. The control system of a power transmission mechanism according to claim 1, comprising:

pressure restoring means for instructing to raise said pressure stepwise in case the slip between said transmission members is detected by said slip detecting means; and torque limiting means for limiting the increase in the torque of said prime mover when said pressure is instructed to rise by said pressure restoring means.

23. The control system of a power transmission mechanism according to claim 1, comprising:

slip control means for setting a state, in which a slip occurs in said clutch at a disturbance time with respect to said power transmission mechanism before said pressure is lowered to detect the slip between said transmission members.

24. The control system of a power transmission mechanism according to claim 1, comprising:

slip pressure deciding means for deciding the pressure at an instant before the instant, at which the slip between said transmission members was detected by said slip detecting means, as a slip starting pressure between said transmission members.

25. A control system of a power transmission mechanism, in which a transmission torque capacity between transmission members varies according to a pressure to be applied to said transmission members, in which a torque according to the transmission torque capacity is transmitted between a prime mover and a drive wheel, and in which the pressure to be applied to said transmission members is controlled on the basis of a slip condition between said transmission members as accompanies the lowering of said pressure, comprising:

a decision device for deciding whether or not a predetermined prerequisite condition for lowering the pressure is satisfied, a pressure lowering device for lowering said pressure by a preset value when the decision device decides that the prerequisite condition is satisfied; and a pressure setter for setting said pressure to a value obtained by adding a pressure corresponding to the road surface input to a lowered minimum value of said pressure, in case the prerequisite condition is unsatisfied during lowering the pressure and a control of lowering said pressure by the preset value using said pressure lowering device is thereby stopped without detecting the slip between said transmission members.

\* \* \* \* \*